(12) United States Patent
Dubey et al.

(10) Patent No.: US 11,021,399 B2
(45) Date of Patent: Jun. 1, 2021

(54) SELF-CONSOLIDATING GEOPOLYMER COMPOSITIONS AND METHODS FOR MAKING SAME

(71) Applicant: UNITED STATES GYPSUM COMPANY, Chicago, IL (US)

(72) Inventors: Ashish Dubey, Grayslake, IL (US); Sundararaman Chithiraputhiran, Des Plaines, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 65 days.

(21) Appl. No.: 16/445,940

(22) Filed: Jun. 19, 2019

(65) Prior Publication Data

US 2020/0231503 A1   Jul. 23, 2020

Related U.S. Application Data

(60) Provisional application No. 62/795,874, filed on Jan. 23, 2019.

(51) Int. Cl.
*C04B 28/14* (2006.01)
*C04B 24/32* (2006.01)
(Continued)

(52) U.S. Cl.
CPC .............. *C04B 28/14* (2013.01); *C04B 24/06* (2013.01); *C04B 24/32* (2013.01);
(Continued)

(58) Field of Classification Search
None
See application file for complete search history.

(56) References Cited

U.S. PATENT DOCUMENTS 5,643,510 A   7/1997   Sucech
7,648,575 B2   1/2010   Kerns et al.
(Continued)

FOREIGN PATENT DOCUMENTS

CN   101549977 A   10/2009
CN   103232197 B   8/2013
(Continued)

OTHER PUBLICATIONS

ACI 237R-07, Emerging Technology Series, Self-Consolidating Concrete, Reported by ACI Committee 237, American Concrete Institute, Apr. 2007.
(Continued)

*Primary Examiner* — Arrie L Reuther
(74) *Attorney, Agent, or Firm* — Vorys, Sater Seymour and Pease LLP; Pradip Sahu; Philip T. Petti

(57) ABSTRACT

Self-consolidating geopolymer compositions utilizing fly ash and inorganic mineral including alkaline earth metal oxide as cementitious reactive components and include cement set retarder. The alkaline earth metal oxide is preferably calcium oxide (also known as lime or quicklime) and/or magnesium oxide. The inorganic minerals including alkaline earth metal oxide have an alkaline earth metal oxide content preferably greater than 50 wt. %, more preferably greater than 60 wt. %, even more preferably greater than 70 wt. %, and most preferably greater than 80 wt. %, for example greater than 90 wt. %. The cementitious reactive powder may optionally also include one or more aluminous cements and one or more source of calcium sulfates. The cementitious reactive powders are activated with an alkali metal chemical activator selected from alkali metal salt and/or alkali metal base. Methods for making the compositions are also disclosed.

20 Claims, 3 Drawing Sheets

(51) Int. Cl.
  *C04B 24/06* (2006.01)
  *C04B 103/22* (2006.01)
  *C04B 103/40* (2006.01)
  *C04B 103/60* (2006.01)
  *C04B 103/30* (2006.01)
  *C04B 103/50* (2006.01)
  *C04B 103/12* (2006.01)

(52) U.S. Cl.
  CPC ...... *C04B 2103/12* (2013.01); *C04B 2103/22* (2013.01); *C04B 2103/304* (2013.01); *C04B 2103/40* (2013.01); *C04B 2103/50* (2013.01); *C04B 2103/601* (2013.01)

(56) References Cited

U.S. PATENT DOCUMENTS

| | | | |
|---|---|---|---|
| 8,349,071 | B2 | 1/2013 | Boxley et al. |
| 8,747,547 | B1 | 6/2014 | Peters et al. |
| 9,193,627 | B2 | 11/2015 | Dantin et al. |
| 9,624,131 | B1 | 4/2017 | Dubey et al. |
| 2007/0079733 | A1 | 4/2007 | Crocker |
| 2013/0139729 | A1 | 6/2013 | Ong et al. |
| 2013/0284069 | A1 | 10/2013 | Dubey |
| 2013/0284070 | A1 | 10/2013 | Dubey |
| 2017/0113969 | A1* | 4/2017 | Dubey ............. E01C 7/147 |
| 2017/0166481 | A1 | 6/2017 | Dubey et al. |
| 2018/0208507 | A1 | 7/2018 | Yamakawa et al. |
| 2018/0312440 | A1 | 11/2018 | Cappellari et al. |
| 2019/0202737 | A1 | 7/2019 | Hesselbarth et al. |

FOREIGN PATENT DOCUMENTS

| | | |
|---|---|---|
| CN | 105800972 A | 7/2016 |
| KR | 100943096 B1 | 2/2010 |
| WO | 2012015308 A1 | 2/2012 |
| WO | 2012036560 A1 | 3/2012 |
| WO | 2013066561 A1 | 5/2013 |
| WO | 2014075134 A1 | 5/2014 |
| WO | 2015049010 A1 | 4/2015 |
| WO | 2017025127 A1 | 2/2017 |
| WO | 2018069165 A1 | 4/2018 |

OTHER PUBLICATIONS

International Search Report and Written Opinion dated May 19, 2020 for PCT/US2020/014693 to United States Gypsum Company filed Jan. 23, 2020.

* cited by examiner

SELF-CONSOLIDATING GEOPOLYMER COMPOSITIONS AND METHODS FOR MAKING SAME

CROSS-REFERENCE TO RELATED APPLICATION

This claims the benefit of U.S. provisional patent application No. 62/795,874, filed Jan. 23, 2019, incorporated herein by reference.

FIELD OF THE INVENTION

The present invention provides geopolymer compositions that are highly flowable, self-consolidating and with enhanced performance characteristics including extended setting time, tailorable rheology and improved compressive strength and method for making these compositions.

BACKGROUND OF THE INVENTION

US 2013/0284069 A1 to Dubey, discloses Geopolymer compositions comprising reaction product of thermally activated aluminosilicate mineral/calcium aluminate cement/ calcium sulfate such as anhydrous calcium sulfate/chemical activator such as alkali metal salt/water. It discloses the compositions may contain air-entraining agents or foaming agents. It also discloses using the composition for panels, road patch, traffic bearing surfaces, and pavements.

US 2013/0284070 A1 to Dubey, discloses a Geopolymer composition for e.g. panels comprises reaction product of thermally activated aluminosilicate mineral/calcium sulfoaluminate cement/calcium sulfate such as anhydrous calcium sulfate/chemical activator such as alkali metal salt/ water.

US 2017/0166481 A1 to Dubey discloses a freeze-thaw durable, dimensionally stable, geopolymer composition including: cementitious reactive powder including thermally activated aluminosilicate mineral, aluminate cement, and calcium sulfate; alkali metal chemical activator; and a freeze-thaw durability component.

As explained by Freeze Thaw and ASTM C-672, US Spec, posted on the Internet May 21, 2010, durability is the ability of concrete to resist weathering action, chemical attack and abrasion while maintaining its desired engineering properties. The durability of the concrete products depends on the kind of environment they will be exposed to. As cold weather approaches, concepts like freeze-thaw and resistance to deicing salts become important to understand. When water freezes, it expands 9%. As the water in moist concrete freezes, it produces pressure in the pores of concrete. If this pressure exceeds the tensile strength, the cavity will dilate and rupture. Successive freeze-thaw cycles will then eventually cause expansion and cracking, scaling, and/ or crumbling of the concrete. Deicing chemicals, used for snow and ice removal, can aggravate freeze-thaw deterioration. Therefore, when using cement products, such as patching materials, on concrete roadways it is important that these materials have a strong resistance to the effects of these harsh conditions and chemicals.

SUMMARY OF THE INVENTION

The present invention provides geopolymer compositions that are highly flowable, self-consolidating and with enhanced performance characteristics including extended setting time, slump retention, tailorable rheology and improved compressive strength and method for making these compositions.

The self-consolidating geopolymer compositions of the present invention utilize alumino-silicate minerals such as fly ash, cement set retarders, and an inorganic mineral comprising alkaline earth metal oxide as cementitious reactive components. The said inorganic mineral comprising alkaline earth metal oxide preferably contains calcium oxide (also known as lime or quicklime) or magnesium oxide, or combinations thereof. The cementitious reactive powder may also optionally include one or more aluminous cements and one or more source of calcium sulfates. The cementitious reactive powders are activated with an alkali metal chemical activator selected from at least one member of the group consisting of an alkali metal salt and an alkali metal base. Alkali metal citrates are the most preferred chemical activators of the present invention. Incorporation of high water to cementitious materials ratio, cement set retarders, and/or inorganic mineral comprising alkaline earth metal oxide in the cementitious reactive powder of the invention provides various functional benefits including high flow, self-consolidation, tailorable setting behavior, and improved compressive strength.

The self-consolidation behavior in geopolymer compositions can be achieved by one or more of the following.

The invention compositions and methods of making the compositions may employ a high water to cementitious materials ratio. In preferred compositions of this invention the water to cementitious materials ratio can range from 0.30 to 0.55:1, preferably from 0.35 to 0.45:1.

The invention compositions and methods of making the compositions may employ inorganic or organic cement set retarders including carboxylic acids and their salts (for example sodium and potassium salts). Cement set retarders may be added in an amount of 0.1 to 4.0, preferably 0.25 to 3.0, more preferably 0.50 to 2.0 weight % based upon the total weight of the cementitious reactive powder.

The invention compositions and methods of making the compositions may employ inorganic mineral comprising alkaline earth metal oxide, wherein the inorganic mineral comprising alkaline earth metal oxide is in an amount of 0.0 to 10, preferably 0.2 to 6, more preferably 0.3 to 3 parts by weight (pbw) per 100 parts by weight of said thermally activated aluminosilicate mineral.

This invention provides a self-consolidating geopolymer composition comprising a slurry mixture of:
water; and
cementitious reactive powder comprising:
thermally activated aluminosilicate mineral in an amount of 100 parts by weight, wherein preferably the thermally activated aluminosilicate mineral comprises at least 75% Class C fly ash,
inorganic mineral comprising alkaline earth metal oxide, wherein the inorganic mineral comprising alkaline earth metal oxide is in an amount of 0 to 10, preferably 0.2 to 6, more preferably 0.3 to 3 parts by weight (pbw) per 100 parts by weight of said thermally activated aluminosilicate mineral,
optionally at least one aluminate cement, and
optionally at least one calcium sulfate; and
cement set retarder in an amount of 0.1 to 4.0, preferably 0.25 to 3.0, more preferably 0.50 to 2.0 weight % based upon the total weight of the cementitious reactive powder;
alkali metal chemical activator in an amount of 1 to 6, preferably 1.25 to 4, more preferably 1.5 to 2.5 weight % based upon the total weight of the cementitious reactive powder, wherein the alkali metal chemical activator is selected from at least one member of the group consisting of an alkali metal salt and an alkali metal base, wherein potassium citrate is the preferred alkali metal salt chemical activator;

freeze-thaw durability component in an amount of 0.05 to 21.5, preferably 0.1 to 10, more preferably 0.1 to 5 weight % based upon the total weight of the cementitious reactive powder, the freeze-thaw durability component comprising:

air-entraining agent in an amount of 0 to 1, preferably 0.01-0.5, more preferably 0.01-0.2, most preferably 0.05-0.2 weight % based upon the total weight of the cementitious reactive powder, defoaming agent in an amount of 0 to 0.5, preferably 0-0.25, more preferably 0.01-0.1 weight % based upon the total weight of the cementitious reactive powder, and surface active organic polymer in an amount of 0 to 20, preferably 0-10, more preferably 0-5 weight % based upon the total weight of the cementitious reactive powder;

wherein at least one member of the group consisting of the air-entraining agent and the surface active organic polymer is present, wherein the composition has an air content of about 0% to 20% by volume, more preferably about 2% to 12% by volume, and most preferably about 3% to 8% by volume, wherein said thermally activated aluminosilicate mineral, said optional aluminate cement, said optional calcium sulfate, and said inorganic mineral comprising alkaline earth metal oxide is at least 70 wt. %, preferably at least 80 wt. %, more preferably at least 95 wt. %, most preferably 100 wt. % of the cementitious reactive powder;

wherein the weight ratio of the water/cementitious reactive powder is from 0.30 to 0.55:1, preferably from 0.35 to 0.45:1;

wherein if the amount of cement set retarder is less than 0.5 wt. % the weight ratio of the water/cementitious reactive powder is from 0.35 to 0.55:1, preferably from 0.35 to 0.45:1 and/or the inorganic mineral comprising alkaline earth metal oxide is in an amount of 0.2 to 10, preferably 0.2 to 6, more preferably 0.3 to 3 parts by weight (pbw) per 100 parts by weight of said thermally activated aluminosilicate mineral;

wherein the slurry mixture has an initial slump diameter and/or one hour slump diameter greater than 18 inches, more preferably greater than 20 inches and most preferably greater than 22 inches when measured in accordance to ASTM C1611-14 and has a final setting time of at least 60 minutes measured in accordance to ASTM C191-13.

Compositions of the invention meet the definition of self-consolidation as defined in the American Concrete Institute Standard ACI 237R-07 Self-Consolidating Concrete. The self-consolidating geopolymer compositions of this invention have an initial slump diameter and/or a one hour slump diameter greater than 18 inches, more preferably greater than 20 inches and most preferably greater than 22 inches when measured in accordance to ASTM C1611-14. Thus, the self-consolidating geopolymer compositions of this invention may have an initial slump diameter greater than 18 inches, more preferably greater than 20 inches and most preferably greater than 22 inches when measured in accordance to ASTM C1611-14 and/or the self-consolidating geopolymer compositions of this invention may have a one hour slump diameter greater than 18 inches, more preferably greater than 20 inches and most preferably greater than 22 inches when measured in accordance to ASTM C1611-14. The self-consolidating geopolymer compositions of this invention also have a final setting time of at least 60 minutes when measured in accordance to ASTM C191-13—Standard Test Methods for Time of Setting of Hydraulic Cement by Vicat Needle.

The flow behavior of self-consolidating geopolymer compositions in absence of coarse gravel is alternately characterized using a cylinder slump test. The cylinder slump test utilizes a hollow cylinder about 2 in. (5.08 cm.) diameter and about 4 in. (10.16 cm.) length held vertically with one open end resting on a smooth plastic surface. The cylinder is filled up to the top with the cementitious mixture followed by striking off the top surface to remove the excess slurry mixture. The cylinder is then gently lifted vertically up to allow the slurry to come out from the bottom and spread on the plastic surface to form a circular patty. The diameter of the patty is then measured and recorded as the slump of the material. Per this specification, self-consolidating geopolymer compositions as characterized by this test method have a slump diameter of at least 7 inches, more preferably at least 8 inches, and most preferably at least 9 inches. Slump diameter of 7 inches according to this cylinder slump test corresponds to a slump diameter of 18 inches in ASTM C1611-14. The cylinder slump test is typically used when coarse aggregate are absent in the compositions because it uses less material than the ASTM C1611-14 test.

As stated above this invention provides a self-consolidating geopolymer composition. In the present specification self-consolidating geopolymer compositions are those which meet the parameters for a self-consolidating concrete according to American Concrete Institute Standard ACI 237R-07 Self-Consolidating Concrete (published 1 Apr. 2007). Self-consolidating concrete (SCC) is highly flowable, non-segregating concrete that can spread into place, fill the formwork, and encapsulate the reinforcement without any mechanical consolidation. In general, SCC is concrete made with conventional concrete materials and, in some cases, with a viscosity-modifying admixture (VMA). SCC has also been described as self-compacting concrete, self-placing concrete, and self-leveling concrete, which all are subsets of SCC.

Thus, where cement set retarder is at least 0.5 wt. %, the invention encompasses a slurry mixture having:

water to cementitious materials ratio: from 0.30 to 0.55, preferably from 0.35 to 0.45 inorganic and/or organic cement set retarders (typical organic cement set retarders include carboxylic acids and their salts), from 0.5 to 4.0 wt. % of cementitious reactive powder, preferably from 0.5 to 3.0 wt. % of cementitious reactive powder, most preferably from 0.50 to 2.0 wt. % of cementitious reactive powder inorganic minerals comprising alkaline earth metal oxide include calcium oxide or quicklime, magnesium oxide, and combinations thereof: from 0 to 10, preferably 0.2 to 6, more preferably 0.3 to 3 pbw of thermally activated aluminosilicate mineral.

Thus, the invention encompasses a slurry mixture when inorganic minerals comprising alkaline earth metal oxides are not used as part of the composition, water to cementitious materials ratio and cement set retarder having ranges as follows:

the water to cementitious materials ratio is in the range 0.35 to 0.55, and the inorganic or organic cement set retarders are in the range 0.50 to 4.0% of cementitious reactive powder, preferably in the range 0.50 to 2.0% of cementitious reactive powder The invention also provides a blend for making a self-consolidating geopolymer composition comprising a mixture of:
cementitious reactive powder comprising:
thermally activated aluminosilicate mineral in an amount of 100 parts by weight, wherein preferably the thermally activated aluminosilicate mineral comprises at least 75% Class C fly ash, and
inorganic mineral comprising alkaline earth metal oxide, wherein the inorganic mineral comprising alkaline earth metal oxide is in an amount of 0.0 to 10, preferably 0.2 to 6, more preferably 0.3 to 3 pbw per said 100 parts by weight of thermally activated aluminosilicate mineral,
optionally at least one aluminate cement, and
optionally at least one calcium sulfate; and
cement set retarder in an amount of 0.1 to 4.0, preferably 0.25 to 3.0, more preferably 0.50 to 2.0 weight % based upon the total weight of the cementitious reactive powder;
alkali metal chemical activator in an amount of 1 to 6, preferably 1.25 to 4, more preferably 1.5 to 2.5 weight % based upon the total weight of the cementitious reactive powder, wherein the alkali metal chemical activator is selected from at least one member of the group consisting of an alkali metal salt and an alkali metal base, wherein potassium citrate is the preferred alkali metal salt chemical activator;
freeze-thaw durability component in an amount of 0.05 to 21.5, preferably 0.1 to 10, more preferably 0.1 to 5 weight % based upon the total weight of the cementitious reactive powder, the freeze-thaw durability component comprising:
air-entraining agent in an amount of 0 to 1, preferably 0.01-0.5, more preferably 0.01-0.2, most preferably 0.05-0.2 weight % based upon the total weight of the cementitious reactive powder,
defoaming agent in an amount of 0 to 0.5, preferably 0-0.25, more preferably 0.01-0.1 weight % based upon the total weight of the cementitious reactive powder, and
surface active organic polymer in an amount of 0 to 20, preferably 0-10, more preferably 0-5 weight % based upon the total weight of the cementitious reactive powder;
wherein at least one member of the group consisting of the air-entraining agent and the surface active organic polymer is present,
wherein the composition has an air content of about 0% to 20% by volume, more preferably about 2% to 12% by volume, and most preferably about 3% to 8% by volume,
wherein said thermally activated aluminosilicate mineral, said optional aluminate cement, said optional calcium sulfate, and said inorganic mineral comprising alkaline earth metal oxide is at least 70 wt. %, preferably at least 80 wt. %, more preferably at least 95 wt. %, most preferably 100 wt. % of the cementitious reactive powder;
wherein the blend when mixed with water forms a slurry mixture that has an initial slump diameter and/or one hour slump diameter greater than 18 inches, more preferably greater than 20 inches and most preferably greater than 22 inches when measured in accordance to ASTM C1611-14 and has a final setting time of at least 60 minutes measured in accordance to ASTM C191-13 if mixed with water to form a slurry at a weight ratio of the water/cementitious reactive powder from 0.30 to 0.55, preferably from 0.35 to 0.45 with the provision that if the amount of cement set retarder is less than 0.5 wt. %:
the weight ratio of the water/cementitious reactive powder is from 0.35 to 0.55:1, preferably from 0.35 to 0.45:1 and/or the inorganic mineral comprising alkaline earth metal oxide is in an amount of 0.2 to 10, preferably 0.2 to 6, more preferably 0.3 to 3 parts by weight (pbw) per 100 parts by weight of said thermally activated aluminosilicate mineral.

When inorganic mineral comprising alkaline earth metal oxide is added in the ranges mentioned above the setting time of the geopolymer compositions of the invention can be extended up to 6 hours. Furthermore, at these dosages of inorganic mineral comprising alkaline earth metal oxide, the geopolymer compositions of this invention have excellent flow properties and self-consolidating characteristics. Longer setting time and self-consolidating characteristics are particularly useful when the material is used in ready-mix trucks (also known as transit trucks) and hauled long distances from the concrete ready-mix batching plants.

Properly proportioned and placed self-consolidating geopolymer concrete provides not only several technical benefits but also many economic benefits. In particular, some key benefits provided by self-consolidating geopolymer concrete compositions of this invention are highlighted below:

Increase in construction productivity due to higher rate of casting and finishing.

Enable filling of highly reinforced sections and complex formwork while ensuring a more homogeneous and satisfactory construction quality.

Reduce the number of concrete placement points during casting while still achieving desired spreading in large construction jobs. This in turn reduces the need to move transit trucks and pump lines to place concrete.

Enable placement and casting of geopolymer concrete that is relatively more homogeneous and possessing desired mechanical properties less dependent on the skill of construction and vibrating crews.

Enhance flexibility for detailing reinforcing bars. For instance, reduce the need to bundle reinforcement to achieve proper material placement and consolidation. While in other scenarios, permit use of small diameter, closely spaced reinforcing bars to control cracking.

Achieve smooth and aesthetically appealing surfaces that are free of honeycombing and signs of bleeding and discoloration.

Eliminate the need for flooring materials such as self-leveling underlayments that are typically used to level and prepare substrates for installation of final finish flooring materials such as carpets and tiles.

Reduce construction noise on the job site. This is particularly important in large cities and densely populated areas. This benefit is also critical in heavily reinforced sections that typically require heavy vibration to achieve proper consolidation.

Reduce construction labor and equipment for material placement since there is no need for external vibration to ensure proper consolidation of geopolymer concrete. Further, the need for screeding operations to ensure flat surfaces is significantly reduced due to the self-leveling characteristics of the material.

The composition was made from setting a slurry comprising water, the cementitious reactive powder, the alkali metal chemical activator, and the freeze-thaw durability component, wherein the water/cementitious reactive powder weight ratio of the slurry is from 0.30 to 0.55, preferably from 0.35 to 0.45. Upon setting the water is bound to the cementitious reactive powder.

In the compositions and methods of the invention the inorganic mineral comprising alkaline earth metal oxide is alkaline earth metal oxide added in addition to the other ingredients. Thus, for example, it is in addition to any alkaline earth metal oxide which may naturally be in the fly ash. This added alkaline earth metal oxide is preferably calcium oxide (also known as lime or quicklime), or magnesium oxide, or combinations thereof.

The inorganic minerals comprising alkaline earth metal oxide preferred in this invention have an alkaline earth metal oxide content preferably greater than 50 wt. %, more preferably greater than 60 wt. %, even more preferably greater than 70 wt. %, and most preferably greater than 80 wt. %.

The invention also provides a method for making the above-described self-consolidating geopolymer compositions comprising the steps of:
preparing a slurry mixture by mixing
water;
cementitious reactive powder comprising:
thermally activated aluminosilicate mineral in an amount of 100 parts by weight, wherein preferably the thermally activated aluminosilicate mineral comprises at least 75% Class C fly ash,
inorganic mineral comprising alkaline earth metal oxide, wherein the inorganic mineral comprising alkaline earth metal oxide is in an amount of 0.0 to 10, preferably 0.2 to 6, more preferably 0.3 to 3 per 100 parts by weight of thermally activated aluminosilicate mineral,
optionally at least one aluminate cement, and
optionally at least one calcium sulfate; and
cement set retarder in an amount of 0.1 to 4.0, preferably 0.25 to 3.0, more preferably 0.50 to 2 weight % based upon the total weight of the cementitious reactive powder;
alkali metal chemical activator in an amount of 1 to 6, preferably 1.25 to 4, more preferably 1.5 to 2.5 weight % based upon the total weight of the cementitious reactive powder, wherein the alkali metal chemical activator is selected from at least one member of the group consisting of an alkali metal salt and an alkali metal base, wherein potassium citrate is the preferred alkali metal salt chemical activator;
freeze-thaw durability component in an amount of 0.05 to 21.5, preferably 0.1 to 10, more preferably 0.1 to 5 weight % based upon the total weight of the cementitious reactive powder, the freeze-thaw durability component comprising:
air-entraining agent in an amount of 0 to 1, preferably 0.01-0.5, more preferably 0.01-0.2, most preferably 0.05-0.2 weight % based upon the total weight of the cementitious reactive powder,
defoaming agent in an amount of 0 to 0.5, preferably 0-0.25, more preferably 0.01-0.1 weight % based upon the total weight of the cementitious reactive powder, and
surface active organic polymer in an amount of 0 to 20, preferably 0-10, more preferably 0-5 weight % based upon the total weight of the cementitious reactive powder;
wherein at least one member of the group consisting of the air-entraining agent and the surface active organic polymer is present,
wherein the slurry has an air content of about 0% to 20% by volume, more preferably about 2% to 12% by volume, and most preferably about 3% to 8% by volume,
wherein said thermally activated aluminosilicate mineral, said optional aluminate cement, said optional calcium sulfate, and said inorganic mineral comprising alkaline earth metal oxide is at least 70 wt. %, at least 80 wt. %, more preferably at least 95 wt. %, most preferably 100 wt. % of the cementitious reactive powder;

wherein the water/cementitious reactive powder weight ratio of the slurry is from 0.30 to 0.55:1, preferably from 0.35 to 0.45:1,
with the proviso that if the amount of cement set retarder is less than 0.5 wt. % then
the weight ratio of the water/cementitious reactive powder is from 0.35 to 0.55:1, preferably from 0.35 to 0.45:1 and/or
the inorganic mineral comprising alkaline earth metal oxide is in an amount of 0.2 to 10, preferably 0.2 to 6, more preferably 0.3 to 3 parts by weight (pbw) per 100 parts by weight of said thermally activated aluminosilicate mineral,
wherein the slurry mixture has an initial slump diameter and/or one hour slump diameter greater than 18 inches, more preferably greater than 20 inches and most preferably greater than 22 inches when measured in accordance to ASTM C1611-14 and has a final setting time of at least 60 minutes measured in accordance to ASTM C191-13,
setting the slurry to form a set composition.

Preferably the mixture contains at least one member of the group consisting of the air-entraining agent and the surface active organic polymer.

The invention also provides the above self-consolidating geopolymer composition and methods of making same, modified to have the cementitious reactive powder further comprise aluminate cement and calcium sulfate as follows:
aluminate cement in an amount of 1 to 100, preferably 2.5-80, more preferably 5 to 60, most preferably 25 to 40 parts by weight (pbw) per 100 pbw of thermally activated aluminosilicate mineral, wherein preferably the aluminate cement is selected from at least one member of the group consisting of calcium sulfoaluminate cement and calcium aluminate cement, and
calcium sulfate in an amount of 2 to 100, preferably 5 to 75, more preferably 10 to 50 parts by weight per 100 pbw of aluminate cement, wherein the calcium sulfate is selected from at least one of calcium sulfate dihydrate, calcium sulfate hemihydrate, and anhydrous calcium sulfate.

This self-consolidating geopolymer composition, made from cementitious reactive powder which further comprises aluminate cement and calcium sulfate, comprises a slurry mixture of:
water; and
cementitious reactive powder comprising:
thermally activated aluminosilicate mineral in an amount of 100 parts by weight, wherein preferably the thermally activated aluminosilicate mineral comprises at least 75% Class C fly ash,
aluminate cement in an amount of 1 to 100, preferably 2.5-80, more preferably 5 to 60, most preferably 25 to 40 parts by weight (pbw) per 100 pbw of thermally activated aluminosilicate mineral, wherein preferably the aluminate cement is selected from at least one member of the group consisting of calcium sulfoaluminate cement and calcium aluminate cement,
calcium sulfate in an amount of 2 to 100, preferably 5 to 75, more preferably 10 to 50 parts by weight per 100 pbw of aluminate cement, wherein the calcium sulfate is selected from at least one member of the group consisting of calcium sulfate dihydrate, calcium sulfate hemihydrate, and anhydrous calcium sulfate, and
inorganic mineral comprising alkaline earth metal oxide, wherein the inorganic mineral comprising alkaline earth metal oxide is in an amount of 0.0 to 10, preferably 0.2 to 6, more preferably 0.3 to 3 pbw of thermally activated aluminosilicate mineral; and cement set retarder in an amount of 0.1 to 4.0, preferably 0.25 to 3.0, more preferably 0.50 to 2.0 weight % based upon the total weight of the cementitious reactive powder;

alkali metal chemical activator in an amount of 1 to 6, preferably 1.25 to 4, more preferably 1.5 to 2.5 weight % based upon the total weight of the cementitious reactive powder, wherein the alkali metal chemical activator is selected from at least one member of the group consisting of an alkali metal salt and an alkali metal base, wherein potassium citrate is the preferred alkali metal salt chemical activator;

freeze-thaw durability component in an amount of 0.05 to 21.5, preferably 0.1 to 10, more preferably 0.1 to 5 weight % based upon the total weight of the cementitious reactive powder, the freeze-thaw durability component comprising:

air-entraining agent in an amount of 0 to 1, preferably 0.01-0.5, more preferably 0.01-0.2, most preferably 0.05-0.2 weight % based upon the total weight of the cementitious reactive powder, defoaming agent in an amount of 0 to 0.5, preferably 0-0.25, more preferably 0.01-0.1 weight % based upon the total weight of the cementitious reactive powder, and surface active organic polymer in an amount of 0 to 20, preferably 0-10, more preferably 0-5 weight % based upon the total weight of the cementitious reactive powder;

wherein at least one member of the group consisting of the air-entraining agent and the surface active organic polymer is present, wherein the composition has an air content of about 0% to 20% by volume, more preferably about 2% to 12% by volume, and most preferably about 3% to 8% by volume, wherein said thermally activated aluminosilicate mineral, said aluminate cement, said calcium sulfate, and said inorganic mineral comprising alkaline earth metal oxide is at least 70 wt. %, preferably at least 80 wt. %, more preferably at least 95 wt. %, most preferably 100 wt. % of the cementitious reactive powder;

wherein the weight ratio of the water/cementitious reactive powder is from 0.30 to 0.55, preferably from 0.35 to 0.45;

wherein if the amount of cement set retarder is less than 0.5 wt. % the weight ratio of the water/cementitious reactive powder is from 0.35 to 0.55:1, preferably from 0.35 to 0.45:1 and/or the inorganic mineral comprising alkaline earth metal oxide is in an amount of 0.2 to 10, preferably 0.2 to 6, more preferably 0.3 to 3 parts by weight (pbw) per 100 parts by weight of said thermally activated aluminosilicate mineral, wherein the slurry mixture has an initial slump diameter and/or one hour slump diameter greater than 18 inches, more preferably greater than 20 inches and most preferably greater than 22 inches when measured in accordance to ASTM C1611-14 and has a final setting time of at least 60 minutes measured in accordance to ASTM C191-13.

A self-consolidated geopolymer composition was made from setting the slurry mixture comprising the water, the cementitious reactive powder, the alkali metal chemical activator, and the freeze-thaw durability component. Upon setting the water is bound to the cementitious reactive powder.

The method of the invention for making the above-described self-consolidating geopolymer compositions, made from cementitious reactive powder which further comprises aluminate cement, comprises the steps of:

preparing a slurry mixture by mixing
water;
cementitious reactive powder comprising:
thermally activated aluminosilicate mineral in an amount of 100 parts by weight, wherein preferably the thermally activated aluminosilicate mineral comprises at least 75% Class C fly ash, aluminate cement in an amount of 1 to 100, preferably 2.5-80, more preferably 5 to 60, most preferably 25 to 40 parts by weight (pbw) per 100 pbw of thermally activated aluminosilicate mineral, wherein preferably the aluminate cement is selected from at least one member of the group consisting of calcium sulfoaluminate cement and calcium aluminate cement, calcium sulfate in an amount of 2 to 100, preferably 5 to 75, more preferably 10 to 50 parts by weight per 100 pbw of aluminate cement, wherein the calcium sulfate is selected from at least one member of the group consisting of calcium sulfate dihydrate, calcium sulfate hemihydrate, and anhydrous calcium sulfate, and inorganic mineral comprising alkaline earth metal oxide, wherein the inorganic mineral comprising alkaline earth metal oxide is in an amount of 0.0 to 10, preferably 0.2 to 6, more preferably 0.3 to 3 pbw of thermally activated aluminosilicate mineral; and cement set retarder in an amount of 0.1 to 4.0, preferably 0.25 to 3.0, more preferably 0.50 to 2.0 weight % based upon the total weight of the cementitious reactive powder;

alkali metal chemical activator in an amount of 1 to 6, preferably 1.25 to 4, more preferably 1.5 to 2.5 weight % based upon the total weight of the cementitious reactive powder, wherein the alkali metal chemical activator is selected from at least one member of the group consisting of an alkali metal salt and an alkali metal base, wherein potassium citrate is the preferred alkali metal salt chemical activator;

freeze-thaw durability component in an amount of 0.05 to 21.5, preferably 0.1 to 10, more preferably 0.1 to 5 weight % based upon the total weight of the cementitious reactive powder, the freeze-thaw durability component comprising:

air-entraining agent in an amount of 0 to 1, preferably 0.01-0.5, more preferably 0.01-0.2, most preferably 0.05-0.2 weight % based upon the total weight of the cementitious reactive powder, defoaming agent in an amount of 0 to 0.5, preferably 0-0.25, more preferably 0.01-0.1 weight % based upon the total weight of the cementitious reactive powder, and surface active organic polymer in an amount of 0 to 20, preferably 0-10, more preferably 0-5 weight % based upon the total weight of the cementitious reactive powder;

wherein at least one member of the group consisting of the air-entraining agent and the surface active organic polymer is present, wherein the slurry has an air content of about 0% to 20% by volume, more preferably about 2% to 12% by volume, and most preferably about 3% to 8% by volume, wherein said thermally activated aluminosilicate mineral, said aluminate cement, said calcium sulfate, and said inorganic mineral comprising alkaline earth metal oxide is at least 70 wt. %, preferably at least 80 wt. %, more preferably at least 95 wt. %, most preferably 100 wt. % of the cementitious reactive powder;

wherein the water/cementitious reactive powder weight ratio of the slurry is from 0.30 to 0.55, preferably from 0.35 to 0.45, wherein if the amount of cement set retarder is less than 0.5 wt. %
the weight ratio of the water/cementitious reactive powder is from 0.35 to 0.55:1, preferably from 0.35 to 0.45:1 and/or the inorganic mineral comprising alkaline earth metal oxide is in an amount of 0.2 to 10, preferably 0.2 to 6, more preferably 0.3 to 3 parts by weight (pbw) per 100 parts by weight of said thermally activated aluminosilicate mineral,
wherein the slurry mixture has an initial slump diameter and/or one hour slump diameter greater than 18 inches, more preferably greater than 20 inches and most preferably greater than 22 inches when measured in accordance to ASTM C1611-14 and has a final setting time of at least 60 minutes measured in accordance to ASTM C191-13,
setting the slurry to form a set composition.

If aluminate cement and calcium sulfate are present, the cementitious reactive powder typically has 100 pbw thermally activated aluminosilicate mineral, 1-100 pbw aluminate cement per 100 pbw of thermally activated aluminosilicate mineral, 2-100 pbw calcium sulfate per 100 pbw of aluminate cement, and 0.10-10 pbw inorganic mineral comprising alkaline earth metal oxide per 100 pbw of thermally activated aluminosilicate mineral.

If aluminate cement and calcium sulfate are present, the cementitious reactive powder preferably has 100 pbw thermally activated aluminosilicate mineral, 2.5-80 pbw aluminate cement per 100 pbw of thermally activated aluminosilicate mineral, 5-75 pbw calcium sulfate per 100 pbw of aluminate cement, and 0.1-6 pbw inorganic mineral comprising alkaline earth metal oxide per 100 pbw of thermally activated aluminosilicate mineral.

If aluminate cement and calcium sulfate are present, the cementitious reactive powder more preferably has 100 pbw thermally activated aluminosilicate mineral, 5-60 pbw aluminate cement per 100 pbw of thermally activated aluminosilicate mineral, 10-50 pbw calcium sulfate per 100 pbw of aluminate cement, and 0.1-3 pbw inorganic mineral comprising alkaline earth metal oxide per 100 pbw of thermally activated aluminosilicate mineral.

Preferably the compositions of the present invention as well as the set compositions made by methods of the present invention have a freeze-thaw durability performance according to ASTM C666/C 666M-15 of a relative dynamic modulus of greater than 80 percent for at least 100 freeze-thaw cycles, typically at least 300 freeze-thaw cycles, preferably at least 600 freeze-thaw cycles, more preferably at least 900 freeze-thaw cycles, most preferably at least 1200 freeze-thaw cycles.

Preferably the mixtures employed in the present invention contains at least one member of the group consisting of the air-entraining agent and the surface active organic polymer.

The compositions of the invention have a variety of uses. It can be used instead of regular Portland cement concrete for new construction or for repair and rehabilitation of old concrete. The compositions of the invention are suitable for panels, road patch, traffic bearing surfaces, and pavements. The compositions of the invention make an excellent material for concrete repair in both interior and exterior applications. For example, a preferred use is for road patching to repair a pavement or road defect. Typical defects are potholes, sinkholes, or cracks. When used as road patch the slurry is placed into the pavement or road defect and cures to form a patch having good freeze-thaw resistance. Thus, it resists cracking when exposed to multiple freeze-thaw cycles where temperature cycles below 32° F. (freeze) and above 32° F. (thaw).

The freeze-thaw durability component is one or more surface active agents selected from a group comprising of air-entraining agents, defoaming agents, and surface active organic polymers added to entrain air in the aqueous mixture in amounts that enhance and provide desired mechanical and durability performance. The mixture for the composition and method of the invention may incorporate other additives such as water reducing agents, set accelerating or retarding agents, wetting agents, colorants, fibers, rheology and viscosity modifiers, organic polymers, corrosion resistant admixtures, lightweight or other aggregates, or other additives to provide or modify the properties of the slurry and final product.

As used herein, early age strength of the composition is characterized by measuring the compressive strength after 1 to 24 hours of curing. In many applications, relatively higher early age compressive strength can be an advantage for a cementitious material because it can withstand higher stresses without excessive deformation. Achieving high early strength also increases the factor of safety relating to handling and use of manufactured products. Further, due to the achievement of high early strength, many materials and structures can be opened to traffic and allowed to support non-structural and structural loads at an early age. Typically, chemical reactions providing strength development in such compositions will continue for extended periods after the final setting time has been reached.

As used herein, later age strength of the composition is characterized by measuring the compressive strength after 7 days of curing. Ultimate compressive strength is characterized by measuring the compressive strength after 28 days of curing.

The set self-consolidating geopolymer of the invention also exhibits superior compressive strength compared to regular Portland cement concrete. For example, the set self-consolidating geopolymer 24-hour compressive strength may exceed about 1000 psi, more preferably exceeding about 2000 psi, and most preferably exceeding about 3000 psi. The 7-day compressive strength may exceed about 2000 psi, more preferably exceeding about 2500 psi, and most preferably exceeding about 3000 psi. The 28-day compressive strength may exceed about 3000 psi, more preferably exceeding about 4000 psi, and most preferably exceeding about 5000 psi. The 28-day compressive strength for some most preferred self-consolidating geopolymer compositions of this invention can even exceed 7000 psi.

DEFINITIONS

Figure 1:
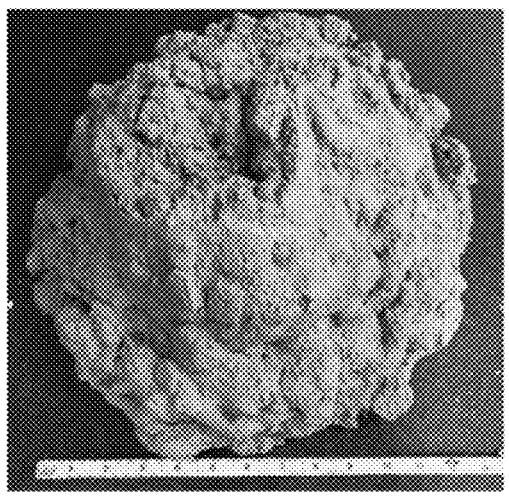
FIG. 1 shows a photograph showing the measured slump diameter of the slump patty of Mix 1 of Example 6 per ASTM C1611-14 (Slump for Mix 1 of Example 6 per ACI 237R-07 is regarded as non-self-consolidating geopolymer composition).

Herein the expression "hydraulic binder (hydraulic cement)" is understood to mean a pulverulent powdery material which, mixed with water, forms a paste which sets and hardens by a series of hydration reactions and processes and which, after hardening, retains its strength and its stability even under water.

The term "gypsum" as used herein is intended to include gypsum such as is normally understood in the art. This would include calcium sulfate ($CaSO_4$) and its various forms such as calcium sulfate anhydrate, calcium sulfate hemihydrate and calcium sulfate dihydrate, as well as calcined gypsum, pressure calcined gypsum and plaster of Paris.

The gypsum should have a minimum purity of 90% and be preferably finely ground to a particle size such that at least 90 wt. %, and preferably at least 99 wt. % of the gypsum particles, based on the total weight of the gypsum particles will pass through a No. 100 U.S. Standard sieve (150 microns).

The term "aluminate cement" as used herein is intended to include those cementitious materials normally understood in the art to contain as the main cementitious constituent, mono calcium aluminate ($CaOAl_2O_3$). The aluminate cements are any member selected from the group of calcium aluminate cement (CAC), calcium sulfoaluminate cement (CSA), calcium sulfoaluminoferrite cement, calcium sulfoferrite cement, calcium fluoaluminate cement, strontium aluminate cement, barium aluminate cement, Type-K expansive cement, Type S expansive cement, and sulfobelite cement. This would preferably include calcium aluminate cement (CAC), calcium sulfoaluminate cement (CSA). Alternative names for calcium aluminate cements are "aluminous cement", and "high-alumina cement". High alumina cement is normally understood in the art to contain greater than 15% of mono calcium aluminate. The surface area of the aluminate cement is preferably greater than about 3,000 $cm^2$/gram, more preferably 3000 to 8000 $cm^2$/gram, and furthermore preferably about 4,000 to 6,000 $cm^2$/gram as measured by the Blaine surface area method (ASTM C 204).

The term "Portland cement" as used herein is intended to include those cements normally understood in the art to be "Portland cement" such as those described in British Standards Institution (BSI) EN-197 and American ASTM Standard C-150 and European Standard EN-197. The types CEM I and CEM II compositions of the latter standard are preferred for use in the present invention, although other forms of Portland cement are also suitable. Portland cement consists mainly of tri-calcium silicate and dicalcium silicate.

A monomer is a substantially mono-disperse compound of low molecular weight—typically less than one thousand Daltons—that is capable of being polymerized.

As used herein terms including "meth" in parentheses, such as "(meth)acrylate," are intended to refer either to the acrylate or to the methacrylate, or mixtures of both. Similarly, the term (meth)acrylamide would refer either to the acrylamide or to the methacrylamide, or mixtures of both, as one skilled in the art would readily understand.

An aqueous dispersion of polymer particles is intended to encompass the meaning of latex polymer and water dispersible polymer.

A "latex" polymer means a dispersion or emulsion of polymer particles formed in the presence of water and one or more secondary dispersing or emulsifying agents (e.g., a surfactant, alkali-soluble polymer or mixtures thereof) whose presence is required to form the dispersion or emulsion. The secondary dispersing or emulsifying agent is typically separate from the polymer after polymer formation. If desired a reactive dispersing or emulsifying agent may become part of the polymer particles as they are formed.

A "water-dispersible" polymer means a polymer in powder form capable of being combined by itself with water, without requiring the use of a secondary dispersing or emulsifying agent, to obtain an aqueous dispersion or emulsion of polymer particles having at least one-month shelf stability at normal storage temperatures.

The term "surface active organic polymer" for the purposes of this invention is defined here as any organic polymeric material that is capable of entraining air in the slurry when the slurry is subjected to mechanical agitation.

The term "storage stable" as it applies to that component of the formulation which contains the hydraulic binder (hydraulic cement), is intended to mean that the hydraulic binder therein remains reactive towards water when mixed therewith after a period of storage, typically up to 1 year or greater.

The term "dry basis" means a water free basis. The term "wet basis" means a water inclusive basis, in other words based on a total aqueous composition.

DETAILED DESCRIPTION OF THE INVENTION

Composition

This invention provides a self-consolidating geopolymer composition comprising a slurry mixture of:
water; and
   cementitious reactive powder comprising:
   thermally activated aluminosilicate mineral in an amount of 100 parts by weight, wherein preferably the thermally activated aluminosilicate mineral comprises at least 75% Class C fly ash, and
   inorganic mineral comprising alkaline earth metal oxide, wherein the inorganic mineral comprising alkaline earth metal oxide is in an amount of 0.0 to 10, preferably 0.2 to 6, more preferably 0.3 to 3 pbw per said 100 parts by weight of thermally activated aluminosilicate mineral,
   optionally at least one aluminate cement, and
   optionally at least one calcium sulfate; and
   cement set retarder in an amount of 0.1 to 4.0, preferably 0.25 to 3.0, more preferably 0.50 to 2.0 weight % based upon the total weight of the cementitious reactive powder;
   alkali metal chemical activator in an amount of 1 to 6, preferably 1.25 to 4, more preferably 1.5 to 2.5 weight % based upon the total weight of the cementitious reactive powder, wherein the alkali metal chemical activator is selected from at least one member of the group consisting of an alkali metal salt and an alkali metal base, wherein potassium citrate is the preferred alkali metal salt chemical activator;
   freeze-thaw durability component in an amount of 0.05 to 21.5, preferably 0.1 to 10, more preferably 0.1 to 5 weight % based upon the total weight of the cementitious reactive powder, the freeze-thaw durability component comprising:
      air-entraining agent in an amount of 0 to 1, preferably 0.01-0.5, more preferably 0.01-0.2, most preferably 0.05-0.2 weight % based upon the total weight of the cementitious reactive powder, defoaming agent in an amount of 0 to 0.5, preferably 0-0.25, more preferably 0.01-0.1 weight % based upon the total weight of the cementitious reactive powder, and surface active organic polymer in an amount of 0 to 20, preferably 0-10, more preferably 0-5 weight % based upon the total weight of the cementitious reactive powder;

wherein at least one member of the group consisting of the air-entraining agent and the surface active organic polymer is present, wherein the composition has an air content of about 0% to 20% by volume, more preferably about 2% to 12% by volume, and most preferably about 3% to 8% by volume, wherein said thermally activated aluminosilicate mineral, said optional aluminate cement, said optional calcium sulfate, and said inorganic mineral comprising alkaline earth metal oxide is at least 70 wt. %, preferably at least 80 wt. %, more preferably at least 95 wt. %, most preferably 100 wt. % of the cementitious reactive powder;

wherein the weight ratio of the water/cementitious reactive powder is from 0.30 to 0.55, preferably from 0.35 to 0.45;

wherein if the amount of cement set retarder is less than 0.5 wt. % the weight ratio of the water/cementitious reactive powder is from 0.35 to 0.55:1, preferably from 0.35 to 0.45:1 and/or the inorganic mineral comprising alkaline earth metal oxide is in an amount of 0.2 to 10, preferably 0.2 to 6, more preferably 0.3 to 3 parts by weight (pbw) per 100 parts by weight of said thermally activated aluminosilicate mineral, wherein the slurry mixture has an initial slump diameter and/or one hour slump diameter greater than 18 inches, more preferably greater than 20 inches and most preferably greater than 22 inches when measured in accordance to ASTM C1611-14 and has a final setting time of at least 60 minutes measured using ASTM C191-13.

Preferably the set composition has a freeze-thaw durability performance according to ASTM C666/C 666M-15 of a relative dynamic modulus of greater than 80 percent for at least 100 freeze-thaw cycles, typically at least 300 freeze-thaw cycles, preferably at least 600 freeze-thaw cycles, more preferably at least 900 freeze-thaw cycles, most preferably at least 1200 freeze-thaw cycles.

The invention also provides a geopolymer composition comprising a mixture of:

cementitious reactive powder comprising:

thermally activated aluminosilicate mineral in an amount of 100 parts by weight, wherein preferably the thermally activated aluminosilicate mineral comprises at least 75% Class C fly ash, aluminate cement in an amount of 1 to 100, preferably 2.5-80, more preferably 5 to 60, most preferably 25 to 40 parts by weight (pbw) per 100 pbw of thermally activated aluminosilicate mineral, wherein preferably the aluminate cement is selected from at least one member of the group consisting of calcium sulfoaluminate cement and calcium aluminate cement, calcium sulfate in an amount of 2 to 100, preferably 5 to 75, more preferably 10 to 50 parts by weight per 100 pbw of aluminate cement, wherein the calcium sulfate is selected from at least one member of the group consisting of calcium sulfate dihydrate, calcium sulfate hemihydrate, and anhydrous calcium sulfate, and inorganic mineral comprising alkaline earth metal oxide, wherein the inorganic mineral comprising alkaline earth metal oxide is in an amount of 0 to 10, preferably 0.2 to 60, more preferably 0.3 to 3 pbw of thermally activated aluminosilicate mineral; and alkali metal chemical activator in an amount of 1 to 6, preferably 1.25 to 4, more preferably 1.5 to 2.5 weight % based upon the total weight of the cementitious reactive powder, wherein the alkali metal chemical activator is selected from at least one member of the group consisting of an alkali metal salt and an alkali metal base, wherein potassium citrate is the preferred alkali metal salt chemical activator;

cement set retarder in an amount of 0.1 to 4.0, preferably 0.25 to 3.0, more preferably 0.50 to 2.0 weight % based upon the total weight of the cementitious reactive powder;

freeze-thaw durability component in an amount of 0.05 to 21.5, preferably 0.1 to 10, more preferably 0.1 to 5 weight % based upon the total weight of the cementitious reactive powder, the freeze-thaw durability component comprising:

air-entraining agent in an amount of 0 to 1, preferably 0.01-0.5, more preferably 0.01-0.2, most preferably 0.05-0.2 weight % based upon the total weight of the cementitious reactive powder, defoaming agent in an amount of 0 to 0.5, preferably 0-0.25, more preferably 0.01-0.1 weight % based upon the total weight of the cementitious reactive powder, and surface active organic polymer in an amount of 0 to 20, preferably 0-10, more preferably 0-5 weight % based upon the total weight of the cementitious reactive powder;

wherein at least one member of the group consisting of the air-entraining agent and the surface active organic polymer is present, wherein the composition has an air content of about 0% to 20% by volume, more preferably about 2% to 12% by volume, and most preferably about 3% to 8% by volume, wherein said thermally activated aluminosilicate mineral, said aluminate cement, said calcium sulfate, and said inorganic mineral comprising alkaline earth metal earth oxide is at least 70 wt. %, preferably at least 80 wt. %, more preferably at least 95 wt. %, most preferably 100 wt. % of the cementitious reactive powder, wherein if the amount of cement set retarder is less than 0.5 wt. % the weight ratio of the water/cementitious reactive powder is from 0.35 to 0.55:1, preferably from 0.35 to 0.45:1 and/or the inorganic mineral comprising alkaline earth metal oxide is in an amount of 0.2 to 10, preferably 0.2 to 6, more preferably 0.3 to 3 parts by weight (pbw) per 100 parts by weight of said thermally activated aluminosilicate mineral, wherein the slurry mixture has an initial slump diameter and/or one hour slump diameter greater than 18 inches, more preferably greater than 20 inches and most preferably greater than 22 inches when measured in accordance to ASTM C1611-14 and has a final setting time of at least 60 minutes measured using ASTM C191-13.

Preferably the set composition has a freeze-thaw durability performance according to ASTM C666/C 666M-15 of a relative dynamic modulus of greater than 80 percent for at least 100 freeze-thaw cycles, typically at least 300 freeze-thaw cycles, preferably at least 600 freeze-thaw cycles, more preferably at least 900 freeze-thaw cycles, most preferably at least 1200 freeze-thaw cycles.

The compositions of the invention are made from setting a slurry comprising water, the cementitious reactive powder, the alkali metal chemical activator, and the freeze-thaw durability component, wherein the water/cementitious reactive powder weight ratio of the slurry is 0.30 to 0.55:1, for example 0.32 to 0.53:1, preferably 0.33 to 0.51:1, for example 0.34 to 0.49:1, and more preferably 0.35 to 0.45:1, for example 0.37 to 0.42:1. Upon setting the water is bound to the cementitious reactive powder.

Preferably the composition has at least one feature selected from the group consisting of an amount of 0.01 to 1 weight % based upon the total weight of the cementitious reactive powder, of air-entraining agent, and an amount of 1 to 20 weight % based upon the total weight of cementitious reactive powder of surface active organic polymer, wherein 80 wt. % of the cementitious reactive powder comprises thermally activated aluminosilicate mineral, the aluminate cement, the calcium sulfate, and the inorganic mineral comprising alkaline earth metal oxide.

The invention also provides a blend for making a self-consolidating geopolymer composition comprising a mixture of:
cementitious reactive powder comprising:
thermally activated aluminosilicate mineral in an amount of 100 parts by weight, wherein preferably the thermally activated aluminosilicate mineral comprises at least 75% Class C fly ash, and
inorganic mineral comprising alkaline earth metal oxide, wherein the inorganic mineral comprising alkaline earth metal oxide is in an amount of 0.0 to 10, preferably 0.2 to 6, more preferably 0.3 to 3 pbw per said 100 parts by weight of thermally activated aluminosilicate mineral,
optionally at least one aluminate cement, and
optionally at least one calcium sulfate; and
retarder in an amount of 0.1 to 4.0, preferably 0.25 to 3.0, more preferably 0.50 to 2.0 weight % based upon the total weight of the cementitious reactive powder;
alkali metal chemical activator in an amount of 1 to 6, preferably 1.25 to 4, more preferably 1.5 to 2.5 weight % based upon the total weight of the cementitious reactive powder, wherein the alkali metal chemical activator is selected from at least one member of the group consisting of an alkali metal salt and an alkali metal base, wherein potassium citrate is the preferred alkali metal salt chemical activator;
freeze-thaw durability component in an amount of 0.05 to 21.5, preferably 0.1 to 10, more preferably 0.1 to 5 weight % based upon the total weight of the cementitious reactive powder, the freeze-thaw durability component comprising:
air-entraining agent in an amount of 0 to 1, preferably 0.01-0.5, more preferably 0.01-0.2, most preferably 0.05-0.2 weight % based upon the total weight of the cementitious reactive powder,
defoaming agent in an amount of 0 to 0.5, preferably 0-0.25, more preferably 0.01-0.1 weight % based upon the total weight of the cementitious reactive powder, and
surface active organic polymer in an amount of 0 to 20, preferably 0-10, more preferably 0-5 weight % based upon the total weight of the cementitious reactive powder;
wherein at least one member of the group consisting of the air-entraining agent and the surface active organic polymer is present,
wherein the composition has an air content of about 0% to 20% by volume, more preferably about 2% to 12% by volume, and most preferably about 3% to 8% by volume,
wherein said thermally activated aluminosilicate mineral, said optional aluminate cement, said optional calcium sulfate, and said inorganic mineral comprising alkaline earth metal oxide is at least 70 wt. %, preferably at least 80 wt. %, more preferably at least 95 wt. %, most preferably 100 wt. % of the cementitious reactive powder;

wherein the blend when mixed with water forms a slurry mixture that has an initial slump diameter and/or one hour slump diameter greater than 18 inches, more preferably greater than 20 inches and most preferably greater than 22 inches when measured in accordance to ASTM C1611-14 and has a final setting time of at least 60 minutes measured using ASTM C191-13 if mixed with water to form a slurry at a weight ratio of the water/cementitious reactive powder from 0.30 to 0.55, preferably from 0.35 to 0.45 with the proviso that if the amount of cement set retarder is less than 0.5 wt. %:
the weight ratio of the water/cementitious reactive powder is from 0.35 to 0.55:1, preferably from 0.35 to 0.45:1 and/or
the inorganic mineral comprising alkaline earth metal oxide is in an amount of 0.2 to 10, preferably 0.2 to 6, more preferably 0.3 to 3 parts by weight (pbw) per 100 parts by weight of said thermally activated aluminosilicate mineral.

Method

The invention also provides a method for making the above-described self-consolidating geopolymer compositions comprising the steps of:
preparing a slurry mixture by mixing
water;
cementitious reactive powder comprising:
thermally activated aluminosilicate mineral in an amount of 100 parts by weight, wherein preferably the thermally activated aluminosilicate mineral comprises at least 75% Class C fly ash,
inorganic mineral comprising alkaline earth metal oxide, wherein the inorganic mineral comprising alkaline earth metal oxide is in an amount of 0.0 to 10, preferably 0.2 to 6, more preferably 0.3 to 3 pbw per 100 parts by weight of thermally activated aluminosilicate mineral,
optionally at least one aluminate cement, and
optionally at least one calcium sulfate; and
cement set retarder in an amount of 0.1 to 4.0, preferably 0.25 to 3.0, more preferably 0.50 to 2.0 weight % based upon the total weight of the cementitious reactive powder;
alkali metal chemical activator in an amount of 1 to 6, preferably 1.25 to 4, more preferably 1.5 to 2.5 weight % based upon the total weight of the cementitious reactive powder, wherein the alkali metal chemical activator is selected from at least one member of the group consisting of an alkali metal salt and an alkali metal base, wherein potassium citrate is the preferred alkali metal salt chemical activator;
freeze-thaw durability component in an amount of 0.05 to 21.5, preferably 0.1 to 10, more preferably 0.1 to 5 weight % based upon the total weight of the cementitious reactive powder, the freeze-thaw durability component comprising:
air-entraining agent in an amount of 0 to 1, preferably 0.01-0.5, more preferably 0.01-0.2, most preferably 0.05-0.2 weight % based upon the total weight of the cementitious reactive powder,
defoaming agent in an amount of 0 to 0.5, preferably 0-0.25, more preferably 0.01-0.1 weight % based upon the total weight of the cementitious reactive powder, and
surface active organic polymer in an amount of 0 to 20, preferably 0-10, more preferably 0-5 weight % based upon the total weight of the cementitious reactive powder;

wherein at least one member of the group consisting of the air-entraining agent and the surface active organic polymer is present, wherein the slurry has an air content of about 0% to 20% by volume, more preferably about 2% to 12% by volume, and most preferably about 3% to 8% by volume, wherein said thermally activated aluminosilicate mineral, said optional aluminate cement, said optional calcium sulfate, and said inorganic mineral comprising alkaline earth metal oxide is at least 70 wt. %, preferably at least 80 wt. %, more preferably at least 95 wt. %, most preferably 100 wt. % of the cementitious reactive powder;

wherein the water/cementitious reactive powder weight ratio of the slurry is from 0.30 to 0.55, preferably from 0.35 to 0.45, with the proviso that if the amount of cement set retarder is less than 0.5 wt. %:
  the weight ratio of the water/cementitious reactive powder is from 0.35 to 0.55:1, preferably from 0.35 to 0.45:1 and/or
  the inorganic mineral comprising alkaline earth metal oxide is in an amount of 0.2 to 10, preferably 0.2 to 6, more preferably 0.3 to 3 parts by weight (pbw) per 100 parts by weight of said thermally activated aluminosilicate mineral, wherein the slurry mixture has an initial slump diameter and/or one hour slump diameter greater than 18 inches, more preferably greater than 20 inches and most preferably greater than 22 inches when measured in accordance to ASTM C1611-14 and has a final setting time of at least 60 minutes measured using ASTM C191-13, setting the slurry to form a set composition.

Preferably the set composition has a freeze-thaw durability performance according to ASTM C666/C 666M-15 of a relative dynamic modulus of greater than 80 percent for at least 100 freeze-thaw cycles, typically at least 300 freeze-thaw cycles, preferably at least 600 freeze-thaw cycles, more preferably at least 900 freeze-thaw cycles, most preferably at least 1200 freeze-thaw cycles.

The invention also provides a method for making the above-described self-consolidating geopolymer compositions, made from cementitious reactive powder which includes aluminate cement, comprising the steps of:
  preparing a slurry mixture by mixing
  water;
  cementitious reactive powder comprising:
  thermally activated aluminosilicate mineral in an amount of 100 parts by weight, wherein preferably the thermally activated aluminosilicate mineral comprises at least 75% Class C fly ash,
  aluminate cement in an amount of 1 to 100, preferably 2.5-80, more preferably 5 to 60, most preferably 25 to 40 parts by weight (pbw) per 100 pbw of thermally activated aluminosilicate mineral, wherein preferably the aluminate cement is selected from at least one member of the group consisting of calcium sulfoaluminate cement and calcium aluminate cement,
  calcium sulfate in an amount of 2 to 100, preferably 5 to 75, more preferably 10 to 50 parts by weight per 100 pbw of aluminate cement, wherein the calcium sulfate is selected from at least one member of the group consisting of calcium sulfate dihydrate, calcium sulfate hemihydrate, and anhydrous calcium sulfate, and
  inorganic mineral comprising alkaline earth metal oxide, wherein the inorganic mineral comprising alkaline earth metal oxide is in an amount of 0.0 to 10, preferably 0.2 to 6, more preferably 0.3 to 3 pbw of thermally activated aluminosilicate mineral; and cement set retarder in an amount of 0.1 to 4.0, preferably 0.25 to 3.0, more preferably 0.50 to 2.0 weight % based upon the total weight of the cementitious reactive powder;

alkali metal chemical activator in an amount of 1 to 6, preferably 1.25 to 4, more preferably 1.5 to 2.5 weight % based upon the total weight of the cementitious reactive powder, wherein the alkali metal chemical activator is selected from at least one member of the group consisting of an alkali metal salt and an alkali metal base, wherein potassium citrate is the preferred alkali metal salt chemical activator;

freeze-thaw durability component in an amount of 0.05 to 21.5, preferably 0.1 to 10, more preferably 0.1 to 5 weight % based upon the total weight of the cementitious reactive powder, the freeze-thaw durability component comprising:
  air-entraining agent in an amount of 0 to 1, preferably 0.01-0.5, more preferably 0.01-0.2, most preferably 0.05-0.2 weight % based upon the total weight of the cementitious reactive powder,
  defoaming agent in an amount of 0 to 0.5, preferably 0-0.25, more preferably 0.01-0.1 weight % based upon the total weight of the cementitious reactive powder, and
  surface active organic polymer in an amount of 0 to 20, preferably 0-10, more preferably 0-5 weight % based upon the total weight of the cementitious reactive powder;

wherein at least one member of the group consisting of the air-entraining agent and the surface active organic polymer is present, wherein the slurry has an air content of about 0% to 20% by volume, more preferably about 2% to 12% by volume, and most preferably about 3% to 8% by volume, wherein said thermally activated aluminosilicate mineral, said aluminate cement, said calcium sulfate, and the inorganic mineral comprising alkaline earth metal oxide is at least 70 wt. %, preferably at least 80 wt. %, more preferably at least 95 wt. %, most preferably 100 wt. % of the cementitious reactive powder;

wherein the water/cementitious reactive powder weight ratio of the slurry is from 0.30 to 0.55, preferably from 0.35 to 0.45, with the proviso that if the amount of cement set retarder is less than 0.5 wt. %:
  the weight ratio of the water/cementitious reactive powder is from 0.35 to 0.55:1, preferably from 0.35 to 0.45:1 and/or
  the inorganic mineral comprising alkaline earth metal oxide is in an amount of 0.2 to 10, preferably 0.2 to 6, more preferably 0.3 to 3 parts by weight (pbw) per 100 parts by weight of said thermally activated aluminosilicate mineral, wherein the slurry mixture has an initial slump diameter and/or one hour slump diameter greater than 18 inches, more preferably greater than 20 inches and most preferably greater than 22 inches when measured in accordance to ASTM C1611-14 and has a final setting time of at least 60 minutes measured using ASTM C191-13, setting the slurry to form a set composition.

Preferably the set composition has a freeze-thaw durability performance according to ASTM C666/C 666M-15 of a relative dynamic modulus of greater than 80 percent for at least 100 freeze-thaw cycles, typically at least 300 freeze-thaw cycles, preferably at least 600 freeze-thaw cycles, more preferably at least 900 freeze-thaw cycles, most preferably at least 1200 freeze-thaw cycles.

Preferably, the water/cementitious reactive powder weight ratio of the slurry is 0.30 to 0.55:1, for example 0.32 to 0.53:1, preferably 0.33 to 0.51:1, for example 0.34 to 0.49:1, and more preferably 0.35 to 0.45:1, for example 0.37 to 0.42:1, wherein the mixture contains at least one member of the group consisting of the air-entraining agent and the surface active organic polymer. At least some of the water being bound to the cementitious reactive powder upon setting.

The Freeze-Thaw Durability Component could be added before water addition along with other raw materials. The cementitious reactive powder, freeze-thaw durability component, and alkali metal chemical activator are preferably combined to form a mixture and then water and air is added. The mixture can be added to the water or the water can be added to the mixture.

The alkali metal chemical activator in dry or liquid form is added to the mixture of cementitious reactive powder. If it is dry it can be added to the mixture before adding water. If liquid, then it is added with the water.

In the compositions and methods, the calcium sulfate is selected from the group consisting of calcium sulfate dihydrate, calcium sulfate hemihydrate, anhydrous calcium sulfate and mixtures thereof (preferably it is added in a fine grain form with particle size less than about 300 microns).

In the compositions and methods, the chemical activator is added to the cementitious reactive powder mixture either in dry or liquid form comprising an alkali metal salt or base preferably selected from the group consisting of alkali metal salts of organic acids, alkali metal hydroxides, and alkali metal silicates. In subsequent steps, water is added and optionally a superplasticizer is added, particularly a carboxylated plasticizer material, to form stable slurry mixtures that can be used in applications suitable for geopolymeric cementitious products.

The compositions of the present invention or made in the methods of the present invention may optionally include calcium sulfoaluminate cements and/or calcium aluminate cements. For example, the invention permits the following three compositions:
 compositions including both a calcium sulfoaluminate cement and a calcium aluminate cement;
 compositions including calcium sulfoaluminate cement but not calcium aluminate cement;
 compositions including only calcium aluminate cement but not calcium sulfoaluminate cement.

The compositions of the invention or made in the method of the present invention may incorporate other additives not considered cementitious reactive powder such as superplasticizers, water reducing agents, set accelerating agents, set retarding agents, wetting agents, fibers, rheology modifiers, organic polymers, shrinkage control agents, viscosity modifying agents (thickeners), film-forming redispersible polymer powders, film-forming polymer dispersions, coloring agents, corrosion control agents, alkali-silica reaction reducing admixtures, discrete reinforcing fibers, and internal curing agents.

The compositions of the invention or made in the method of the present invention may incorporate other additives not considered cementitious reactive powder to provide or modify the properties of the slurry and final product. These additives are pozzolanic mineral, and fillers selected from the group consisting of one or more of sand, lightweight aggregates, lightweight fillers, mineral fillers, and aggregates other than sand.

The compositions of the invention or made in the method of the present invention have no loss in mechanical performance and durability, as demonstrated by the measured parameter relative dynamic modulus, for at least 100 freeze-thaw cycles, typically at least 300 freeze-thaw cycles, preferably at least 600 freeze-thaw cycles, more preferably at least 900 freeze-thaw cycles and most preferably at least 1200 freeze-thaw cycles. The freeze-thaw durability testing is conducted based on ASTM C666—Procedure A. The version of this standard is ASTM C666/C666M-15 (published 2015). The nominal freezing and thawing cycle shall consist of alternately lowering the temperature of the specimens from 40 to 0° F. [4 to −18° C.] and raising it from 0 to 40° F. [−18 to 4° C.] in not less than 2 nor more than 5 hours. The temperature was measured using thermocouple in a freeze-thaw cabinet. The dimensions of the rectangular prism specimen used for freeze-thaw durability testing were as follows: 3 inches (width)×4 inches (thickness)×16 inches (length).

Based on ASTM C666 the durability factor of the test specimen can be calculated as follows:

$$DF = \frac{P \times N}{M}$$

where:
DF=durability factor of the test specimen,
P=relative dynamic modulus of elasticity at N cycles, %,
N=number of cycles at which P reaches the specified minimum value for discontinuing the test or the specified number of cycles at which the exposure is to be terminated, whichever is less, and
M=specified number of cycles at which the exposure is to be terminated. M value based on ASTM C666 is 300.

The compositions of the invention or made in the method of the present invention have beneficial properties as measured by the salt scaling resistance test per ASTM C672/C672M-12, Standard Test Method for Scaling Resistance of Concrete Surfaces Exposed to Deicing Chemicals, ASTM, published 2012. The dimensions of the specimen used for salt scaling durability testing were 8.75 inches (length)× 8.3125 inches (width)×3 inches (thickness).

Initial Slurry Temperature and Slurry Temperature Rise

In the present invention, to form the composition, the Cementitious Reactive Powder Component (thermally activated aluminosilicate mineral, aluminate cement, and calcium sulfate), Activator Component (alkali metal chemical activator), and water are mixed to form a cementitious slurry at an initial slurry temperature. The slurry is formed under conditions which provide a reduced initial mixture slurry temperature and a controlled temperature. This leads to formation of aluminosilicate geopolymer reaction species and setting and hardening of the resulting material. Simultaneously, hydration reactions of calcium silicate as well as calcium aluminate and/or calcium sulfoaluminate phases also occur leading to setting and hardening of the resulting material.

The initial temperature is defined as the temperature of the overall mixture during the first minute after the cementitious reactive powder, activator, and water are first all present in the mixture. Of course the temperature of the overall mixture can vary during this first minute but to achieve preferred thermal stability it will preferably remain within an range initial temperature range of about 0 to about 122° F. (−18 to 50° C.), preferably about 41 to about 104° F. (5 to 40° C.), more preferably about 50 to about 95° F. (10 to 35° C.) and, most preferably ambient temperature (room temperature) of about 77° F. (25° C.).

Increasing the initial temperature of the slurry increases the rate of temperature rise as the reactions proceed and reduces the setting time. Thus, initial slurry temperature of 95° F. (35° C.) to 105° F. (41.1° C.) used in preparing conventional fly ash based geopolymeric compositions for rapid gelation and setting times is preferably avoided since the composition formulation is designed to reduce temperature increase behavior of the mixed composition from the initial slurry temperatures.

The controlled temperature rise is less than about 50° F. (28° C.) to a final composition mixture slurry temperature, more preferably a rise of less than about 40° F. (22° C.) and more preferably a rise of less than about 30° F. (17° C.) for improved temperature stability and more importantly, slower gelation and final setting times of from about 60 to about 120 minutes, more preferably about 60 to about 180 minutes, and more preferably about 60 to about 360 minutes. This allows for more controlled working time for commercial use of the compositions of the invention. The setting time of the slurry is adjusted based on the final use requirements.

Material Exothermic and Temperature Rise Behavior

Compositions of the present invention advantageously achieve moderate heat evolution and low temperature rise within the material during the curing stage. In such compositions, the maximum temperature rise occurring in the material is preferably less than about 50° F. (28° C.), more preferably less than about 40° F. (22° C.), and most preferably less than about 30° F. (17° C.). This prevents excessive thermal expansion and consequent cracking and disruption of material.

Mixing and Aerating

The aqueous mixture of this invention can be aerated by mechanically mixing the slurry comprising freeze-thaw durability component as disclosed in this invention. It has unexpectedly been determined that the high shear mixers (RPM>100) tend to entrain about 2 to 3 times more air in the slurry when compared to the low shear mixers (RPM≤100).

The preferred method for mixing rapid setting geopolymer compositions of the invention with an objective of obtaining superior freeze-thaw durability performance is by utilizing a low shear mixer. Preferably, the low shear mixers useful in this invention are capable of mixing at a speed of 100 RPM or lower. More preferably, the low shear mixers useful in this invention are capable of mixing at a speed of 50 RPM or lower. Most preferably, the low shear mixers useful in this invention are capable of mixing at a speed of 25 RPM or lower.

The preferred slurry mixing time using a low shear mixer (≤100 RPM) is between 2 to 12 minutes. More preferred mixing time using a low shear mixer is between 3 to 10 minutes. The most preferred mixing time using a low shear mixer is between 4 to 8 minutes.

The preferred mixing time using a high shear mixer (>100 RPM) is 1.5 to 8 minutes. More preferred mixing time using a high shear mixer is between 2 to 6 minutes. While the most preferred mixing time using a high shear mixer is between 3 to 4 minutes.

When ready-mix concrete trucks (transit trucks) are used to transport the material long distances, wherein the material sits in the slowly rotating drum of the ready-mix truck for extended durations, the residence time of the geopolymer slurry mixture compositions of this invention can be as long as one to six hours prior to material consumption at the job site. During this period, the material is continually mixed in the slowly rotating drum of the ready-mix truck (transit truck) to keep the material in the plastic state.

Concrete mixers typically used at the concrete ready-mix batching plants are some of the preferred mixers used for mixing and producing the self-consolidating geopolymer compositions of the invention.

Ingredients of the Composition of the Invention or Used in the Method to Make the Composition of the Invention TABLE AA and TABLE AB summarize components of the composition and method of the present invention. Each "Preferred" range or "More Preferred" range is individually a preferred range or more preferred range for the invention. Thus, preferably any "Preferred" range can be independently substituted for a corresponding "Useable range". More preferably any "More Preferred range" can be independently substituted for a corresponding "Useable" range or a corresponding "Preferred range".

TABLE AA

Freeze-Thaw Durable reactive geopolymer cementitious compositions (blends) of the invention (in parts by weight unless otherwise specified)

|  | Useable | Preferred | More Preferred |
|---|---|---|---|
| Cementitious Reactive Powder Component A: |  |  |  |
| a. Thermally activated aluminosilicate mineral (parts by weight, pbw) | 100 | 100 | 100 |
| b. Inorganic mineral comprising alkaline earth metal oxide (pbw per 100 pbw of thermally activated aluminosilicate mineral) | 0 to 10 | 0.2 to 6 | 0.3 to 3 |
| Activator Component B: Alkali metal chemical activator (weight % based upon the total weight of Component A) | 1 to 6% | 1.25 to 4% | 1.5 to 2.5% |
| Inorganic or organic cement set retarder Freeze-Thaw Durability Component C: One or more surface active agents (weight % based upon the total weight of Component A) | 0.1 to 4% | 0.25 to 3% | 0.50 to 2% |
| Air-entraining agent (weight % based upon the total weight of Component A) | 0.0-1% | 0.01-0.5% | 0.05-0.2% |
| Defoaming agent (weight % based upon the total weight of Component A) | 0-0.5% | 0-0.25% | 0.01-0.1% |

TABLE AA-continued

Freeze-Thaw Durable reactive geopolymer cementitious compositions
(blends) of the invention (in parts by weight unless otherwise specified)

|  | Useable | Preferred | More Preferred |
|---|---|---|---|
| Surface active organic polymer (weight % based upon the total weight of Component A) | 0-20% | 0-10% | 1-5% |

The Freeze-Thaw Durability Component C contains at least one member of the group consisting of the air-entraining agent and the surface active organic polymer.

TABLE AB

Freeze-Thaw Durable reactive geopolymer cementitious compositions
(blends) of the invention (in parts by weight unless otherwise specified)

|  | Useable | Preferred | More Preferred |
|---|---|---|---|
| Cementitious Reactive Powder Component A: |  |  |  |
| a. Thermally activated aluminosilicate mineral (parts by weight, pbw) | 100 | 100 | 100 |
| b. aluminate cement (pbw per 100 pbw of thermally activated aluminosilicate mineral) | 1-100 | 2.5-80 | 5-60 |
| c. Calcium sulfate (pbw per 100 pbw of mixture of aluminate cement) | 2-100 | 5-75 | 10-50 |
| d. Inorganic mineral comprising alkaline earth metal oxide (pbw per 100 pbw of thermally activated aluminosilicate mineral) | 0 to 10 | 0.2 to 6 | 0.3 to 3 |
| Activator Component B: |  |  |  |
| Alkali metal chemical activator (weight % based upon the total weight of Component A) | 1 to 6% | 1.25 to 4% | 1.5 to 2.5% |
| Inorganic or organic cement set retarder | 0.1 to 4% | 0.25 to 3% | 0.50 to 2% |
| Freeze-Thaw Durability Component C: |  |  |  |
| One or more surface active agents (weight % based upon the total weight of Component A) |  |  |  |
| Air-entraining agent (weight % based upon the total weight of Component A) | 0-1% | 0.01-0.5% | 0.05-0.2% |
| Defoaming agent (weight % based upon the total weight of Component A) | 0-0.5% | 0-0.25% | 0.01-0.1% |
| Surface active organic polymer (weight % based upon the total weight of Component A) | 0-20% | 0-10% | 1-5% |

The Freeze-Thaw Durability Component C contains at least one member of the group consisting of the air-entraining agent and the surface active organic polymer.

The compositions (blends) in TABLES AA and AB when mixed with water form a slurry mixture that has an initial slump diameter and/or one hour slump diameter greater than 18 inches, more preferably greater than 20 inches and most preferably greater than 22 inches when measured in accordance to ASTM C1611-14 and has a final setting time of at least 60 minutes measured using ASTM C191-13 if mixed with water to form a slurry at a weight ratio of the water/cementitious reactive powder from 0.30 to 0.55, preferably from 0.35 to 0.45 with the proviso that if the amount of cement set retarder is less than 0.5 wt. %:

the weight ratio of the water/cementitious reactive powder is from 0.35 to 0.55:1, preferably from 0.35 to 0.45:1 and/or the inorganic mineral comprising alkaline earth metal oxide is in an amount of 0.2 to 10, preferably 0.2 to 6, more preferably 0.3 to 3 parts by weight (pbw) per 100 parts by weight of said thermally activated aluminosilicate mineral, Cementitious Reactive Powder Component A is the total of the thermally activated aluminosilicate (preferably comprising Class C fly ash), aluminate cement, and calcium sulfate, and, if present, other cements (for example, Portland cement or Calcium Fluoroaluminate). However, Cementitious Reactive Powder Component A is at least 70 wt. %, preferably at least 80 wt. %, more preferably at least 95 wt. %, most preferably 100 wt. % thermally activated aluminosilicate mineral, aluminate cement, calcium sulfate, and inorganic mineral comprising alkaline earth metal oxide.

In the present specification composition percentages and ratios are weight percents and weight ratios unless otherwise specified.

The invention encompasses compositions and methods in which aluminate cement is absent. The invention encompasses compositions and methods in which Calcium aluminate cement is absent. The invention encompasses compositions and methods in which Calcium sulfoaluminate cement is absent. The invention encompasses compositions and methods in which Calcium sulfate is absent. The invention encompasses compositions and methods in which Calcium aluminate cement, Calcium sulfoaluminate cement, and Calcium sulfate are absent.

The invention encompasses compositions and methods in which Calcium sulfoaluminate cement is provided in the absence of Calcium aluminate cement, wherein the composition has Calcium sulfoaluminate cement in an amount of 2-100, preferably 2.5-50, more preferably 5-30, most preferably 25 to 40 parts by weight (pbw) per 100 pbw of thermally activated aluminosilicate mineral.

The invention encompasses compositions and methods in which Calcium aluminate cement is provided in the absence of Calcium sulfoaluminate cement, wherein the composition has Calcium aluminate cement in an amount of 2-100, preferably 2.5-80, more preferably 5-60, most preferably 25 to 40 parts by weight (pbw) per 100 pbw of thermally activated aluminosilicate mineral.

The invention encompasses compositions and methods in which Calcium aluminate cement is provided with Calcium sulfoaluminate cement, wherein the composition has total aluminate cement in an amount of 2-100, preferably 2.5-80, more preferably 5-60, most preferably 25 to 40 parts by weight (pbw) per 100 pbw of thermally activated aluminosilicate mineral.

The invention encompasses compositions and methods in which Portland cement is absent.

The invention encompasses compositions and methods in which Portland cement, Calcium aluminate cement, Calcium sulfoaluminate cement and Calcium sulfate are absent.

The geopolymer cementitious compositions of the present invention can be used where other cementitious materials are used; particularly applications where freeze-thaw resistance is important, setting and working time flexibility, dimensional stability, compressive strength and/or other strength properties are important or necessary.

Slurries used to make compositions of the invention have the amounts of air and water listed in TABLE A-1. Each "Useable" range, "Preferred" range or "More Preferred" range is individually a useable, preferred range or more preferred range for the invention. Thus, the useable ranges of components of TABLE A-1 would be used with the useable ranges of components of TABLES AA and AB. However, preferably any "Preferred" range can be independently substituted for a corresponding "Useable range". More preferably any "More Preferred range" can be independently substituted for a corresponding "Useable" range or a corresponding "Preferred range".

TABLE A-1

Amounts of Air and Water in Compositions of the present invention

|  | Useable | Preferred | More preferred |
|---|---|---|---|
| Water/Cementitious Reactive Powder Component A Ratio (by weight) | 0.30 to 0.55 | 0.35 to 0.45 | 0.35 to 0.45 |
| Air (volume % of slurry) | 0-20 | 4-12 | 4-8 |

As a result, products of the present invention have these amounts of air as void spaces. Also, as a result, products of the present invention have up to these amounts of water bound to the cement by reacting and hydrating the cementitious materials of Component A in presence of Component B. In the invention water is provided to accomplish the chemical hydration and aluminosilicate geopolymerization reactions in compositions of the invention. Hydration reactions of calcium silicate as well as calcium aluminate and/or calcium sulfoaluminate phases also occur leading to setting and hardening of the resulting material. The chemical reaction between cement and water, known as hydration, produces heat known as heat of hydration. Also, when mixed with the water at normal (ambient) temperatures, calcined gypsum reverts chemically to the dihydrate form while physically "setting": $CaSO_4 \cdot \tfrac{1}{2}H_2O + 1\tfrac{1}{2}H_2O \rightarrow CaSO_4 \cdot 2H_2O$. Gypsum is highly soluble and rapidly releases calcium and sulfate into the slurry. The presence of the sulfate ions causes calcium aluminate to react such that Calcium aluminate and $CaSO_4 \cdot 2H_2O$ to form the mineral ettringite.

Calcium sulfates (different forms) react with calcium aluminates to form calcium sulfoaluminate hydrates. Presence of calcium sulfates also appears to influence formation of products of geopolymerization reactions such as sodium alumino silicate hydrate (NASH) gels and calcium alumino silicate hydrate (CASH) gels.

The geopolymer reaction of aluminosilicate mineral such as fly ash with an alkali metal activator such as alkali metal citrate is known to involve an extremely rapid rate of reaction in which significant amount of heat is released due to the exothermic reaction involved. This rapid rate of exothermic reaction leads to the formation of aluminosilicate compounds and the material gels-up and hardens extremely quickly (in a matter of minutes).

Similarly, interaction of calcium sulfoaluminate cement with calcium sulfate also is known to involve an extremely rapid rate of reaction in which significant amount of heat is released due to the exothermic reaction. As a result of this rapid exothermic reaction, hydration products of calcium sulfoaluminate compound are formed and the material gels-up and hardens extremely quickly, again in a matter of minutes. An extremely short setting time is problematic in some applications since it provides a short working life (pot life) that causes significant difficulties with processing and placement of rapid setting material in actual field applications. Also, the large amount of heat generated by the rapid exothermic reactions can lead to undesirable thermal expansion and consequent cracking and disruption of material.

Setting of the composition is characterized by initial and final set times, as measured using Vicat needle specified in the ASTM C191-13 test procedure. The final set time also corresponds to the time when a concrete product, e.g., a concrete panel, has sufficiently hardened so that it can be handled.

The present invention employs the reaction of thermally activated aluminosilicate mineral comprising Class C fly ash, inorganic mineral comprising alkaline earth metal oxide, alkali metal chemical activator, optional aluminate cement (calcium aluminate cement and/or calcium sulfoaluminate cement), and optional calcium sulfate. They interact synergistically with each other as part of the geopolymerization reaction to increase the gelation time and final setting time of the resulting material. Appropriate selection of the type of alkaline earth metal oxide and its amount, the type of calcium sulfate and its amount, the type of aluminate cement and its amount, and the alkali metal chemical activator and its amount are effective in prolonging the gelation rate and period and the final setting time of the resulting material. This allows longer open and working times for the geopolymer cementitious compositions.

Other additives not considered cementitious reactive powder may be incorporated into the slurry and overall geopolymeric cementitious composition of this invention. Such other additives, for example, water reducing agents such as superplasticizers, set accelerating agents, set retarding agents, wetting agents, shrinkage control agents, viscosity modifying agents (thickeners), film-forming redispersible polymer powders, film-forming polymer dispersions, coloring agents, corrosion control agents, alkali-silica reaction reducing admixtures, discrete reinforcing fibers, and internal curing agents. Other additives may include fillers, such as one or more of sand, coarse aggregates, lightweight fillers, pozzolanic minerals, and mineral fillers.

All percentages in the specification are weight percent unless otherwise indicated (for example air percent are volume percent). All ratios in the specification are weight ratios unless otherwise indicated.

TABLE A-2 lists amounts of additives employed in compositions of the present invention. Each "Useable" range, "Preferred" range or "More Preferred" range of TABLE A-2 is individually a useable, preferred range or more preferred range for the invention. Thus, the useable ranges of components of TABLE A-2 would be used with the useable ranges of components of TABLE AA, TABLE AB and TABLE A-1. However, preferably any "Preferred" range can be independently substituted for a corresponding "Useable range". More preferably any "More Preferred range" can be independently substituted for a corresponding "Useable" range or a corresponding "Preferred range".

Some additives of TABLE A-2 are species of ingredients listed in TABLE AA and TABLE AB. For example, TABLE AA and TABLE AB lists Surface active organic polymer. Surface active organic polymer includes Bio-polymers, Organic Rheology Control Agents, and Film-forming polymer additives. Two species of Film-forming polymer additives are Film Forming Redispersible Polymer Powder and Film Forming Polymer Dispersion. Some of the additives of TABLE A-2 are ingredients in addition to those of TABLE AA and TABLE AB, for example pigments.

Preferably there is at least 1 part by weight total fine and coarse aggregate per 1 part total weight of the cementitious reactive powder. More preferably there is 1 to 8 parts by weight total fine and coarse aggregate per 1 part total weight of the cementitious reactive powder.

TABLE B represents full density (preferably densities in the range of 100 to 160 pounds per cubic foot) formulations incorporating the compositions of TABLES AA, AB, A-1 and A-2 and specific amounts of the listed ingredients. These full density compositions employ the amounts of ingredients in TABLE AA, TABLE AB, TABLE A-1, and TABLE A-2 but replace the amounts of fine aggregate (sand) with the amount in TABLE B and have an absence of lightweight filler and coarse aggregate.

TABLE B

Amounts of Fine Aggregate (Sand) for full density compositions in the absence of coarse aggregate and lightweight filler

| Ingredient | Useable | Preferred | More preferred |
|---|---|---|---|
| Fine Aggregate (Sand)/Cementitious Reactive Powder Component A Ratio (by weight) | 0-5:1 | 0.50-4:1 | 0.75-3.5:1 |

TABLE C represents the amounts of sand and lightweight filler for lightweight density (preferably densities in the range of 10 to 125 pounds per cubic foot) compositions incorporating the compositions of TABLE AA or TABLE AB, TABLE A-1, and TABLE A-2. These lightweight compositions employ the amounts of ingredients in TABLE AA, TABLE AB, TABLE A-1, and TABLE A-2 but replace the

TABLE A-2

Additive Ingredient Amounts for Compositions of the Present Invention

| Ingredient* | Useable | Preferred | More preferred |
|---|---|---|---|
| Superplasticizer/Cementitious Reactive Powder Component A (weight %) | 0 to 4.0% | 0.25-2.5% | 0.50-1.5% |
| Fine Aggregate (Sand is a preferred fine aggregate)/Cementitious Reactive Powder Component A Ratio (by weight) | 0-5:1 | 0-4:1 | 1-3.5:1 |
| Inorganic Mineral Filler/Cementitious Reactive Powder Component A Ratio (by weight) | 0-2:1 | 0-1:1 | 0-0.5:1 |
| Organic Rheology Control Agent/Cementitious Reactive Powder Component A (weight %) | 0-0.50% | 0-0.25% | 0-0.15% |
| Inorganic Rheology Control Agent/Cementitious Reactive Powder Component A (weight %) | 0-3% | 0-2% | 0-1% |
| Coloring Pigments/Cementitious Reactive Powder Component A (weight %) | 0-5% | 0-2.5% | 0-1% |
| Efflorescence Suppression Agent/Cementitious Reactive Powder Component A (weight %) | 0-3% | 0-2% | 0-1% |
| Film Forming Redispersible Polymer Powder/Cementitious Reactive Powder Component A (weight %) | 0-20% | 0-10% | 0-5% |
| Film Forming Polymer Dispersion/Cementitious Reactive Powder Component A (weight % of active ingredient) | 0-20% | 0-10% | 0-5% |
| Lightweight Filler/Cementitious Reactive Powder Component A Ratio (by weight) | 0-2:1 | 0-1:1 | 0-0.75:1 |
| Coarse Aggregate/Cementitious Reactive Powder Component A Ratio (by weight) | 0-5.5:1 | 0-5:1 | 0-4.5:1 |
| Naturally-occurring or Non-thermally Activated Pozzolans/Cementitious Reactive Powder Component A Ratio (by weight) | 0-1:1 | 0-0.5:1 | 0-0.25:1 |

*The notation "ingredient/Cementitious Reactive Powder Component A (weight %)" in the present specification, unless otherwise specified, means amount of the ingredient equals the specified weight percent of the Cementitious Reactive Powder Component A. For example, a range of 0-4 wt % for superplasticizer means for 100 pounds of Cementitious Reactive Powder Component A there is additionally 0-4 pounds of superplasticizer.

amounts of sand and lightweight filler with the amounts in TABLE C and have an absence of coarse aggregate.

TABLE C

Amounts of Sand and lightweight filler for lightweight density compositions

| Ingredient | Useable | Preferred | More preferred |
|---|---|---|---|
| Fine Aggregate (Sand)/Cementitious Reactive Powder Component A Ratio (by weight) | 0-4:1 | 0-2:1 | 0-1.5:1 |
| Lightweight Filler/Cementitious Reactive Powder Component A Ratio (by weight) | 0-2:1 | 0.01-1:1 | 0.02-0.75:1 |

TABLE D represents lightweight or full density (preferably densities in the range of 40 to 160 pounds per cubic foot) formulations incorporating the composition of TABLE AA or TABLE AB, coarse aggregate and other ingredients. These compositions employ the amounts of ingredients in TABLE AA, TABLE AB, TABLE A-1, and TABLE A-2 but replace the amounts of fine aggregate (sand), lightweight filler and coarse aggregate with the amounts in TABLE D

TABLE D

Amounts for full or lightweight density compositions incorporating coarse aggregate

| Ingredient | Useable | Preferred | More preferred |
|---|---|---|---|
| Fine Aggregate (Sand)/Cementitious Reactive Powder Component A Ratio (by weight) | 0-5:1 | 0.50-4:1 | 1-3.5:1 |
| Lightweight Filler/Cementitious Reactive Powder Component A Ratio (by weight) | 0-2:1 | 0-1:1 | 0-0.50:1 |
| Coarse Aggregate/Cementitious Reactive Powder Component A Ratio (by weight) | 0.5-5.5:1 | 0.5-5:1 | 1-4.5:1 |

The following describes the individual categories of ingredients.

Cementitious Reactive Mixture

The cementitious reactive mixture of the present invention comprises Cementitious Reactive Powder Component A (also known herein as Cementitious Reactive Material or Cementitious Materials), Activator Component B, and Freeze-Thaw Durability Component C with ranges as shown in TABLE AA and TABLE AB.

In the compositions and methods of the invention the inorganic mineral comprising alkaline earth metal oxide is alkaline earth metal oxide added in addition to the other ingredients. Thus, for example, it is in addition to any alkaline earth metal oxide which may naturally be in the fly ash. This added alkaline earth metal oxide is preferably calcium oxide (also known as lime or quicklime), or magnesium oxide, or combinations thereof.

In addition to the thermally activated aluminosilicate mineral, inorganic mineral comprising alkaline earth metal oxide, optional calcium sulfate, and optional aluminate cement, for example optional calcium aluminate cement, and optional calcium sulfoaluminate cement, the cementitious reactive powder may include about 0 to about 15 wt. % of optional cementitious additives such as Portland cement. However, preferably there is an absence of Portland cement as its incorporation increases the material shrinkage making the material less dimensionally stable. Pozzolans other than thermally activated aluminosilicate mineral are considered part of the cementitious reactive powder. The cementitious reactive powder may have an absence of any one or more of calcium sulfate and aluminate cement, for example calcium aluminate cement and calcium sulfoaluminate cement.

Cementitious Reactive Powder Component A (Also Known Herein as Cementitious Reactive Material or Cementitious Materials)

The Cementitious Reactive Powder Component A comprises thermally activated aluminosilicate mineral and inorganic mineral comprising alkaline earth metal oxide, preferably calcium oxide and/or magnesium oxide. Optionally the Cementitious Reactive Powder Component A further comprises at least one aluminate cement and at least one calcium sulfate. Optionally the Cementitious Reactive Powder Component A comprises other cements and/or non-thermally activated pozzolans.

The aluminate cement is preferably selected from at least one of calcium aluminate cements and calcium sulfoaluminate cements. In other words, at least one calcium aluminate cement, or at least one calcium sulfoaluminate cement, or mixtures thereof.

The calcium sulfate can be any of calcium sulfate dihydrate, calcium sulfate hemihydrate, or calcium sulfate anhydrite.

The thermally activated aluminosilicate mineral is selected from at least one member of the group consisting of fly ash, blast furnace slag, thermally activated clays, shales, metakaolin, zeolites, marl red mud, ground rock, and ground clay bricks. Preferably, they have $Al_2O_3$ content greater than about 5% by weight. Preferably clay or marl is used after thermal activation by heat treatment at temperatures of from about 600° to about 850° C. The preferred thermally activated aluminosilicate minerals of compositions of the invention have high lime (CaO) content in the composition, preferably greater than about 10 wt %, more preferably greater than about 15%, and still more preferably greater than about 20%. The most preferred thermally activated aluminosilicate mineral is Class C fly ash, for example, fly ash procured from coal-fired power plants. The thermally activated aluminosilicate minerals also possess pozzolanic properties.

Thermally activated aluminosilicate minerals are aluminosilicate minerals that have undergone high temperature heat treatment. Preferably thermal activation occurs at a temperature in the range of 750-1500° C.

Fly ash is the preferred thermally activated aluminosilicate mineral in the cementitious reactive powder blend of the invention. Fly ashes containing high calcium oxide and calcium aluminate content, such as Class C fly ashes of ASTM C618 (2008) standard, are preferred as explained below.

Fly ash is a fine powder byproduct formed from the combustion of coal. Electric power plant utility boilers burning pulverized coal produce most commercially available fly ashes. These fly ashes consist mainly of glassy spherical particles as well as residues of hematite and magnetite, char, and some crystalline phases formed during cooling. The structure, composition and properties of fly ash particles depend upon the structure and composition of the coal and the combustion processes by which fly ash is formed. ASTM C618 (2008) standard recognizes two major classes of fly ashes for use in concrete—Class C and Class F. These two classes of fly ashes are generally derived from different kinds of coals that are a result of differences in the coal formation processes occurring over geological time periods. Class F fly ash is normally produced from burning anthracite or bituminous coal, whereas Class C fly ash is normally produced from lignite or sub-bituminous coal.

The ASTM C618 (2008) standard differentiates Class F and Class C fly ashes primarily according to their pozzolanic properties. Accordingly, in the ASTM C618 (2008) standard, the major specification difference between the Class F fly ash and Class C fly ash is the minimum limit of $SiO_2+Al_2O_3+Fe_2O_3$ in the composition. The minimum limit of $SiO_2+Al_2O_3+Fe_2O_3$ for Class F fly ash is 70% and for Class C fly ash is 50%. Thus, Class F fly ashes are more pozzolanic than the Class C fly ashes. Although not explicitly recognized in the ASTM C618 (2008) standard, Class C fly ashes preferably have high calcium oxide (lime) content.

Class C fly ash usually has cementitious properties in addition to pozzolanic properties due to free lime (calcium oxide). Class F is rarely cementitious when mixed with water alone. Presence of high calcium oxide content makes Class C fly ashes possess cementitious properties leading to the formation of calcium silicate and calcium aluminate hydrates when mixed with water.

The thermally activated aluminosilicate mineral comprises Class C fly ash, preferably, about 50 to about 100 parts Class C fly ash per 100 parts thermally activated aluminosilicate mineral, more preferably the thermally activated aluminosilicate mineral comprises about 75 parts to about 100 parts Class C fly ash per 100 parts thermally activated aluminosilicate mineral.

Other types of fly ash, such as Class F fly ash, may also be employed. Preferably, at least about 50 wt. % of the thermally activated aluminosilicate mineral in the cementitious reactive powder is Class C fly ash with the remainder Class F fly ash or any other thermally activated aluminosilicate mineral. More preferably, about 55 to about 75 wt. % of the thermally activated aluminosilicate mineral in the cementitious reactive powder is Class C fly ash with the remainder Class F or any other thermally activated aluminosilicate mineral. Preferably the thermally activated aluminosilicate mineral is about 90 to about 100% Class C fly ash, for example 100% Class C Fly ash.

The average particle size of the thermally activated aluminosilicate minerals of the invention is preferably less than about 100 microns, preferably less than about 50 microns, more preferably less than about 25 microns, and still more preferably less that about 15 microns.

Typically, the mixture composition of the invention has at most about 5 parts metakaolin per 100 parts thermally activated aluminosilicate mineral. Preferably, the compositions of the invention have an absence of metakaolin. Presence of metakaolin has been found to increase the water demand of the mixtures hence its use is generally not desirable in the geopolymer compositions of the invention.

Minerals often found in fly ash are quartz ($SiO_2$), mullite ($Al_6Si_2O_{13}$), gehlenite ($Ca_2Al_2SiO_7$), hematite ($Fe_2O_3$), magnetite ($Fe_3O_4$), among others. In addition, aluminum silicate polymorphs minerals commonly found in rocks such as sillimanite, kyanite and andalusite all three represented by molecular formula of $Al_2SiO_5$ are also often found in fly ash.

Fly ash can also include calcium sulfate or another source of sulfate ions which may be in the mixture composition of the invention.

The fineness of the fly ash is preferably such that less than about 34% is retained on a 325 mesh sieve (U.S. Series) as tested on ASTM Test Procedure C-311 (2011) ("Sampling and Testing Procedures for Fly Ash as Mineral Admixture for Portland Cement Concrete"). The average particle size of the fly ash materials of the invention is typically less than about 50 microns, preferably less than about 35 microns, more preferably less than about 25 microns, and still more preferably less than about 15 microns. This fly ash is preferably recovered and used dry because of its self-setting nature.

Class C fly ash made from sub-bituminous coal has the following representative composition listed in TABLE E. This fly ash is preferably recovered and used dry because of its self-setting nature. TABLE F lists the composition of a preferred suitable Class F fly ash.

TABLE E

An example of suitable Class C fly ash

| Component | Proportion (wt. %) |
|---|---|
| $SiO_2$ | 20-45 |
| $Al_2O_2$ | 10-30 |
| $Fe_2O_3$ | 3-15 |
| MgO | 0.5-8 |
| $SO_3$ | 0.5-5 |
| CaO | 15-60 |
| $K_2O$ | 0.1-4 |
| $Na_2O$ | 0.5-6 |
| Loss on Ignition | 0-5 |

TABLE F

An example of suitable Class F fly ash

| Component | Proportion (wt. %) |
|---|---|
| $SiO_2$ | 50-70 |
| $Al_2O_2$ | 10-40 |
| $Fe_2O_3$ | 1-10 |
| MgO | 0.5-3 |
| $SO_3$ | 0-4 |
| CaO | 0-10 |
| $K_2O$ | 0.1-4 |
| $Na_2O$ | 0.1-6 |
| Loss on Ignition | 0-5 |

Hydraulic Cements

Hydraulic cements for purposes of this invention is a cement that undergoes a chemical setting reaction when it comes in contact with water (hydration) and which will not only set (cure) under water but also forms a water-resistant product.

Hydraulic cements include, but are not limited to, aluminum silicate cements like Portland cement, calcium aluminate cement, calcium sulfoaluminate cement, calcium sulfoaluminoferrite cement, calcium sulfoferrite cement, calcium fluroaluminate cement, strontium aluminate cement, barium aluminate cement, Type-K expansive cement, Type S expansive cement, and sulfobelite cement. Compositions of invention may comprise one or more hydraulic cements added as part of cementitious reactive powder.

Calcium Aluminate Cements

Calcium aluminate cement (CAC) is a hydraulic cement that may form a component of the cementitious reactive powder blend of the invention.

Calcium aluminate cement (CAC) is also commonly referred to as aluminous cement or high alumina cement. Calcium aluminate cements have a high alumina content, preferably about 30-45 wt. %. Higher purity calcium aluminate cements are also commercially available in which the alumina content can range as high as about 80 wt %. These higher purity calcium aluminate cements tend to be relatively more expensive. The calcium aluminate cements for use in the invention are finely ground to facilitate entry of the aluminates into the aqueous phase so rapid formation of ettringite and other calcium aluminate hydrates can take place. The surface area of the calcium aluminate cement is preferably greater than about 3,000 cm$^2$/gram, more preferably 3000 to 8000 cm$^2$/gram, and further more preferably about 4,000 to 6,000 cm$^2$/gram as measured by the Blaine surface area method (ASTM C 204).

Several manufacturing methods have emerged to produce calcium aluminate cement worldwide. Typically, the main raw materials used in the manufacturing of calcium aluminate cement are bauxite and limestone. One manufacturing method used for producing calcium aluminate cement is described as follows. The bauxite ore is first crushed and dried, then ground along with limestone. The dry powder comprising of bauxite and limestone is then fed into a rotary kiln. A pulverized low-ash coal is used as fuel in the kiln. Reaction between bauxite and limestone takes place in the kiln and the molten product collects in the lower end of the kiln and pours into a trough set at the bottom. The molten clinker is quenched with water to form granulates of the clinker, which is then conveyed to a stock-pile. This granulate is then ground to the desired fineness to produce the final cement.

Several calcium aluminate compounds are formed during the manufacturing process of calcium aluminate cements. The predominant compound formed is monocalcium aluminate (CaO.Al$_2$O$_3$, also referred to as CA), in one type of calcium aluminate cement. In another type of calcium aluminate cement, 12CaO.7Al$_2$O$_3$ also referred to as $C_{12}A_7$ or dodeca calcium hepta aluminate is formed as the primary calcium aluminate reactive phase. Other calcium aluminate and calcium silicate compounds formed in the production of calcium aluminate cements include CaO.2Al$_2$O$_3$ also known as $CA_2$ or calcium dialuminate, dicalcium silicate (2CaO.SiO$_2$, also known as $C_2S$), dicalcium alumina silicate (2CaO.Al$_2$O$_3$. SiO$_2$, also known as $C_2AS$). Several other compounds containing relatively high proportion of iron oxides are also formed. These include calcium ferrites such as CaO.Fe$_2$O$_3$ or CF and 2CaO.Fe$_2$O$_3$ or $C_2F$, and calcium alumino-ferrites such as tetracalcium aluminoferrite (4CaO.Al$_2$O$_3$.Fe$_2$O$_3$ or $C_4AF$), 6CaO.Al$_2$O$_3$. 2Fe$_2$O$_3$ or $C_6AF_2$) and 6CaO.2Al$_2$O$_3$.Fe$_2$O$_3$ or $C_6A_2F$). Other minor constituents present in the calcium aluminate cement include magnesia (MgO), titania (TiO$_2$), sulfates and alkalis. The preferred calcium aluminate cements can have one or more of the aforementioned phases. Calcium aluminate cements having monocalcium aluminate (CaO.Al$_2$O$_3$ or CA) and/or dodeca calcium hepta aluminate (12CaO.7Al$_2$O$_3$ or $C_{12}A_7$) as predominant phases are particularly preferred. Further, the calcium aluminate phases can be in crystalline form and/or amorphous form. CIMENT FONDU (or HAC FONFU), SECAR 51, and SECAR 71 are some examples of commercially available calcium aluminate cements that have the monocalcium aluminate (CA) as the primary cement phase. TERNAL EV is an example of commercially available calcium aluminate cement that has the dodeca calcium hepta aluminate (12CaO.7Al$_2$O$_3$ or $C_{12}A_7$) as the predominant cement phase.

Compositions of the invention comprise about 2 to 100 parts by weight calcium aluminate cement per 100 pbw of mixture of at least one of calcium sulfoaluminate cement and calcium aluminate cement.

When calcium aluminate cement is used in the present invention, it may be used with calcium sulfoaluminate cement or be used in the absence of calcium sulfoaluminate cement.

Compositions of the present invention using calcium aluminate cement (CAC) in the absence of calcium sulfoaluminate (CSA) cement comprise about 2 to about 100 parts, more preferably about 2.5 to about 80 parts, even more preferably about 5 to about 60 parts by weight (pbw) CAC per 100 pbw of thermally activated aluminosilicate mineral.

To provide a significant degree of dimensional stability and/or shrinkage control to prevent cracking, delamination and other modes of failure, the amount of calcium aluminate cement is preferably about 5 to about 75, more preferably about 10 to 50 parts by weight (pbw) per 100 pbw of a mixture of calcium sulfoaluminate cement and calcium aluminate cement.

Calcium Sulfoaluminate (CSA) Cements

Calcium sulfoaluminate (CSA) cements are a different class of cements from calcium aluminate cement (CAC) or calcium silicate based hydraulic cements, for example, Portland cement. CSA cements are hydraulic cements based on calcium sulphoaluminate. In contrast, calcium aluminates are the basis of CAC cement and calcium silicates are the basis of Portland cement. Calcium sulfoaluminate cements are made from clinkers that include Ye'elimite (Ca$_4$(AlO$_2$)$_6$ SO$_4$ or C$_4$A$_3$Š) as a primary phase. Other major phases present in the CSA may include one or more of the following: dicalcium silicate (C$_2$S), tetracalcium aluminoferrite (C$_4$AF), and calcium sulfate (CŠ). The relatively low lime requirement of calcium sulfoaluminate cements compared to Portland cement reduces energy consumption and emission of greenhouse gases from cement production. In fact, calcium sulfoaluminate cements can be manufactured at temperatures approximately 200° C. lower than Portland cement, thus further reducing energy and greenhouse gas emissions. The amount of calcium sulfoaluminate cement that may be used in the compositions of the invention is adjustable based on the amount of active Ye'elimite phase (Ca$_4$(AlO$_2$)$_6$SO$_4$ or C$_4$A$_3$Š) present in the CSA cement. The amount of Ye'elimite phase (Ca$_4$(AlO$_2$)$_6$SO$_4$ or C$_4$A$_3$Š) present in the calcium sulfoaluminate cements useful in this invention is preferably about 20 to about 90 wt % and more preferably 30 to 75 wt %.

When calcium sulfoaluminate (CSA) cement is used in the present invention, it may be used with calcium aluminate cement or be used in the absence of calcium aluminate cement.

Preferably compositions of the present invention comprising the calcium sulfoaluminate cement and the calcium aluminate cement, have an amount of calcium aluminate cement of about 5 to about 75, more preferably about 10 to 50, most preferably about 30 to 45 parts by weight (pbw) per 100 pbw of total calcium sulfoaluminate cement and calcium aluminate cement.

The surface area of the calcium sulfoaluminate cement is preferably greater than about 3,000 cm$^2$/gram, more preferably 3000 to 8000 cm$^2$/gram, and further more preferably about 4,000 to 6,000 cm$^2$/gram as measured by the Blaine surface area method (ASTM C 204).

Compositions of the present invention using calcium sulfoaluminate (CSA) cement in the absence of calcium aluminate cement (CAC) comprise about 2 to about 100 parts, more preferably about 2.5 to about 80 parts, even more preferably about 5 to about 60 parts by weight (pbw) CSA per 100 pbw of thermally activated aluminosilicate mineral.

Calcium Fluoroaluminate Cement

The cementitious reactive powder of the invention may have about 0 to about 20 parts by weight total calcium fluoroaluminate relative to 100 parts by weight fly ash.

Calcium fluoroaluminate has the chemical formula $3CaO.3Al_2O_3.CaF_2$. The calcium fluoroaluminate is often produced by mixing lime, bauxite and fluorspar in such an amount that the mineral of the resulting product becomes $3CaO.3Al_2O_3.CaF_2$ and burning the resulting mixture at a temperature of about 1,200°-1,400° C. Calcium fluoroaluminate cements may optionally be used in the present invention.

Preferably compositions of the present invention have an absence of calcium fluoroaluminate cement.

Calcium Sulfate

Calcium sulfate may be an ingredient of the geopolymer compositions of the invention. Although calcium sulfate, e.g., calcium sulfate dihydrate will react with water, it does not form a water resistant product and it is not considered to be hydraulic cement for purposes of this invention. Suitable Calcium sulfate types include calcium sulfate dihydrate, calcium sulfate hemihydrate and anhydrous calcium sulfate (anhydrite). These calcium sulfates may be available naturally or produced industrially. Calcium sulfates may synergistically interact with the other fundamental components of the cementitious compositions of the invention and thereby help to minimize material shrinkage while imparting other useful properties to the final material.

Different morphological forms of calcium sulfate can be usefully employed in the present invention. The properties of the geopolymer compositions and composites of the invention may depend on the type of calcium sulfate used based on its chemical composition, particle size, crystal morphology, and chemical and thermal treatment. Amongst other properties, the setting behavior, rate of strength development, ultimate compressive strength, shrinkage behavior, and cracking resistance of the geopolymer compositions of the invention can be tailored by selecting a proper source of calcium sulfate in the formulation. Thus, the selection of the type of calcium sulfate used is based on the balance of properties sought in the end application.

Particle size and morphology of calcium sulfate may influence the development of early age and ultimate strengths of the geopolymer cementitious compositions of the invention. In general, a smaller particle size of calcium sulfate has been found to provide a more rapid development in early age strength. When it is desirable to have an extremely rapid rate of strength development, the preferred average particle size of calcium sulfate ranges is about 1 to about 100 microns, more preferably about 1 to about 50 microns, and still more preferably about 1 to about 25 microns. Furthermore, calcium sulfates with finer particle size may result in lower material shrinkage.

All three forms of calcium sulfate (primarily hemihydrate, dihydrate and anhydrite) are useful. The most soluble form of calcium sulfate is the hemihydrate, followed by the relatively lower solubility form of the dihydrate, and then followed by the relatively insoluble form of the anhydrite. All three forms are themselves known to set (form matrices of the dihydrate chemical form) in aqueous media under appropriate conditions, and the setting times and compressive strengths of the set forms are known to follow their order of solubility. For example, all other things being equal, employed alone as the sole setting material, the hemihydrate usually has the shortest set times and the anhydrite the longest set times (typically very long set times).

The particle size and morphology of calcium sulfate provides a significant and surprising influence on development of early age strength (less than about 24 hours) of the compositions. The use of a relatively a small particle size calcium sulfate provides a more rapid development in early age compressive strength. The preferred average particle size of calcium sulfate ranges from about 1 to 100 microns, more preferably from about 1 to 50 microns, and most preferably from about 1 to 25 microns.

The amount of calcium sulfate present in proportion to mixture of calcium sulfoaluminate cement and calcium aluminate cement in the composition can moderate potential adverse effects, such as shrinkage, of geopolymer compositions of the invention. The amount of calcium sulfate in geopolymer compositions of the invention is about 2 to about 100, preferably about 5 to about 75, and most preferably about 10 to about 50 parts by weight relative to 100 parts by weight of the mixture of calcium sulfoaluminate cement and calcium aluminate cement.

The calcium sulfate may be added as a separate component or all or part of the calcium sulfate may be provided as part of the calcium aluminate cement or calcium sulfoaluminate cement.

Inorganic Minerals Comprising Alkaline Earth Metal Oxide

In the compositions and methods of the invention the inorganic mineral comprising alkaline earth metal oxide is alkaline earth metal oxide added in addition to the other ingredients. Thus, for example, it is in addition to any alkaline earth metal oxide which may naturally be in the fly ash. This added alkaline earth metal oxide is preferably calcium oxide (also known as lime or quicklime), or magnesium oxide, or combinations thereof. Type G component additives as specified in ACI 223R-10 are examples of some preferred inorganic minerals comprising alkaline earth metal oxide used in production of the self-consolidating geopolymer compositions of this invention.

The cementitious reactive powder of the invention may have inorganic mineral comprising alkaline earth metal oxide in an amount of 0 to 10, preferably 0.2 to 6, more preferably 0.3 to 3 pbw of thermally activated aluminosilicate mineral. The inorganic minerals comprising alkaline earth metal oxide preferred in this invention have an alkaline earth metal oxide content preferably greater than 50 wt %, more preferably greater than 60 wt %, even more preferably greater than 70 wt %, and most preferably greater than 80 wt %, for example greater than 90 wt %.

The preferred alkaline earth metal oxides of the invention include calcium oxide and magnesium oxide. They are typically obtained by calcination of rocks such as limestone, dolomite, and magnesite. The metal oxides can be lightly burned, hard burned, or dead burned. For instance, when magnesium oxide is used as part of the cementitious reactive powder of this invention, it can be lightly burned, moderately burned or dead burned. The calcination temperature of raw materials is instrumental in controlling the reactivity of the alkaline earth metal oxide powder. The inorganic mineral comprising alkaline earth metal oxide powders useful in the present invention can either be predominantly calcium oxide or magnesium oxide. The inorganic mineral comprising alkaline earth metal oxide powders useful in the present invention can also be mixtures of both calcium oxide and magnesium oxide.

Hydraulic cement clinkers such as Portland cement clinker burnt at high temperature and comprising free lime as a major component and calcium silicates, ferro-aluminates, and sulfates as minor components may also be used as the inorganic mineral comprising alkaline earth metal oxide in the present invention. Impurities such as calcium carbonate or magnesium carbonate may also be present along with alkaline earth metal oxide in the material. Reactivity of the metal oxide particles may be controlled by addition of other types of organic compounds or inorganic minerals. The particles of inorganic mineral comprising alkaline earth metal oxide may optionally be coated on the surface with organic or inorganic coating materials to tailor reactivity of the particles. Additional functional coatings may be applied on the surface of the particles to impart special properties such as set retardation, water reduction, shrinkage reduction, powder flow aids, etc.

Further, the size of inorganic mineral comprising alkaline earth metal oxide particles may be tailored to control the reactivity of the particles. The median size of the inorganic mineral comprising alkaline earth metal oxide particles is preferably less than 100 microns, more preferably less than 75 microns and most preferably less than 50 microns.

Upon addition of water, the inorganic mineral comprising alkaline earth metal oxide particles undergo a chemical reaction forming either calcium hydroxide or magnesium hydroxide crystals. Furthermore, while the exact chemical reaction mechanisms are not fully understood at this time, it is the understanding of the inventor that inorganic mineral comprising alkaline earth metal oxides also actively participate in the geopolymeric reactions involving thermally activated aluminosilicate minerals and alkali metal chemical activators. The inorganic mineral comprising alkaline earth metal oxide particles play a multifunctional role in the inorganic geopolymer compositions of the present invention. For instance, they are instrumental in tailoring rheology, setting characteristics, compressive strength, and dimensional movement characteristics of the geopolymer compositions of the present invention.

Portland Cement

The cementitious reactive powder of the invention may have about 0 to about 15 parts by weight total Portland cement relative to 100 parts by weight thermally activated aluminosilicate mineral.

The low cost and widespread availability of the limestone, shales, and other naturally occurring materials make Portland cement one of the lowest-cost materials widely used over the last century throughout the world. As used herein, "Portland cement" is a calcium silicate based hydraulic cement. ASTM C150 defines Portland cement as "hydraulic cement (cement that not only hardens by reacting with water but also forms a water-resistant product) produced by pulverizing clinkers consisting essentially of hydraulic calcium silicates, usually containing one or more of the forms of calcium sulfate as an interground addition." As used herein, "clinkers" are nodules (diameters, about 0.2-about 1.0 inch [5-25 mm]) of a sintered material that are produced when a raw mixture of predetermined composition is heated to high temperature.

Preferably there is an absence of Portland cement in compositions of the present invention. It has been found addition of Portland cement to the geopolymer compositions of the present invention increases the shrinkage of the resulting compositions. The magnitude of observed shrinkage increases with increase in the amount of Portland cement in the resulting compositions.

"Naturally-occurring and Non-thermally activated" Pozzolans

The cementitious reactive powder of the invention may have about 0 to about 20 parts by weight total naturally-occurring and non-thermally activated pozzolans relative to 100 parts by weight fly ash.

Preferably there is an absence of naturally-occurring and non-thermally activated pozzolans in compositions of the present invention.

The above-discussed thermally activated aluminosilicate mineral additives have pozzolanic properties. However, in addition to the above-discussed fly ash, other pozzolans can also be included as optional silicate and aluminosilicate mineral additives in the compositions of the invention. ASTM C618 (2008) defines pozzolanic materials as "siliceous or siliceous and aluminous materials which in themselves possess little or no cementitious value, but will, in finely divided form and in the presence of moisture, chemically react with calcium hydroxide at ordinary temperatures to form compounds possessing cementitious properties."

Various natural and man-made materials have been referred to as pozzolanic materials possessing pozzolanic properties. Some examples of pozzolanic materials include silica fume, pumice, perlite, diatomaceous earth, finely ground clay, finely ground shale, finely ground slate, finely ground glass, volcanic tuff, trass, and rice husk. All of these pozzolanic materials can be used either singly or in combined form as part of the cementitious reactive powder of the invention.

Alkali Metal Chemical Activators Component B

The Activator Component B comprises alkali metal chemical activator.

In compositions of the invention, alkali metal salts and bases are useful as alkali metal chemical activators to activate the Reactive Powder Component A comprising thermally activated aluminosilicate mineral such as fly ash, aluminate cement, and calcium sulfate. The alkali metal activators of this invention can be added in liquid or solid form. The preferred alkali metal chemical activators of this invention are metal salts of organic acids. The more preferred alkali metal chemical activators of this invention are alkali metal salts of carboxylic acids. Alkali metal hydroxides and alkali metal silicates are some other examples of alkali metal chemical activator of this invention. Alternatively, alkali metal hydroxides and alkali metal silicates can also be used in combination with carboxylic acids such as citric acid to provide chemical activation of cementitious reactive powder blend comprising thermally activated aluminosilicate mineral, aluminate cement, and calcium sulfate. The preferred alkali metal citrates are potassium citrates and sodium citrates and particularly tri-potassium citrate monohydrate, and tri-sodium citrate anhydrous, tri-sodium citrate monohydrate, sodium citrate dibasic sesquihydrate, tri-sodium citrate dihydrate, di-sodium citrate, and mono-sodium citrate. Potassium citrate is the most preferred alkali metal salt activator in this invention.

Employing alkali metal salts of citric acid such as sodium or potassium citrate in combination with the cementitious reactive powder blend comprising thermally activated aluminosilicate mineral comprising Class C fly ash, aluminate cement, and calcium sulfate, provides mixture compositions with relatively good fluidity and which do not stiffen too quickly, after mixing the raw materials at about 68-77° F. (20-25° C.).

The amount of alkali metal salt of citric acid, e.g., potassium citrate or sodium citrate, is about 0.5 to about 10 wt. %, preferably about 1.0 to about 6 wt. %, preferably about 1.25 to about 4 wt. %, more preferably about 1.5 to about 2.5 wt. % and still more preferably about 2 wt % based on 100 parts of the cementitious reactive components (i.e., Cementitious Reactive Powder Component A). Thus, for example, for 100 pounds of cementitious reactive powder, there may be about 1.25 to about 4 total pounds of potassium and/or sodium citrates.

If desired the activator does not contain an alkanolamine. Also, if desired the activator does not contain a phosphate.

Air and Water

Important factors that have been determined to affect the freeze-thaw durability behavior of the material include the air content of the material and the water/cementitious reactive powders ratio.

An important invention objective was to obtain a stable air-void system which is independent of mixing time employed. A stable system is defined as the one where the air content of the material does not vary significantly with change in the mixing time employed. A stable air-void system in turn provides satisfactory freeze-thaw durability performance.

Surprisingly a desired and stable amount of air in the geopolymer composition of the invention is entrained by means of utilizing a combination of various additives including air-entraining agents, defoamers and organic polymers. The other critical factors that affect the air content include the water to cementitious materials ratio, gravel to cementitious materials ratio, mixing time, and mixing methods.

To obtain freeze-thaw durability behavior in accordance to this invention, the air content is about 1% to 20% by volume, more preferably about 2% to 12% by volume, and the most preferably about 3% to 8% by volume.

Unexpectedly, the addition of 0.1 wt % of certain air entraining agents increases the air by close to 1% or more and the addition of 0.01 wt % of certain defoamers decreases the air by close to 1% or more.

The water/cementitious reactive powders ratio in the preferred compositions of the invention is 0.30 to 0.55:1, for example 0.32 to 0.53:1, preferably 0.33 to 0.51:1, for example 0.34 to 0.49:1, and more preferably 0.35 to 0.45:1, for example 0.37 to 0.42:1, wherein if the amount of cement set retarder is less than 0.5 wt. %
    the weight ratio of the water/cementitious reactive powder is from 0.35 to 0.55:1, preferably from 0.35 to 0.45:1 and/or the inorganic mineral comprising alkaline earth metal oxide is in an amount of 0.2 to 10, preferably 0.2 to 6, more preferably 0.3 to 3 parts by weight (pbw) per 100 parts by weight of said thermally activated aluminosilicate mineral.

Freeze-Thaw Durability Component C

The Freeze-Thaw Durability Component C comprises an air-entraining agent and/or surface active organic polymer. The Freeze-Thaw Durability Component C may further comprise a defoaming agent.

Air Entraining Agent

If desired, air entraining agents (also known as foaming agents) are added to the cementitious slurry of the invention to form air bubbles (foam) in situ. Air entraining agents are preferably surfactants used to purposely trap microscopic air bubbles in the concrete. Alternatively, air entraining agents are employed to externally produce foam which is introduced into the mixtures of the compositions of the invention during the mixing operation to reduce the density of the product. Preferably to externally produce foam the air entraining agent (also known as a liquid foaming agent), air and water are mixed to form foam in a suitable foam generating apparatus. A foam stabilizing agent such as polyvinyl alcohol can be added to the foam before the foam is added to the cementitious slurry.

Examples of air entraining/foaming agents include alkyl sulfonates, alkylbenzolsulfonates and alkyl ether sulfate oligomers among others. Details of the general formula for these foaming agents can be found in U.S. Pat. No. 5,643,510 incorporated herein by reference.

An air entraining agent (foaming agent) such as that conforming to standards as set forth in ASTM C 260 "Standard Specification for Air-Entraining Admixtures for Concrete" (Aug. 1, 2006) can be employed. Such air entraining agents are well known to those skilled in the art and are described in the Kosmatka et al "Design and Control of Concrete Mixtures," Fourteenth Edition, Portland Cement Association, specifically Chapter 8 entitled, "Air Entrained Concrete," (cited in US Patent Application Publication No. 2007/0079733 A1).

Suitable air entraining (foaming) agents include water soluble salts (usually sodium) of wood resin, vinsol resin, wood rosin, tall oil rosin, or gum rosin; non-ionic surfactants (e.g., such as those commercially available from BASF under the trade name TRITON X-100); sulfonated hydrocarbons; proteinaceous materials; or fatty acids (e.g., tall oil fatty acid) and their esters.

Commercially available air entraining materials include vinsol wood resins, sulfonated hydrocarbons, fatty and resinous acids, aliphatic substituted aryl sulfonates, such as sulfonated lignin salts and numerous other interfacially active materials which normally take the form of anionic or nonionic surface active agents (surfactants), sodium abietate, saturated or unsaturated fatty acids and salts thereof, tensides, alkyl-aryl-sulfonates, phenol ethoxylates, lignosulfonates, resin soaps, sodium hydroxystearate, lauryl sulfate, ABSs (alkylbenzenesulfonates), LASs (linear alkylbenzenesulfonates), alkanesulfonates, polyoxyethylene alkyl (phenyl)ethers, polyoxyethylene alkyl(phenyl)ether sulfate esters or salts thereof, polyoxyethylene alkyl(phenyl)ether phosphate esters or salts thereof, proteinic materials, alkenylsulfosuccinates, alpha-olefinsulfonates, a sodium salt of alpha olefin sulphonate, or sodium lauryl sulphate or sulphonate and mixtures thereof.

Air-entraining agent when present is in an amount of 0.01 to 1, preferably 0.01-0.5, more preferably 0.01-0.2, most preferably 0.05-0.2 weight % based upon the total weight of the Cementitious Reactive Powder Component A (i.e., weight % of total thermally activated aluminosilicate comprising Class C fly ash, aluminate cement, and calcium sulfate). Most preferred dosage of air entraining agent dosage equals about 0.01 to about 0.20 wt % of total Cementitious Reactive Powder Component A.

Defoaming Agents

Defoaming agents can be added to the geopolymer cementitious compositions of the invention to reduce the amount of entrapped air, increase material strength, increase material bond strength to other substrates, and to produce a defect free surface in applications where surface aesthetics is an important criteria. Examples of suitable defoaming agents useful in the geopolymer compositions of the invention include polyethylene oxides, propoxylated amines, polyetheramine, polyethylene glycol, polypropylene glycol, alkoxylates, polyalkoxylate, fatty alcohol alkoxylates, hydrophobic esters, tributyl phosphate, alkyl polyacrylates, silanes, silicones, polysiloxanes, polyether siloxanes, acetylenic diols, tetramethyl decynediol, secondary alcohol ethoxylates, silicone oil, hydrophobic silica, oils (mineral oil, vegetable oil, white oil), waxes (paraffin waxes, ester waxes, fatty alcohol waxes), amides, fatty acids, polyether derivatives of fatty acids, etc., and mixtures thereof.

Preferably the dosage of defoamer equals 0 to about 0.5 wt %, more preferably 0 to about 0.25 wt %, and most preferably 0.01 to about 0.1 wt % of total Cementitious Reactive Powder Component A (i.e., weight % of total thermally activated aluminosilicate comprising Class C fly ash, aluminate cement, and calcium sulfate).

Surface Active Organic Polymer

Surface active organic polymer includes any one or more Organic Rheology Modifiers (also known as Organic Rheology Control Agents), Film-forming polymers, or biopolymers. The Organic Rheology Modifiers could be biopolymers or come from synthetic sources. The Film-forming polymers could be Film Forming Redispersible Polymer Powder or the film forming polymer of a Film Forming Polymer Dispersion. Surface active organic polymers, as their secondary function, also help entrain air in the mixture but may not be as effective as compounds known as air entraining (foaming) agents.

Bio-Polymers

Some of these biopolymers are also known as Thickeners or Viscosity Modifiers. Some also function as film forming polymers. Some, such as methyl cellulose also function as an emulsifier. Naturally occurring biopolymers comprise polysaccharide or amino acid building blocks, and are generally water-soluble. Common examples are starch, cellulose, alginate, egg yolk, agar, arrowroot, carrageenan, collagen, gelatin, guar gum, pectin and xanthan gum. Preferred Bio-polymers include cellulosic ethers and gum-based organic polymers.

Succinoglycans, diutan gum, guar gum, wellan gum, xanthan gums and cellulose ether based organic compounds, are bio-polymers that act as hydrocolloids and rheology control agents. Gum based polymers are selected from the group consisting of galactomannan gums, glucomannan gums, guar gum, locust bean gum, cara gum, hydroxyethyl guar, hydroxypropyl guar, cellulose, hydroxypropyl cellulose, hydroxymethyl cellulose, hydroxyethyl cellulose, and combinations thereof.

Examples of preferred cellulose based organic polymers useful for rheology control in the geopolymer compositions of the present invention include hydroxyethyl-cellulose (HEC), hydroxypropyl-cellulose (HPC), hydroxypropylmethyl-cellulose (HPMC), methyl-cellulose (MC), ethyl-cellulose (EC), methylethyl-cellulose (MEC), carboxymethyl-cellulose (CMC), carboxymethylethyl-cellulose (CMEC), and carboxymethylhydroxyethyl-cellulose (CMHEC).

The biopolymers mentioned above are typically soluble both in cold and/or hot water. These additives also act as water retention agents and thereby minimize material segregation and bleeding in addition to controlling the material rheology. Biopolymers are particularly useful and an important ingredient in production of non-segregating, self-consolidating geopolymer compositions of this invention.

Organic Rheology Control Agents

As opposed to biopolymers which may be able to control or modify rheology, for purposes of the present specification, Organic Rheology Modifiers (Organic Rheology Control Agents) are defined as those coming from synthetic sources. Some of these Organic Rheology Control Agents are also known as Thickeners. Acrylic-based polymers for Organic Rheology Control Agents are grouped into three general classes: alkali-swellable (or soluble) emulsions (ASE's) hydrophobically modified alkali-swellable emulsions (HASE's) and hydrophobically modified, ethoxylated urethane resins (HEUR's). HASE's are modifications of ASE's following an addition of hydrophobic functional groups. These are commonly known as associative thickeners. In its simplest form, an associative thickener is a water-soluble polymer containing several relatively hydrophobic groups. HEUR's also belong to the category of associative thickeners. But unlike HASE's, HEUR's are nonionic substances and are not dependent on alkali for activation of the thickening mechanism.

Preferred polymers for use as Organic Rheology Control Agents and thickeners in the geopolymer compositions of the invention are selected from the group consisting of polyacryl amides, alkali-swellable acrylic polymers, associative acrylic polymers, acrylic/acrylamide copolymers, hydrophobically modified alkali-swellable polymers, and highly water-swellable organic polymers.

For example, ACULYN 22 rheology modifier is an anionic hydrophobically modified alkali-soluble acrylic polymer emulsion (HASE) available from Dow Chemical. HASE polymers are synthesized from an acid/acrylate copolymer backbone and a monomer that connects the hydrophobic groups as side chains. The polymer is made through emulsion polymerization. ACULYN 22 is synthesized from acrylic acid, acrylate esters and a stearath-20 methacrylate ester.

Both associative and non-associative types of organic rheology control agents and thickeners can be usefully employed in the geopolymer compositions of the invention.

The organic rheology control agents and thickeners mentioned above are soluble both in cold and/or hot water. These additives also act as water retention agents and thereby minimize material segregation and bleeding in addition to controlling the material rheology. Organic rheology control agents are particularly useful and an important ingredient in production of non-segregating, self-consolidating geopolymer compositions of this invention.

Film-Forming Polymer Additives

Film forming polymers are polymers which produce a physical, continuous and flexible film. They are available as polymer dispersions or as redispersible powders. Preferred film forming polymer dispersions are latex dispersions. Preferred film forming redispersible polymer powders are latex powders. These polymer powders are water-redispersible and produced by spray-drying of aqueous polymer dispersions (latex). The polymer powders are typically made by spray drying latex dispersions (emulsions). In the field film forming redispersible polymer powders are preferred for ease of use.

Latex is an emulsion polymer. Latex is a water-based polymer dispersion, widely used in industrial applications. Latex is a stable dispersion (colloidal emulsion) of polymer microparticles in an aqueous medium. Thus, it is a suspension/dispersion of rubber or plastic polymer microparticles in water. Latexes may be natural or synthetic.

The latex is preferably made from a pure acrylic, a styrene rubber, a styrene butadiene rubber, a styrene acrylic, a vinyl acrylic or an acrylated ethylene vinyl acetate copolymer, and is more preferably a pure acrylic. Preferably latex polymer is derived from at least one acrylic monomer selected from the group consisting of acrylic acid, acrylic acid esters, methacrylic acid, and methacrylic acid esters. For example, the monomers preferably employed in emulsion polymerization include such monomers as methyl acrylate, ethyl acrylate, methyl methacrylate, butyl acrylate, 2-ethyl hexyl acrylate, other acrylates, methacrylates and their blends, acrylic acid, methacrylic acid, styrene, vinyl toluene, vinyl acetate, vinyl esters of higher carboxylic acids than acetic acid, e.g. vinyl versatate, acrylonitrile, acrylamide, butadiene, ethylene, vinyl chloride and the like, and mixtures thereof. For example, a latex polymer can be a butyl acrylate/methyl methacrylate copolymer or a 2-ethylhexyl acrylate/methyl methacrylate copolymer. Preferably, the latex polymer is further derived from one or more monomers selected from the group consisting of styrene, alpha-methyl styrene, vinyl chloride, acrylonitrile, methacrylonitrile, ureido methacrylate, vinyl acetate, vinyl esters of branched tertiary monocarboxylic acids, itaconic acid, crotonic acid, maleic acid, fumaric acid, ethylene, and C4-C8 conjugated dienes.

Vinyl acetate ethylene (VAE) emulsions are based on the copolymerization of vinyl acetate and ethylene, in which the vinyl acetate content can range between 60 and 95 percent, and the ethylene content ranges between 5 and 40 percent of the total formulation. This product should not be confused with the ethylene vinyl acetate (EVA) copolymers, in which the vinyl acetate generally ranges in composition from 10 to 40 percent, and ethylene can vary between 60 and 90 percent of the formulation. VAEs are water-based emulsions and these emulsions can be dried to form redispersible powders, whereas EVAs are solid materials used for hot-melt and plastic molding applications.

The film-forming polymer can be chosen from dispersions of polymer particles which may include: (meth)acrylics; vinyls; oil-modified polymers; polyesters; polyurethanes; polyamides; chlorinated polyolefins; and, mixtures or copolymers thereof, for example, vinyl acetate ethylene. Further, the polymers should typically have a glass transition temperature (Tg) of from −40° to 70° C. The Tg of a polymer is most commonly determined by differential scanning calorimetry (DSC). The Tg is the temperature at which there is a 'sudden' increase in the specific heat (Cp). This is manifested by a shift in the baseline of the DSC curve. The International Confederation of Thermal Analysis proposes an evaluation procedure to be used to determine the Tg. According to this procedure two regression lines R1 and R2 are applied to the DSC curve: the regression line before the event (R1) and the regression line at the inflection point (R2). These two lines define the glass transition temperature (Tg) as the intersection between R1 and R2. It should be noted that the values for the Tg obtained by DSC are dependent on the heating rate chosen during the experiment. Generally the heating rate used by DSC measurements is 5° C./min.

As preferred polymers may be mentioned: i) pure acrylate copolymers obtainable as the polymerization product of a plurality of acrylic monomers such as (meth)acrylic acid, (meth)acrylic monomers containing a hydroxyl group, (meth)acrylic acid esters and (meth)acrylonitrile; ii) styrene-acrylate copolymers obtainable as the polymerization product of a monomer mixture comprising styrene and/or substituted styrene in an amount of up to 100 wt. %, preferably of from 30 to 90 wt. % and more preferably of from 40 to 80 wt. %, based on total monomers, and one or more acrylic monomers; and, such as (meth)acrylic acid, (meth)acrylic monomers containing a hydroxyl group, (meth)acrylic acid esters and (meth)acrylonitrile; and, iii) ethylene vinyl acetate copolymers obtainable as the polymerization product of vinyl acetate, ethylene, and optionally other co-monomers.

The polymers can be prepared and used in bulk, powdered form: such powders would be re-dispersed in the water during the formation of the second component. ACRONAL S 430 P and ACRONAL S 695 P (BASF Aktiengesellschaft) are examples of a suitable commercial, re-dispersible styrene-acrylate copolymer powder.

In the alternative the polymers are directly provided as a dispersion in the water based medium, which dispersion is then mixed with additional water and other additives. Such dispersions may be provided using known commercial products such as: STYROPOR P555 (styrene homopolymer available from BASF Aktiengesellschaft); for styrene butadiene copolymers, LIPATON SB 3040, LIPATON SB 2740 (Polymer Latex GmbH), STYROLUX 684 D (BASF Aktiengesellschaft) and, SYNTHOMER 20W20 (Synthomer Chemie); SYNTHOMER VL 10286 and SYNTHOMER 9024 (styrene/butadiene/acrylonitrile terpolymer, Synthomer Chemie); for styrene acrylate copolymers, ALBERDINGK H 595, ALBERDINGK AS 6002 (both Alberdingk Boley), RHODOPAS DS 913 (Rhodia, now Solvay), ACRONAL 290D, ACRONAL S 400, ACRONAL DS 5011 (BASF Aktiengesellschaft), VINNAPAS SAF 54 (Wacker Polymer Systems), MOWILITH LDM 6159 (Celanese) and LIPATON AE 4620 (Polymer Latex GmbH); and, B60A (pure acrylate dispersion available from Rohm & Haas). Other exemplary commercially available latex polymers include: AIRFLEX EF811 (available from Air Products); EPS 2505 (available from EPS/CCA); and, NEOCAR 2300, NEOCAR 820 and NEOCAR 2535 (available from Dow Chemical Co.).

Alternatively, the aqueous dispersions may be provided by polymerizing appropriate monomer mixtures as will be described herein below. P. A. Lovell, M. S. El-Aasser (Editors), "Emulsion Polymerization and Emulsion Polymers", John Wiley and Sons, Chichester, UK, 1997 is herein incorporated by reference. The monomer mixture should generally comprise at least one unsaturated monomer selected from the group consisting of: (meth)acrylonitrile; alkyl (meth)acrylate esters; (meth)acrylic acids; vinyl esters; and, vinyl monomers.

Suitable alkyl esters of acrylic acid and methacrylic acid are those derived from C1 to C14 alcohols and thereby include as non-limiting examples: methyl (meth)acrylate; ethyl (meth)acrylate; isopropyl (meth)acrylate; butyl (meth) acrylate; isobutyl (meth)acrylate; n-pentyl (meth)acrylate; neopentyl (meth)acrylate; cyclohexyl (meth)acrylate; 2-hexyl (meth)acrylate; 2-ethylhexyl (meth)acrylate; isobornyl (meth)acrylate; 2-hydroxyethyl (meth)acrylate, 3-hydroxypropyl (meth)acrylate, 4-hydroxybutyl (meth)acrylate, and epsilon-caprolactone adducts thereof; and, di(meth) acrylate esters of alkane diols such as 1,6-hexane diol diacrylate.

Suitable vinyl esters include vinyl acetate, vinyl propionate, vinyl versatate and vinyl laurate. Suitable vinyl comonomers include: ethylene; propene; butene; iso-butene; 1,3-butadiene; isoprene; styrene; alpha-methyl styrene; t-butyl styrene; vinyl toluene; divinyl benzene; heterocyclic vinyl compounds; and, vinyl halides such as chloroprene. Preferably the vinyl comonomers include ethylene, styrene, butadiene and isoprene.

The monomer mixture may comprise a carbonyl monomer that is a mono-olefinically unsaturated monomer having an aldehyde group or a ketone group. The mono-olefinic unsaturation in the carbonyl monomers of this invention is typically provided by (meth)acrylate, (meth)acrylamide, styryl or vinyl functionalities. Preferably the carbonyl monomer is selected from the group consisting of: acrolein; methacrolein; vinyl methyl ketone; vinyl ethyl ketone; vinyl isobutyl ketone; vinyl amyl ketone; acetoacetoxy esters of hydroxyalkyl (meth)acrylates; diacetoneacrylamide (DAAM); diacetone(meth)acrylamide; formylstyrol; diacetone (meth)acrylate; acetonyl acrylate; 2-hydroxypropyl acrylate-acetyl acetate; 1,4-butanediol acrylate acetylacetate; and, mixtures thereof.

Examples of suitable film forming homopolymers and copolymers are vinyl acetate homopolymers, copolymers of vinyl acetate with ethylene, copolymers of vinyl acetate with ethylene and one or more further vinyl esters, copolymers of vinyl acetate with ethylene and acrylic esters, copolymers of vinyl acetate with ethylene and vinyl chloride, styreneacrylic ester copolymers, styrene-1,3-butadiene copolymers. Preference is given to vinyl acetate homopolymers; copolymers of vinyl acetate with from 1 to 40% by weight of ethylene; copolymers of vinyl acetate with from 1 to 40% by weight of ethylene and from 1 to 50% by weight of one or more further comonomers from the group consisting of vinyl esters having from 1 to 15 carbon atoms in the carboxylic acid radical, e.g. vinyl propionate, vinyl laurate, vinyl esters of alpha-branched carboxylic acids having from 9 to 13 carbon atoms; copolymers of vinyl acetate, from 1 to 40% by weight of ethylene and preferably 1 to 60% by weight of acrylic esters of unbranched or branched alcohols having from 1 to 15 carbon atoms, in particular n-butyl acrylate or 2-ethylhexyl acrylate; and copolymers comprising from 30 to 75% by weight of vinyl acetate, from 1 to 30% by weight of vinyl laurate or the vinyl ester of an alpha-branched carboxylic acid having from 9 to 13 carbon atoms, and from 1 to 30% by weight of acrylic esters of unbranched or branched alcohols having from 1 to 15 carbon atoms, in particular n-butyl acrylate or 2-ethylhexyl acrylate, and further comprising from 1 to 40% by weight of ethylene; copolymers comprising vinyl acetate, from 1 to 40% by weight of ethylene and from 1 to 60% by weight of vinyl chloride; where the polymers may further comprise the above-mentioned auxiliary monomers in the amounts specified and the percentages by weight in each case add up to 100% by weight.

Other Additives

In the invention, other additives not considered cementitious reactive powder may be incorporated into the slurry and overall geopolymeric cementitious composition. Such other additives, for example, superplasticizers (water reducing agents), set accelerating agents, set retarding agents, air-entraining agents, foaming agents, wetting agents, shrinkage control agents, viscosity modifying agents (thickeners), film-forming redispersible polymer powders, film-forming polymer dispersions, set control agents, efflorescence control (suppression) agents, coloring agents, corrosion control agents, alkali-silica reaction reducing admixtures, discrete reinforcing fibers, and internal curing agents. Other additives may include fillers, such as one or more of sand and/or other aggregates, lightweight fillers, mineral fillers, etc.

Superplasticizer

Superplasticizers (water reducing agents) are preferably used in the compositions of the invention. They may be added in the dry form or in the form of a solution. Superplasticizers help to reduce water demand of the mixture. Examples of superplasticizers include polynaphthalene sulfonates, polyacrylates, polycarboxylates, polyether polycarboxylates, lignosulfonates, melamine sulfonates, caseins, and the like.

Preferably the superplasticizer is a carboxylated plasticizer material. Superplasticizers based on polycarboxylate polyether chemistry are the most preferred water reducing chemical admixture of the self-consolidating geopolymer compositions of the invention. Polycarboxylate polyether superplasticizers are the most preferred since they facilitate accomplishment of the various objectives of this invention as mentioned earlier.

Depending upon the type of superplasticizer used, the weight ratio of the superplasticizer (on dry powder basis) to the cementitious reactive powders preferably will be about 5 wt % or less, preferably about 2 wt. % or less, preferably about 0.1 to about 1 wt. %.

Fillers—Fine Aggregate, Coarse Aggregate, Inorganic Mineral Fillers and Lightweight Fillers One or more fillers such as fine aggregate, coarse aggregate, inorganic mineral fillers, and lightweight fillers may be used as a component in compositions of the invention. These fillers are not pozzolans or thermally activated aluminosilicate minerals.

Fine aggregates can be added to the geopolymer compositions in the invention without affecting the properties to increase the yield of the material. An example of fine aggregate is Sand. Sand is defined as an inorganic rock material with an average particle size of less than about 4.75 mm (0.195 inches). The sand used in this invention preferably meet the standard specifications of the ASTM C33 standard. Preferably the sand has a mean particle size of 0.1 mm to about 3 mm. More preferably the sand has a mean particle size of 0.2 mm to about 2 mm. Most preferably the sand has a mean particle size about 0.3 to about 1 mm. Examples of preferable fine sand for use in this invention have a predominant size range of US sieve number #70-#30 (0.2-0.6 mm). The fine aggregate used in this invention meet the ASTM C33 standard performance.

Inorganic mineral fillers are dolomite, limestone, calcium carbonate, ground clay, shale, slate, mica and talc. Generally, they have a fine particle size with preferably average particle diameter of less than about 100 microns, preferably less than about 50 microns, and more preferably less than about 25 microns in the compositions of the invention. Smectite clays and palygorskite and their mixtures are not considered inorganic mineral fillers in this invention.

Coarse aggregates can be added to the geopolymer compositions without it affecting any of the properties to increase the yield of the material. Coarse aggregate is defined as an inorganic rock material with an average particle size at least 4.75 mm (0.195 inches), for example ¼" to 1½ in." (0.64 to 3.81 cm). Aggregate with size larger than 1½" (3.81 cm) may also be used in some applications for example concrete pavement. The particle shape and texture of the coarse aggregate used can be angular, rough-textured, elongated, rounded or smooth or a combination of these. Preferably coarse aggregate are made of minerals such as granite, basalt, quartz, riolite, andesite, tuff, pumice, limestone, dolomite, sandstone, marble, chert, flint, greywacke, slate, and/or gneiss. Coarse aggregate useful in the invention as listed in TABLE A-2 and D meets specifications set out in ASTM C33 (2011) and AASHTO M6/M80 (2008) standards. Gravel is a typical coarse aggregate.

Lightweight fillers have a specific gravity of less than about 1.5, preferably less than about 1, more preferably less than about 0.75, and still more preferably less than about 0.5. If desired the specific gravity of lightweight fillers is less than about 0.3, more preferably less than about 0.2 and most preferably less than about 0.1. In contrast, inorganic mineral filler preferably has a specific gravity above about 2.0. Examples of useful lightweight fillers include pumice, vermiculite, expanded forms of clay, shale, slate and perlite, scoria, expanded slag, cinders, glass microspheres, synthetic ceramic microspheres, hollow ceramic microspheres, lightweight polystyrene beads, plastic hollow microspheres, expanded plastic beads, and the like. Expanded plastic beads and hollow plastic spheres when used in the composition of the invention are employed in very small quantity on a weight basis owing to their extremely low specific gravity.

When lightweight fillers are utilized to reduce the weight of the material, they may be employed at filler to cementitious materials (reactive powder) ratio of about 0 to about 2, preferably about 0.01 to about 1, preferably about 0.02 to about 0.75. One or more types of lightweight fillers may be employed in the geopolymer compositions of the invention.

Yield is defined as the total volume of slurry in cubic feet, obtained from 50 pounds of dry material consisting of cementitious materials and additives (i.e., 50 pounds mixture of cementitious materials and additives), when mixed with fine aggregate (when present), coarse aggregate (when present), lightweight filler (when present), inorganic mineral filler (when present) and water.

For the full density compositions of the present invention, the yield of 50 pounds of dry material consisting of cementitious materials and additives, when mixed with fine aggregate, coarse aggregate, and water is preferably greater than 0.75 cubic feet, more preferably greater than 1.5 cubic feet, even more preferably greater than 2.0 cubic feet, and most preferably greater than 2.5 cubic feet.

When lightweight fillers are employed as part of the composition, the yield of 50 pounds of dry material consisting of cementitious materials and additives, when mixed with fine aggregate (when present), coarse aggregate (when present), lightweight filler and water is preferably greater than 3 cubic feet, more preferably greater than 4.5 cubic feet, even more preferably greater than 6 cubic feet, and most preferably greater than 7.5 cubic feet.

Compositions of the present invention may be free of added fillers.

Preferably compositions of the present invention are free of biosourced fillers. Biosourced fillers are fillers typically of animal or plant origin. When it is of plant origin, the biosourced filler is essentially composed of cellulose, hemicellulose and/or lignin. The biosourced filler typically comprises at least one component—fibers, fibrils, dusts, powders, chips, the component originating from at least a part of at least one plant raw material, in at least a particulate form. This plant raw material typically being for example any one or more of hemp, flax, cereal straw, oat, rice, maize, canola seed, maize, sorghum, flax shives, miscanthus (elephant grass), rice, sugar cane, sunflower, kenaf, coconut, olive stones, bamboo, wood (e.g. wood pellets, for example spruce chippings), sisal, cork (beads) or mixtures thereof.

Preferably the compositions of the invention have an absence of borax.

Inorganic Rheology Control Agents

The geopolymer cementitious compositions of the invention may also include inorganic rheology control agents belonging to the family of phyllosilicates. Examples of inorganic rheology control agents particularly useful in the geopolymer compositions of invention include palygorskite, sepiolite, smectites, kaolinites, and illite. Particularly useful smectite clays that may be used in the present invention include hectorite, saponite, and montmorillonite. Different varieties of bentonite clays both natural and chemically treated may also be used to control rheology of the compositions of the present invention. These additives also act as water retention agents and thereby minimize material segregation and bleeding. The inorganic rheology control agents may be added in the absence of or in combination with the organic rheology control agents.

Efflorescence Suppression Agent

Water repelling agents such as silanes, silicones, siloxanes, stearates may be added to the cementitious compositions of the invention to reduce efflorescence potential of the material. Selected examples of useful efflorescence suppression agents include octyltriethoxy silane, potassium methyl siliconate, calcium stearate, butyl stearate, polymer stearates. These efflorescence control agents reduce the transport of the water within the hardened material and thereby minimize migration of salts and other soluble chemicals that can potentially cause efflorescence. Excessive efflorescence can lead to poor aesthetics, material disruption and damage from expansive reactions occurring due to salt accumulation and salt hydration, and reduction in bond strength with other substrates and surface coatings.

Cement Set Retarders

Organic compounds such as hydroxylated carboxylic acids, carbohydrates, sugars, and starches are the preferred retarders of the invention. Organic acids such as citric acid, tartaric acid, malic acid, gluconic acid, succinic acid, glycolic acid, malonic acid, butyric acid, malic acid, fumaric acid, formic acid, glutamic acid, pentanoic acid, glutaric acid, gluconic acid, tartronic acid, mucic acid, trihydroxy benzoic acid, etc. are useful as cement set retarders in the dimensionally stable geopolymer cementitious compositions s of the invention. Sodium gluconate is also useful as an organic cement set retarder in the present invention. Inorganic salts such as borates, phosphates as well as zinc and lead salts may be used as retarders in the compositions of this invention. Zinc oxide is an example of suitable inorganic retarder. Boric acid and borates such as sodium tetraborate (borax) may also be used in the compositions of this invention. However, borates and boric acid are not preferred because they have been found to hinder mix rheology, cause excessive efflorescence, and reduce material bond strength to other substrates.

Other Optional Set-Control Agents

Other optional set control chemical additives include a sodium carbonate, potassium carbonate, calcium nitrate, calcium nitrite, calcium formate, calcium acetate, calcium chloride, lithium carbonate, lithium nitrate, lithium nitrite, aluminum sulfate, sodium aluminate, alkanolamines, polyphosphates, and the like. These additives when included as a part of the formulation may also influence rheology of the geopolymer compositions of the invention in addition to affecting their setting behavior.

Optional Materials, Fibers, and Scrims

Other optional materials and additives may be included in geopolymer compositions of the invention. These include at least one member selected from the group consisting of corrosion control agents, wetting agents, colorants and/or pigments, discrete fibers, long and continuous fibers and reinforcement, textile reinforcement, polyvinyl alcohol fibers, glass fibers, and/or other discrete reinforcing fibers.

Discrete reinforcing fibers of different types may also be included in the geopolymer compositions of the invention. Scrims made of materials such as polymer-coated glass fibers and polymeric materials such as polypropylene, polyethylene and nylon can be used to reinforce the cement-based precast products depending upon their function and application.

Preferably the geopolymer compositions of the invention have an absence of cement kiln dust. Cement kiln dust (CKD) is created in the kiln during the production of cement clinker. The dust is a particulate mixture of partially calcined and unreacted raw feed, clinker dust and ash, enriched with alkali sulfates, halides and other volatiles. These particulates are captured by the exhaust gases and collected in particulate matter control devices such as cyclones, baghouses and electrostatic precipitators. CKD consists primarily of calcium carbonate and silicon dioxide which is similar to the cement kiln raw feed, but the amount of alkalies, chloride and sulfate is usually considerably higher in the dust. CKD from three different types of operations: long-wet, long-dry, and alkali by-pass with pre-calcined have various chemical and physical traits. CKD generated from long-wet and long-dry kilns is composed of partially calcined kiln feed fines enriched with alkali sulfates and chlorides. The dust collected from the alkali by-pass of pre-calcined kilns tends to be coarser, more calcined, and also concentrated with alkali volatiles. However, the alkali by-pass process contains the highest amount by weight of calcium oxide and lowest loss on ignition (LOI). TABLE AA from Adaska et al., *Beneficial Uses of Cement Kiln Dust*, presented at 2008 IEEE/PCA 50th Cement Industry Technical Conf., Miami, Fla., May 19-22, 2008, provides the composition breakdown for the three different types of operation and includes a preferably chemical composition for Type I Portland cement for comparison.

TABLE G

Composition of CKD from Different Operation Sources

| Constituent | Long-wet kiln (% by weight) | Long-dry kiln (% by weight) | Alkali by-pass from preheater/ pre-calciner (% by weight) | Preferably Type I Portland cement (% by weight) |
|---|---|---|---|---|
| SiO$_2$ | 15.02 | 9.64 | 15.23 | 20.5 |
| Al$_2$O$_3$ | 3.85 | 3.39 | 3.07 | 5.4 |
| Fe$_2$O$_3$ | 1.88 | 1.10 | 2.00 | 2.6 |
| CaO | 41.01 | 44.91 | 61.28 | 63.9 |
| MgO | 1.47 | 1.29 | 2.13 | 2.1 |
| SO$_3$ | 6.27 | 6.74 | 8.67 | 3.0 |
| K$_2$O | 2.57 | 2.40 | 2.51 | <1 |
| Loss on Ignition (LOI) | 25.78 | 30.24 | 4.48 | 0-3 |
| Free lime (CaO) | 0.85 | 0.52 | 27.18 | <2 |

There are impurities in the CKD which tend to interfere with the geopolymeric reactions of this invention. Further, the composition of CKD tends be highly variable. The free lime in the CKD may be considered as added lime but due to the presence of other impurities in the CKD and variability in the CKD composition, the use of CKD is not recommended in the present invention. Thus, CKD is preferably absent.

Preferably the compositions of the invention have an absence of the following organic particles: coffee grounds particles, leaf powder particles, starch particles, ground leaf particles, and cork powder.

Properties of the Compositions of the Invention

Preferably the compositions of the present invention have compressive strengths after 100 freeze-thaw cycles, typically after 300 freeze-thaw cycles of greater than 3000 psi, more preferably the compressive strengths are greater than 4000 psi and most preferably greater than 5000 psi.

The compositions of the present invention have little or no loss in mechanical performance and durability, as demonstrated per ASTM C666/C66M-15 by the measured parameter relative dynamic modulus, for up to 100 freeze-thaw cycles, typically up to 300 freeze-thaw cycles, preferably up to 600 freeze-thaw cycles, more preferably up to 900 freeze-thaw cycles, and most preferably up to 1200 freeze-thaw cycles.

Compositions of the present invention have freeze-thaw durability performance per ASTM C666/C66M-15 as indicated by relative dynamic modulus after a number of freeze-thaw cycles. In particular, for at least 100 freeze-thaw cycles, typically at least 300 freeze-thaw cycles, preferably at least 600 freeze-thaw cycles, more preferably at least 900 freeze-thaw cycles, most preferably at least 1200 freeze-thaw cycles the relative dynamic modulus greater than 80% for the above freeze-thaw cycles (e.g., the relative dynamic modulus greater than 80% for at least 300 cycles), preferably greater than 85% for the above freeze-thaw cycles, more preferably greater than 90% for the above freeze-thaw cycles, furthermore preferably greater than 95% for the above freeze-thaw cycles, and most preferably greater than 95% for the above freeze-thaw cycles.

The initial dynamic elastic modulus (prior to initiation of freeze-thaw cycles) and dynamic elastic modulus after 100 freeze-thaw cycles, typically after 300 freeze-thaw cycles, is preferably greater than 20 GPa, more preferably greater than 25 GPa, and most preferably greater than 30 GPa.

The relative dynamic modulus after 100 freeze-thaw cycles, typically after 300 freeze-thaw cycles, is preferably equal or greater than 100.

Also, the compositions of the invention achieve a desirable Durability Factor as explained above, wherein the composition has a Durability Factor (DF) measured according to ASTM C666/C666M-15 greater than 85%, preferably greater than 90%, more preferably greater than 95%, and most preferably equal or greater than 100% for 100 freeze-thaw cycles, typically for 300 freeze-thaw cycles.

The long term free drying shrinkage of compositions of the invention may be less than about 0.3%, preferably less than about 0.2%, and more preferably less than about 0.1%, and most preferably less than about 0.05% (measured after initial set). Compositions of the invention may show a net expansion, preferably about 0 to 2.0%, more preferably about 0 to 1.0%, and most preferably about 0 to 0.5%.

The invention also exhibits superior compressive strength than regular Portland cement concrete. The set self-consolidating geopolymer of the invention also exhibits superior compressive strength compared to regular Portland cement concrete. For example, the set self-consolidating geopolymer 24-hour compressive strength may exceed about 1000 psi, more preferably exceeding about 2000 psi, and most preferably exceeding about 3000 psi. The 7-day compressive strength may exceed about 2000 psi, more preferably exceeding about 2500 psi, and most preferably exceeding about 3000 psi. The 28-day compressive strength may exceed about 3000 psi, more preferably exceeding about 4000 psi, and most preferably exceeding about 5000 psi. The 28-day compressive strength for some most preferred self-consolidating geopolymer compositions of this invention can even exceed 7000 psi.

Preferably the geopolymer compositions of this invention set faster than regular Portland cement concrete mixtures. The final setting time as measured according to ASTM C191-13 for a self-consolidating geopolymer composition of this invention is preferably greater than 60 minutes, more preferably greater than 120 minutes, most preferably greater than 180 minutes. Some compositions of this invention have extremely long final setting time ranging up to 360 minutes.

The compositions of the present invention have superior salt-scaling resistance per ASTM C672/C672M-12 Standard Test Method for Scaling Resistance of Concrete Surfaces Exposed to Deicing Chemicals, ASTM, published 2012. When tested according to this ASTM C672/C672M-12 salt scaling test the compositions have as indicated by weight loss less than 1% after 25 freeze-thaw cycles, more preferably after 50 freeze-thaw cycles, and most preferably after 75 freeze-thaw cycles when subjected to solutions of sodium chloride and solutions of calcium chloride.

While separately discussed above, each of the preferred geopolymeric compositions and mixtures of the invention has at least one, and can have a combination of two or more of the above mentioned distinctive advantages (as well as those apparent from the further discussion, examples and data herein) relative to prior art geopolymeric cementitious compositions.

The compositions of the invention are highly environmentally sustainable, utilizing fly ash—a post industrial waste as a primary raw material source. This significantly reduces the life cycle carbon footprint and the life cycle embodied energy of the manufactured product.

Uses of Composition of the Invention

The self-consolidating geopolymer compositions of the invention have many uses. These include structural elements such as beams, columns, floors, slabs in concrete buildings including high-rise buildings; bridge structures including decks, beams, arches, piers, and abutments; architectural concrete elements; parapet walls of bridges, dams, and other structures; foundation structures and concrete foundation piles; heavily reinforced concrete structural elements including beams, columns, slabs; precast concrete elements and structures; pre-stressed concrete elements and structures; structural and non-structural concrete repair applications; pavements materials for roads, bridge decks and other traffic and weight bearing surfaces such as industrial floors and parking garages; side-walks and drive-ways; lightweight self-consolidating concrete; marine concrete structures; masonry block-fill; liquid retaining structures; molten sulfur retaining pits; and cryogenic concrete.

The self-consolidating geopolymer compositions of the invention are particularly useful where other cementitious materials such as self-consolidating concrete (made with Portland cement, sand and aggregate) are typically used. Furthermore, the self-consolidating geopolymer compositions of the invention are particularly useful in applications where freeze-thaw stability and compressive strength are important or necessary. The self-consolidating geopolymer compositions of the invention can be used instead of regular Portland cement concrete in both new construction as well as repair and rehabilitation of old concrete.

The geopolymer compositions of the invention can be used with different fillers and additives including foaming agents and air entraining agents for adding air in specific proportions to make lightweight cementitious products, including precast construction elements, construction repair products, traffic bearing structures such as road compositions with good expansion properties and no shrinkage.

EXAMPLES

The following examples investigated the performance of the geopolymeric formulations comprising cementitious compositions fly ash, calcium sulfoaluminate cement, calcium aluminate cement, and calcium sulfates. The mixes were activated with potassium citrate and contained varying amounts of sand or varying amounts of sand and aggregate. All mixtures contained calcium sulfoaluminate cement and/or calcium aluminate cements. All mixes contained at least one of the three different types of calcium sulfates: calcium sulfate dihydrate, calcium sulfate hemihydrate, and anhydrous calcium sulfate (anhydrite).

The compressive strengths in these examples, unless otherwise specified, were measured according to ASTM C109—Standard Test Method for Compressive Strength of Hydraulic Cement Mortars (Using 2-in. or [50-mm] Cube Specimens).

The final setting time in the examples was measured using ASTM C191-13—Standard Test Methods for Time of Setting of Hydraulic Cement by Vicat Needle.

Slump in the examples was determined with a 2"×4" cylinder according to the cylinder slump test or was determined according to ASTM C1611-14.

Unless otherwise indicated, a high shear mixer was employed for the mixes of the following examples and the mixing time was 4 minutes.

Unless otherwise indicated, the mixes of the examples were activated with potassium citrate.

The superplasticizer used for the examples of this specification was BASF CASTAMENT FS 20 polymerization product based on polyethylene glycol. EP 2598457 describes it as an anionic dispersant. EP 2616407 describes it as a polyether polycarboxylate.

The rheology modifier used for the examples of this specification was MOMENTIVE AXILAT RH 100 XP which is succinoglycan. This is an exopolysaccharide biopolymer. Exopolysaccharides are high-molecular-weight polymers composed of sugar residues and are secreted by a microorganism into the surrounding environment.

Unless otherwise indicated, the defoamer was SURFYNOL 5005 from Air Products. Unless otherwise indicated, the air-entraining agent was VINSOL NVX resin from Pinova. Organic polymer used in the examples of this specification was a redispersible polymer powder BASF ACRONAL S 695 P. In the tables of compositions for the examples it is listed as "Polymer". ACRONAL S 695 P is a styrene/butyl acrylate (meth)acrylamide emulsion copolymer available from BASF Unless otherwise indicated, the calcium sulfoaluminate cement used in the examples of this invention was FASTROCK 500 available from the CTS Company. This cement had a mean particle size of about 11 microns. The oxide composition of FASTROCK 500 is shown in TABLE I.

USG HYDROCAL C-Base used in some of the examples is available from United States Gypsum Company. HYDROCAL C-Base is an alpha morphological form of calcium sulfate hemihydrate having blocky crystal microstructure and lower water demand. The USG HYDROCAL C-Base had a mean particle size of about 17 microns.

TABLE H shows the particle size analysis of the two fine aggregates (silica sand) used in the examples of this invention.

TABLE H

| | Typical Mean % Retained on Individual Sieves | | |
|---|---|---|---|
| ASTM (Mesh #) | Sieve Size (mm) | Sand I | Sand II |
| 4 | 4.75 | — | 1.7 |
| 8 | 2.36 | — | 7.2 |
| 16 | 1.18 | — | 10.2 |
| 20 | 0.85 | — | 8.5 |
| 30 | 0.60 | 1.3 | 12.8 |
| 40 | 0.42 | 10.4 | 17.0 |
| 50 | 0.30 | 24.3 | 16.4 |
| 70 | 0.21 | 33.6 | 12.0 |
| 100 | 0.15 | 22.9 | 7.4 |
| 140 | 0.12 | 6.4 | 3.0 |
| 200 | 0.08 | 1.0 | 1.7 |

TABLE H-continued

Typical Mean % Retained on Individual Sieves

| ASTM (Mesh #) | Sieve Size (mm) | Sand I | Sand II |
|---|---|---|---|
| 270 | 0.05 | 0.1 | 0.9 |
| PAN | — | — | 1.3 |

TABLE I shows the chemical analysis of, calcium sulfoaluminate cement (CTS FASTROCK 500) and calcium aluminate cement (Kemeos TERNAL EV) used in the examples.

TABLE I

Chemical Analysis - Mean % by Weight

| Oxide | Calcium Sulfoaluminate Cement | Calcium Aluminate Cement |
|---|---|---|
| Silicon Dioxide ($SiO_2$) | 14.29 | 4.41 |
| Iron Oxide ($Fe_2O_3$) | 1.10 | 6.51 |
| Aluminum Oxide ($Al_2O_3$) | 26.21 | 36.72 |
| Calcium Oxide (CaO) | 45.45 | 48.44 |
| Magnesium Oxide (MgO) | 2.71 | 0.48 |
| Potassium Oxide ($K_2O$) | 0.41 | 0.17 |
| Sodium Oxide ($Na_2O$) | 0.45 | 0.15 |
| Sulfur Trioxide ($SO_3$) | 7.60 | 0.17 |
| Phosphorus Pentoxide ($P_2O_5$) | — | — |
| Titanium Dioxide ($TiO_2$) | 0.73 | 1.41 |
| Loss on Ignition (L.O.I.) | 1.05 | 1.54 |

TABLE J shows the chemical composition of the four Class C fly ashes used in the examples of this invention.

TABLE J

Chemical Analysis - Mean % by Weight

| Oxide | Class C Fly Ash I | Class C Fly Ash II | Class C Fly Ash III | Class C Fly Ash IV |
|---|---|---|---|---|
| Silicon Dioxide ($SiO_2$) | 40.37 | 35.82 | 34.85 | 35.19 |
| Aluminum Oxide ($Al_2O_3$) | 19.38 | 20.27 | 21.69 | 19.07 |
| Iron Oxide ($Fe_2O_3$) | 6.27 | 5.87 | 5.86 | 5.62 |
| Calcium Oxide (CaO) | 23.19 | 25.94 | 25.17 | 26.57 |
| Magnesium Oxide (MgO) | 5.02 | 4.36 | 5.47 | 5.10 |
| Sulfur Trioxide ($SO_3$) | 1.19 | 1.39 | 2.21 | 2.31 |
| Sodium Oxide ($Na_2O$) | 1.08 | 1.48 | 1.72 | 1.64 |
| Potassium Oxide ($K_2O$) | 0.69 | 0.62 | — | 0.51 |
| Phosphorus Pentoxide ($P_2O_5$) | 1.08 | — | — | — |
| Titanium Dioxide ($TiO_2$) | 1.31 | — | — | — |
| Loss on Ignition (L.O.I.) | 0.42 | 0.15 | 0.36 | 0.21 |

TABLE K shows the particle size analysis of the two coarse aggregates (gravel) used in the examples of this invention
  Gravel I—Pea gravel
  Gravel II—Black granite

TABLE K

Typical Mean % Retained on Individual Sieves

| ASTM (Mesh #) | Sieve Size (mm) | Gravel I | Gravel II |
|---|---|---|---|
| 1.05" | 26.7 | — | — |
| 0.75" | 19.1 | — | 47.0 |
| 0.50" | 12.5 | — | 48.0 |
| 0.375" | 9.5 | 0.3 | 3.0 |
| 0.25" | 6.3 | 28.6 | — |
| 4 Mesh | 4.75 | 31.7 | — |
| 8 Mesh | 2.36 | 37.9 | — |
| 16 Mesh | 1.18 | 1.0 | — |
| PAN | — | — | 2.0 |

The inorganic mineral comprising alkaline earth metal oxide used in the examples was a calcium oxide based fine powder. It contains about 50 to 80 wt. % calcium oxide, 20 to 40 wt. % fused silica, 1 to 5 wt. % aluminum oxide, 1 to 5 wt. % crystalline silica, 5 to 10 wt. % Portland cement, and less 1.0 wt. % iron oxide. Its pH was between 12.5 and 13 and it met the classification of Type G Component per ACI 223R-10.

Comparative Example 1

This example illustrates the flowability (slump) and setting time of some geopolymer compositions lacking the self-consolidating behavior of the present invention. TABLE 1.1 shows the raw material compositions of the mixture compositions investigated. The mixes contained no coarse aggregates. The objective of this section is to demonstrate the poor self-consolidation property of comparative formulations that utilize low water to cementitious materials ratio and do not employ cement set retarders or inorganic minerals comprising alkaline earth metal oxides added as separate ingredients to promote self-consolidation characteristics. In this example, Class C Fly Ash I and Sand I were used. The high shear mixer used in this example was PERLS hand held ME 140 mixer operated manually at an RPM of 490. The mixing was performed for 4 minutes. Mix 1 had 0 wt. % defoamer, Mix 2 had 0.005 wt. % defoamer, and Mix 3 had 0.01 wt. % defoamer.

TABLE 1.1

Compositions illustrated in this section

| Raw Material | Mix 1 | Mix 2 | Mix 3 |
|---|---|---|---|
| Class C Fly Ash I (grams) | 6557 | 6557 | 6557 |
| Calcium Sulfoaluminate Cement (grams) | 1311 | 1311 | 1311 |
| Calcium Aluminate Cement (grams) | 984 | 984 | 984 |
| Calcium Sulfate Hemihydrate (grams) | 1148 | 1148 | 1148 |
| Total Cementitious Materials (grams) | 10000 | 10000 | 10000 |
| Sand I (grams) | 11500 | 11500 | 11500 |
| Potassium Citrate (grams) | 200 | 200 | 200 |
| Superplasticizer (grams) | 50 | 50 | 50 |
| Rheology Modifier (grams) | 1 | 1 | 1 |
| Defoamer (grams) | 0 | 0.5 | 1 |
| Air Entraining Agent (grams) | 5 | 5 | 5 |
| Lithium Carbonate (grams) | 50 | 50 | 50 |
| Polymer (grams) | 500 | 500 | 500 |
| Water (grams) | 2200 | 2200 | 2200 |
| Water/Cementitious Materials Ratio | 0.22 | 0.22 | 0.22 |
| Sand/Cementitious Materials Ratio | 1.15 | 1.15 | 1.15 |
| Mixing Time (minutes) | 4 | 4 | 4 |

TABLE 1.2 shows the slurry density, air content and yield of mixes of the compositions illustrated. The yield, representing the total volume of slurry produced in cubic feet, was calculated for 50 pounds of dry material consisting of cementitious materials and additives (i.e., 50 pounds mixture of cementitious materials and additives) when mixed with fine aggregate and water. TABLE 1.3 shows the compressive strength behavior of the compositions illustrated in this example.

TABLE 1.2

Slurry Density, Air Content and Yield

| Mix # | Slurry Density (pcf) | Air Content (%) | Yield (cu. ft.) |
|---|---|---|---|
| 1 | 119.3 | 19.0 | 0.95 |
| 2 | 119.0 | 15.0 | 0.95 |
| 3 | 121.1 | 14.5 | 0.94 |

TABLE 1.3

Compressive Strength (in psi)

| Mix # | 24 hours | 28 days |
|---|---|---|
| 1 | 4851 | 7493 |
| 2 | 4613 | 7663 |
| 3 | 4783 | 8152 |

TABLE 1.4 shows flowability and final setting time of the comparative compositions. Flowability of geopolymer mortar is determined using slump with the 2"×4" cylinder according to the cylinder slump test. TABLE 1.4 shows the formulations have extremely rapid setting time (less than 60 minutes) and exhibit very poor flow (less than 6" slump). Based on the flowability and the setting time results it can be concluded that these formulations are not self-consolidating and will require extensive vibration to flow and achieve satisfactory placement and consolidation in field applications.

TABLE 1.4

Flowability (Slump - 2" × 4") and Final Setting Time

| Mix # | Slump (inches) | Setting Time (minutes) |
|---|---|---|
| 1 | 5.75 | 32 |
| 2 | 5.38 | 32 |
| 3 | 5.56 | 32 |

Comparative Example 2

This section illustrates the flowability and setting time of another geopolymer compositions lacking the self-consolidation behavior of the present invention. TABLE 2.1 shows the raw material compositions of the comparative compositions investigated in this section. The mixes contained no coarse aggregates. The objective of this example is to demonstrate the poor self-consolidation property of comparative formulations that utilize high water to cementitious materials ratio but do not employ either cement set retarders or alkaline earth metal oxide mineral as separately added ingredients. In this example, Class C Fly Ash I and Sand I were used. The mixing was performed in a Hobart N50 mixer at a low mixer speed (130 RPM) for the first one minute and then at an intermediate mixer speed (280 RPM) for another two minutes.

TABLE 2.1

Compositions illustrated in this section

| Raw Material | Mix 1 | Mix 2 |
|---|---|---|
| Class C Fly Ash I (grams) | 1639 | 1639 |
| Calcium Sulfoaluminate Cement (grams) | 328 | 328 |
| Calcium Aluminate Cement (grams) | 246 | 246 |
| Calcium Sulfate Hemihydrate (grams) | 287 | 287 |
| Total Cementitious Materials (grams) | 2500 | 2500 |
| Sand I (grams) | 5000 | 5000 |
| Potassium Citrate (grams) | 50 | 50 |
| Superplasticizer (grams) | 13 | 13 |
| Rheology Modifier (grams) | 0.08 | 0.08 |
| Defoamer (grams) | 0.75 | 0.75 |
| Air Entraining Agent (grams) | 1.25 | 1.25 |
| Lithium Carbonate (grams) | 13 | 13 |
| Polymer (grams) | 125 | 125 |
| Pigment (grams) | 25 | 25 |
| Water (grams) | 875 | 800 |
| Water/Cementitious Materials Ratio | 0.35 | 0.32 |
| Sand/Cementitious Materials Ratio | 2.00 | 2.00 |

TABLE 2.2 shows the compressive strength behavior of the geopolymeric cementitious compositions illustrated in this example.

TABLE 2.2

Compressive Strength (in psi)

| Mix # | 24 hour | 28 days |
|---|---|---|
| 1 | 3166 | 5652 |
| 2 | 3313 | 5891 |

TABLE 2.3 shows flowability and final setting time of the compositions investigated in this example. Flowability of geopolymer mortar was determined using slump with the 2"×4" cylinder according to the cylinder slump test. Table 2.3 shows the formulations exhibit extremely rapid setting time (less than 60 minutes) even at very high water to cementitious materials ratio. Furthermore, these formulations also exhibit poor flow characteristics (less than 7" slump). Based on the flowability and the setting time results it can be concluded that these mixture compositions are not self-consolidating and will require extensive vibration to flow and achieve satisfactory placement and consolidation in field applications.

TABLE 2.3

Flowability (Slump-2" × 4") and Final Setting Time

| Mix # | Slump(inches) | Setting Time (minutes) |
|---|---|---|
| 1 | <7 | 57 |
| 2 | <7 | 56 |

Comparative Example 3

This section illustrates the flowability and setting time of some other geopolymer compositions formulations lacking the self-consolidation behavior of the present invention. TABLE 3.1 shows the raw material compositions of the comparative compositions investigated in this section. The objective of this example is to demonstrate the poor self-consolidation property of comparative formulations that utilize low water to cementitious materials ratio and cement set retarders but do not employ alkaline earth metal oxide minerals as separately added ingredients. In this example, Class C Fly Ash I and Sand I were used. Citric acid and sodium gluconate were used as cement set retarders. Citric acid and sodium gluconate are used as cement set retarders in the compositions investigated. The mixing was performed in a Hobart N50 mixer at a low mixer speed (130 RPM) for the first one minute and then at an intermediate mixer speed (280 RPM) for another two minutes.

TABLE 3.1

Compositions illustrated in this section

| Raw Material | Mix 1 | Mix 2 |
|---|---|---|
| Class C Fly Ash I (grams) | 1967 | 1967 |
| Calcium Sulfoaluminate Cement (grams) | 393 | 393 |
| Calcium Aluminate Cement (grams) | 295 | 295 |
| Calcium Sulfate Hemihydrate (grams) | 344 | 344 |
| Total Cementitious Materials (grams) | 3000 | 3000 |
| Sand I (grams) | 3450 | 3450 |
| Potassium Citrate (grams) | 60 | 60 |
| Superplasticizer (grams) | 15 | 15 |
| Rheology Modifier (grams) | 0.3 | 0.3 |
| Defoamer (grams) | 0.9 | 0.9 |
| Air Entraining Agent (grams) | 1.5 | 1.5 |
| Lithium Carbonate (grams) | 15 | 15 |
| Polymer (grams) | 150 | 150 |
| Citric Acid (grams) | 30 | 22.5 |
| Sodium Gluconate (grams) | 4.5 | 4.5 |
| Water (grams) | 960 | 960 |
| Water/Cementitious Materials Ratio | 0.32 | 0.32 |
| Sand/Cementitious Materials Ratio | 1.15 | 1.15 |

TABLE 3.2 shows the compressive strength behavior of the geopolymeric cementitious compositions illustrated in this example.

TABLE 3.2

Compressive Strength (in psi)

| Mix # | 7 days | 28 days |
|---|---|---|
| 1 | 6110 | 7230 |
| 2 | 6016 | 7299 |

TABLE 3.3 shows flowability and setting time of the comparative compositions of this example. Flowability of geopolymer mortar is determined using slump with the 2"×4" cylinder. Table 10 shows the formulations exhibit slumps less than 6.5" and the setting times less than 80 minutes. Based on these results it can be concluded that these mixture compositions are not self-consolidating and will require extensive vibration to flow and achieve satisfactory placement and consolidation in field applications.

TABLE 3.3

Flowability (Slump-2" × 4") and Final Setting Time

| Mix # | Slump (inches) | Setting Time (minutes) |
|---|---|---|
| 1 | 6.00 | 79 |
| 2 | 6.25 | 78 |

Example 4—Influence of Water-Cement Ratio on Flowability and Setting Behavior of Geopolymer Compositions Modified with Cement Set Retarders This example investigated the flowability and setting behavior of the geopolymer compositions of this invention comprising fly ash, calcium sulfoaluminate cement and calcium sulfate. TABLE 4.1 shows the raw material composition of the mixture compositions investigated. The objective of this example was to demonstrate self-consolidating characteristics of the novel geopolymer compositions of this invention at varying water to cementitious materials ratios in presence of cement set retarders. No alkaline earth metal oxide minerals as separately added ingredient were used in this example. Four different water to cementitious materials ratio were investigated. Citric acid and sodium gluconate were used as cement set retarders. In this example, Class C Fly Ash II and Sand II were used. Mixing was performed using a Hobart N50 mixer at low speed (130 RPM) for the first one minute and then at intermediate speed (280 RPM) for another two minutes.

TABLE 4.1

Compositions investigated in Example 4

| Raw Material | Mix 1 | Mix 2 | Mix 3 | Mix 4 |
|---|---|---|---|---|
| Class C Fly Ash II (grams) | 3462 | 3462 | 3462 | 3462 |
| Calcium Sulfoaluminate (grams) | 692 | 692 | 692 | 692 |
| Calcium Sulfate Hemihydrate (grams) | 346 | 346 | 346 | 346 |
| Total Cementitious Materials (grams) | 4500 | 4500 | 4500 | 4500 |
| Sand II (grams) | 6750 | 6750 | 6750 | 6750 |
| Potassium Citrate (grams) | 90 | 90 | 90 | 90 |
| Citric Acid (grams) | 68 | 68 | 68 | 68 |
| Sodium Gluconate (grams) | 45 | 45 | 45 | 45 |
| Superplasticizer (grams) | 23 | 23 | 23 | 23 |
| Lithium Carbonate (grams) | 23 | 23 | 23 | 23 |
| Defoamer and Wetting Agent (grams) | 9 | 9 | 9 | 9 |
| Rheology Modifier (grams) | 0.72 | 0.72 | 0.72 | 0.72 |
| Water (grams) | 1800 | 1575 | 1350 | 1125 |
| Water/Cementitious Materials Ratio | 0.40 | 0.35 | 0.30 | 0.25 |
| Sand/Cementitious Materials Ratio | 1.50 | 1.50 | 1.50 | 1.50 |

TABLE 4.2 shows final setting time of the geopolymer compositions investigated in this example made with varying water to cementitious materials ratio. Flowability of geopolymer mortar is determined using slump with the 2"×4" cylinder. TABLE 4.2 also shows that the formulations exhibited excellent flow (greater than 10" slump) when water to cementitious materials ratio was in excess of 0.30. Furthermore, the final setting time increased drastically from 45 minutes to more than 2 hours at higher water to cementitious materials ratios in presence of cement set retarders. Per the definition of self-consolidating geopolymer outlined in this specification, Mixes 1 and 2 will are classified as self-consolidating.

TABLE 4.2

Flowability (Slump-2" × 4") and Final Setting Time

| Mix # | Slump (inches) | Setting Time (mins) |
|---|---|---|
| 1 | 11.31 | 212 |
| 2 | 10.81 | 127 |
| 3 | 9.50 | 45 |
| 4 | 7.50 | 38 |

TABLE 4.3 shows the compressive strength behavior of the geopolymeric cementitious compositions investigated in this example. All mixes achieved satisfactory compressive strength more than 3000 psi both at 7- and 28-days. Furthermore, even the early age compressive strengths of the compositions were quite substantial exceeding 1500 psi at 24-hours.

TABLE 4.3

| Compressive Strength (in PSI) | | | |
|---|---|---|---|
| Mix # | 24 hours | 7 days | 28 days |
| 1 | 1720 | 3342 | 3371 |
| 2 | 2516 | 4203 | 4479 |
| 3 | 3607 | 5696 | 6121 |
| 4 | 5101 | 7585 | 9134 |

Example 5—Influence of Alkaline Earth Metal Oxide Mineral on Flowability and Setting Behavior of Geopolymer Compositions This example investigates self-consolidation and setting behavior of the geopolymeric formulations comprising fly ash, calcium sulfoaluminate cement, calcium aluminate cement calcium sulfate and inorganic mineral comprising alkaline earth metal oxide. TABLE 5.1 shows the raw material composition of the mixture compositions investigated. The objective of this example was to demonstrate the self-consolidation and extended setting time characteristics of the geopolymer compositions of this invention utilizing inorganic minerals comprising alkaline earth metal oxide. In this example, Class C Fly Ash II and Sand II were used. Citric acid and sodium gluconate were used as cement set retarders. The mixing was performed in a Hobart N50 mixer at a low mixer speed (130 RPM) for the first one minute and then at an intermediate mixer speed (280 RPM) for another two minutes.

TABLE 5.1

| Compositions investigated in Example 5 | | | | |
|---|---|---|---|---|
| Raw Material | Mix 1 | Mix 2 | Mix 3 | Mix 4 |
| Class C Fly Ash II (grams) | 2913 | 2932 | 2941 | 2951 |
| Calcium Sulfoaluminate (grams) | 583 | 586 | 588 | 590 |
| Calcium Sulfate Hemihydrate (grams) | 510 | 513 | 515 | 516 |
| Calcium Aluminate Cement (grams) | 437 | 440 | 441 | 443 |
| Alkaline Earth Metal Oxide (grams) | 58 | 29 | 15 | 0 |
| Total Cementitious Materials (grams) | 4500 | 4500 | 4500 | 4500 |
| Sand II (grams) | 6750 | 6750 | 6750 | 6750 |
| Potassium Citrate (grams) | 90 | 90 | 90 | 90 |
| Citric Acid (grams) | 34 | 34 | 34 | 34 |
| Sodium Gluconate (grams) | 45 | 45 | 45 | 45 |
| Superplasticizer (grams) | 23 | 23 | 23 | 23 |
| Lithium Carbonate (grams) | 45 | 45 | 45 | 45 |
| Defoamer and Wetting Agent (grams) | 9 | 9 | 9 | 9 |
| Rheology Modifier (grams) | 1.4 | 1.4 | 1.4 | 1.4 |
| Water (grams) | 1800 | 1800 | 1800 | 1800 |
| Water/Cementitious Materials Ratio | 0.40 | 0.40 | 0.40 | 0.40 |
| Sand/Cementitious Materials Ratio | 1.50 | 1.50 | 1.50 | 1.50 |

TABLE 5.2 shows final setting time of the cementitious compositions investigated in this example. Workability of geopolymer mortar is determined using slump with the 2"×4" cylinder. TABLE 5.2 shows that the final setting time increased as a result of the use of alkaline earth metal oxide minerals in the composition. It is noteworthy that the final setting time of the compositions investigated ranged from about 2½ to 5 hours. The mixtures also exhibited excellent flow with slump values greater than 10". Per the definition of self-consolidating geopolymer outlined in this specification, Mixes 2 through 4 are classified as self-consolidating.

TABLE 5.2

| Workability (Slump-2" × 4") and Setting Time (Vicat) | | |
|---|---|---|
| Mix # | Slump (inches) | Setting Time (mins) |
| 1 | 5.88 | 300 |
| 2 | 10.50 | 262 |
| 3 | 10.75 | 248 |
| 4 | 10.69 | 156 |

TABLE 5.3 shows the compressive strength behavior of the developed geopolymeric compositions of this invention investigated in this example. It is noteworthy that compressive strengths at all ages were particularly high even at a relatively high water to cementitious materials ratio of 0.40. The 24-hour compressive strengths for all mixes investigated were more than 3000 psi, while the 7- and 28-days compressive strength for all mixes exceeded 5000 psi. It is concluded that addition of inorganic mineral comprising alkaline earth metal oxide is instrumental in increasing the compressive strength of the inventive geopolymer compositions of this invention.

TABLE 5.3

| Compressive Strength (in PSI) | | | |
|---|---|---|---|
| Mix # | 24 hr | 7 days | 28 days |
| 1 | 3177 | 5217 | 5781 |
| 2 | 3908 | 5655 | 5853 |
| 3 | 4265 | 5889 | 6243 |
| 4 | 4397 | 6644 | 6431 |

Example 6—Self-Consolidating Performance of Geopolymer Concrete

This example investigates self-consolidation and setting behavior of the geopolymeric formulations comprising fly ash, calcium sulfoaluminate cement, calcium aluminate cement, calcium sulfate and inorganic mineral comprising alkaline earth metal oxide. TABLE 6.1 shows the raw material compositions of the mixture composition investigated in this example. The objective of this example was to demonstrate the self-consolidation and extended setting time characteristics of the geopolymer compositions of this invention utilizing inorganic minerals comprising alkaline earth metal oxide. In this example, Class C Fly Ash III, Sand II and Gravel II were used. Citric acid and sodium gluconate were used as cement set retarders. The low shear mixer used in this example was a KUSHLAN 350 DD drum type concrete mixer with 18 drum RPM with 3.5 cu.ft. capacity. The mixing was performed for 6 minutes

TABLE 6.1

| Compositions investigated in Example 6 | | | | |
|---|---|---|---|---|
| Raw Material | Mix 1 | Mix 2 | Mix 3 | Mix 4 |
| Class C Fly Ash III (grams) | 5825 | 5863 | 5892 | 5902 |
| Calcium Sulfoaluminate (grams) | 1165 | 1173 | 1176 | 1180 |
| Calcium Sulfate Hemihydrate (grams) | 1019 | 1026 | 1029 | 1033 |
| Calcium Aluminate Cement (grams) | 874 | 879 | 882 | 885 |
| Alkaline Earth Metal Oxide (grams) | 117 | 59 | 29 | 0 |
| Total Cementitious Materials (grams) | 9000 | 9000 | 9000 | 9000 |
| Sand II (grams) | 18000 | 18000 | 18000 | 18000 |
| Gravel II (grams) | 18000 | 18000 | 18000 | 18000 |

TABLE 6.1-continued

Compositions investigated in Example 6

| Raw Material | Mix 1 | Mix 2 | Mix 3 | Mix 4 |
|---|---|---|---|---|
| Potassium Citrate (grams) | 180 | 180 | 180 | 180 |
| Citric Acid (grams) | 68 | 68 | 68 | 68 |
| Sodium Gluconate (grams) | 90 | 90 | 90 | 90 |
| Superplasticizer (grams) | 45 | 45 | 45 | 45 |
| Lithium Carbonate (grams) | 90 | 90 | 90 | 90 |
| Defoamer and Wetting Agent (grams) | 18 | 18 | 18 | 18 |
| Rheology Modifier (grams) | 2.88 | 2.88 | 2.88 | 2.88 |
| Water (grams) | 3150 | 3150 | 3150 | 3150 |
| Water/Cementitious Materials Ratio | 0.35 | 0.35 | 0.35 | 0.35 |
| Sand/Cementitious Materials Ratio | 2.00 | 2.00 | 2.00 | 2.00 |
| Gravel/Cementitious Materials Ratio | 2.00 | 2.00 | 2.00 | 2.00 |

TABLE 6.2 shows setting time and slump of the geopolymer compositions investigated in this example. It can be observed that the final setting times for all mixes were greater than 60 minutes. Material flow, filling ability (deformability) and stability of the geopolymer concrete was determined using the slump flow test per ASTM C 1611-14. This test is performed similarly to the conventional slump test using the standard ASTM C 143/C 143M slump cone. Instead of measuring the slumping distance vertically, however, the mean spread of the resulting concrete patty is measured horizontally. This number is recorded as the slump flow. TABLE 6.2 also shows increase in final setting times resulting due to the use of alkaline earth metal oxide. Mixes 2 through 4 were regarded as self-consolidating per ACI 237R-07 since the slumps measured using ASTM C1611-14 were greater than 18 inches and final setting was greater than sixty minutes.

Figure 2:
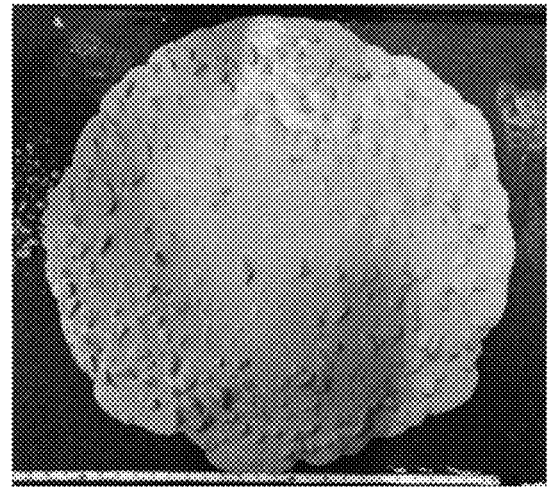
FIG. 2 shows a photograph showing the measured slump diameter of the slump patty of Mix 3 of Example 6 per ASTM C1611-14 (Slump for Mix 3 of Example 6 per ACI 237R-07 is regarded as non-self-consolidating geopolymer composition).

FIGS. 1 and 2 show the measured slump diameter of the slump patty per ASTM C1611-14. In these figures it can be observed that Mix 1 was fairly viscous with a slump measuring only about 12.5 inches; on the other hand, Mix 3 was extremely flowable with a slump diameter of about 25 inches.

FIG. 1 shows a photograph showing the measured slump diameter of the slump patty of Mix 1 of Example 6 per ASTM C1611-14 (Slump for Mix 1 of Example 6 per ACI 237R-07 is regarded as non-self-consolidating geopolymer composition).

FIG. 2 shows a photograph showing the measured slump diameter of the slump patty of Mix 3 of Example 6 per ASTM C1611-14 (Slump for Mix 3 of Example 6 per ACI 237R-07 is regarded as non-self-consolidating geopolymer composition).

TABLE 6.2

Slump (Filling Ability), ASTM C1611-14 and Setting Time, ASTM C191-13

| Mix # | Slump (inches) | Setting Time (mins) | Comments |
|---|---|---|---|
| 1 | 12.5 | 180 | Requires Vibration |
| 2 | 25.0 | 127 | Self-consolidating-No Vibration Required |
| 3 | 25.0 | 113 | Self-consolidating-No Vibration Required |
| 4 | 26.8 | 103 | Self-consolidating-No Vibration Required |

The results above show that inorganic minerals comprising alkaline earth metal oxide can be used to tailor the self-consolidating property of geopolymer compositions. TABLE 6.3 shows the compressive strength behavior of the developed geopolymeric cementitious compositions investigated in this example per ASTM C39.

TABLE 6.3

Compressive Strength (in PSI)

| Mix # | 24 hr | 28 days |
|---|---|---|
| 1 | 3653 | 4852 |
| 2 | 5126 | 7680 |
| 3 | 5092 | 7260 |
| 4 | 4999 | 5898 |

TABLE 6.3 shows the compressive strength behavior of the developed geopolymeric compositions of this invention investigated in this example. It is noteworthy that compressive strengths at all ages were particularly high. The 24-hour compressive strengths for all mixes investigated were more than 3000 psi, while the 28-days compressive strength for all mixes exceeded 5000 psi. Incorporation of alkaline earth metal oxide increased the 28-day compressive strength to greater than 7000 psi for Mixes 2 and 3. Thus, it can be concluded that addition of inorganic mineral comprising alkaline earth metal oxide is helpful in increasing the compressive strength of the inventive geopolymer compositions.

Example 7—Freeze-Thaw Durability Performance of Self-Consolidating Geopolymer Compositions The objective of this example is to demonstrate the freeze-thaw durability performance of the self-consolidating geopolymer formulations of this invention. The TABLE 7.1 shows the raw material composition of the mixture composition investigated. In this example, Class C Fly Ash III, Sand II and Gravel II were used. The low shear mixer used in this example was a KUSHLAN 350 DD drum type concrete mixer with 18 drum RPM with 3.5 cubic feet capacity. The mixing was performed for 6 minutes

TABLE 7.1

Compositions investigated in Example 7

| Raw Material | Mix 1 | Mix 2 |
|---|---|---|
| Class C Fly Ash III (grams) | 6515 | 6557 |
| Calcium Sulfoaluminate (grams) | 1303 | 1311 |
| Calcium Sulfate Hemihydrate (grams) | 1140 | 1148 |
| Calcium Aluminate Cement (grams) | 977 | 984 |
| Alkaline Earth Metal Oxide (grams) | 65 | 0 |
| Total Cementitious Materials (grams) | 10000 | 10000 |
| Sand II (grams) | 20000 | 20000 |
| Gravel II (grams) | 20000 | 20000 |
| Potassium Citrate (grams) | 200 | 200 |
| Citric Acid (grams) | 75 | 75 |
| Sodium Gluconate (grams) | 100 | 100 |
| Superplasticizer (grams) | 50 | 50 |
| Lithium Carbonate (grams) | 100 | 100 |
| Defoamer and Wetting Agent (grams) | 20 | 20 |
| Rheology Modifier (grams) | 3.2 | 3.2 |
| Water (grams) | 3500 | 3500 |
| Water/Cementitious Materials Ratio | 0.35 | 0.35 |
| Sand/Cementitious Materials Ratio | 2.00 | 2.00 |
| Gravel/Cementitious Materials Ratio | 2.00 | 2.00 |

TABLE 7.2 shows setting time and slump of the geopolymer compositions investigated in this example. It can be observed that the final setting times for all mixes were greater than 60 minutes. Material flow, filling ability (deformability) and stability of the geopolymer concrete was determined using the slump flow test per ASTM C 1611-14. This test is performed similarly to the conventional slump test using the standard ASTM C 143/C 143M slump cone. Instead of measuring the slumping distance vertically, however, the mean spread of the resulting concrete patty is measured horizontally. This number is recorded as the slump flow. TABLE 7.3 also shows increase in final setting times due to the incorporation of alkaline earth metal oxide in the composition. Both the mixes had a final setting time greater than 60 minutes. Furthermore, both the mixes were regarded self-consolidating per ACI 237R since the slumps measured using ASTM C 1611-14 were greater than 18 inches.

TABLE 7.2

Slump (Filling Ability), ASTM C1611-14 and Setting Time, ASTM C191-13

| Mix # | Slump (inches) | Setting Time (minutes) | Comments |
|---|---|---|---|
| 1 | 25.50 | 85 | Self-consolidating-No Vibration Required |
| 2 | 27.25 | 100 | Self-consolidating-No Vibration Required |

TABLE 7.3 shows the compressive strength behavior of the developed geopolymer compositions of this invention investigated in this example per ASTM C39. It is noteworthy that compressive strengths at all ages were particularly high for both mixes investigated. The 24-hour compressive strengths for both mixes investigated were more than 4500 psi, while the 28-days compressive strength for both mixes exceeded 7000 psi.

TABLE 7.3

Compressive Strength (in PSI)

| Mix # | 24 hr | 28 days |
|---|---|---|
| 1 | 5196 | 7808 |
| 2 | 4700 | 7460 |

TABLE 7.4 shows the slurry density and air content for mixes investigated in this example. TABLE 7.5 shows the freeze-thaw durability behavior of the formulations investigated in this example. It is noteworthy that these compositions despite containing very low amount of air demonstrated impressive freeze-thaw durability performance.

TABLE 7.4

Slurry Density and Air Content

| Mix # | Slurry Density (pcf) | Air Content (%) |
|---|---|---|
| 1 | 156.9 | 0.9 |
| 2 | 156.0 | 1.0 |

TABLE 7.5

Freeze-Thaw Durability Performance

| Mix # | | 0 cycles | 100 cycles | 200 cycles | 300 cycles |
|---|---|---|---|---|---|
| 1 | Dynamic Modulus | 38.0 | 37.8 | 43.3 | 41.9 |
| 2 | (GPa) | 36.3 | 36.5 | 38.7 | 37.6 |
| 1 | Relative Dynamic | 100 | 100 | 114 | 110 |
| 2 | Modulus (%) | 100 | 101 | 108 | 106 |

TABLE 7.6 shows flowability of the compositions with the slump test performed after every hour till setting. The "Initial Slump" represents the measured slump value for the mix measured immediately after completion of mixing. The "1-Hour Slump" represents the measured slump value for the mix measured one hour after mixing. These results demonstrate that slumps for these compositions were retained even one hour after the materials were mixed together.

TABLE 7.6

Slump (Filling Ability), ASTM C1611-14 and Final Setting Time, ASTM C191-13

| Mix # | Initial Slump (inches) | 1-Hour Slump (inches) |
|---|---|---|
| 1 | 25.50 | >25.00 |
| 2 | 27.25 | >25.00 |

Example 8—Self-Consolidating Geopolymer Compositions

This example investigates the slump retention in the self-consolidating geopolymer compositions comprising of cementitious compositions fly ash, calcium sulfoaluminate cement, calcium aluminate cement, and calcium sulfate. TABLE 8.1 shows the raw material composition of the mixture composition investigated. Different levels of calcium aluminate cement were used in the mixes investigated. The compositions investigated in this example had high water to cementitious ratio of 0.40 and utilized citric acid and sodium gluconate as cement set retarders. In this example, Class C Fly Ash II and Sand II were used. The mixing was performed in a Hobart N50 mixer at a low mixer speed (130 RPM) for the first one minute and then at an intermediate mixer speed (280 RPM) for another two minutes.

TABLE 8.1

Compositions investigated in Example 8

| Raw Material | Mix 1 | Mix 2 | Mix 3 | Mix 4 |
|---|---|---|---|---|
| Class C Fly Ash II (grams) | 3462 | 3273 | 3103 | 2951 |
| Calcium Sulfoaluminate (grams) | 692 | 655 | 621 | 590 |
| Calcium Sulfate Hemihydrate (grams) | 346 | 409 | 466 | 516 |
| Calcium Aluminate Cement (grams) | 0 | 164 | 310 | 443 |
| Total Cementitious Materials (grams) | 4500 | 4500 | 4500 | 4500 |
| Sand II (grams) | 6750 | 6750 | 6750 | 6750 |
| Potassium Citrate (grams) | 90 | 90 | 90 | 90 |
| Citric Acid (grams) | 34 | 34 | 34 | 34 |
| Sodium Gluconate (grams) | 45 | 45 | 45 | 45 |
| Superplasticizer (grams) | 23 | 23 | 23 | 23 |
| Lithium Carbonate (grams) | 45 | 45 | 45 | 45 |
| Defoamer and Wetting Agent (grams) | 9 | 9 | 9 | 9 |
| Rheology Modifier (grams) | 1.44 | 1.44 | 1.44 | 1.44 |
| Water (grams) | 1800 | 1800 | 1800 | 1800 |
| Water/Cementitious Materials Ratio | 0.40 | 0.40 | 0.40 | 0.40 |
| Sand/Cementitious Materials Ratio | 1.50 | 1.50 | 1.50 | 1.50 |

TABLE 8.2 shows flowability and setting time of the cementitious compositions investigated in this example. Workability of geopolymer mortar is determined using slump with the 2"×4" cylinder. The formulations also exhibit very good flow (greater than 10" slump). Based on the defined criteria for self-consolidating geopolymer concrete, all the mixes investigated are classified as self-consolidating.

TABLE 8.2

| | Flowability (Slump-2" × 4") and Setting Time (Vicat) | |
|---|---|---|
| Mix # | Slump (inches) | Setting Time (mins) |
| 1 | 11.63 | 190 |
| 2 | 11.06 | 178 |
| 3 | 11.56 | 148 |
| 4 | 11.13 | 137 |

TABLE 8.3 shows the compressive strength behavior of the developed geopolymeric cementitious investigated in this example. All mixes demonstrated satisfactory compressive strength at all ages.

TABLE 8.3

| | Compressive Strength (in PSI) | | |
|---|---|---|---|
| Mix # | 24 hr | 7 days | 28 days |
| 1 | 2511 | 4212 | 4793 |
| 2 | 3210 | 5374 | 5718 |
| 3 | 3757 | 6058 | 6110 |
| 4 | 4089 | 6438 | 6570 |

Figure 3:
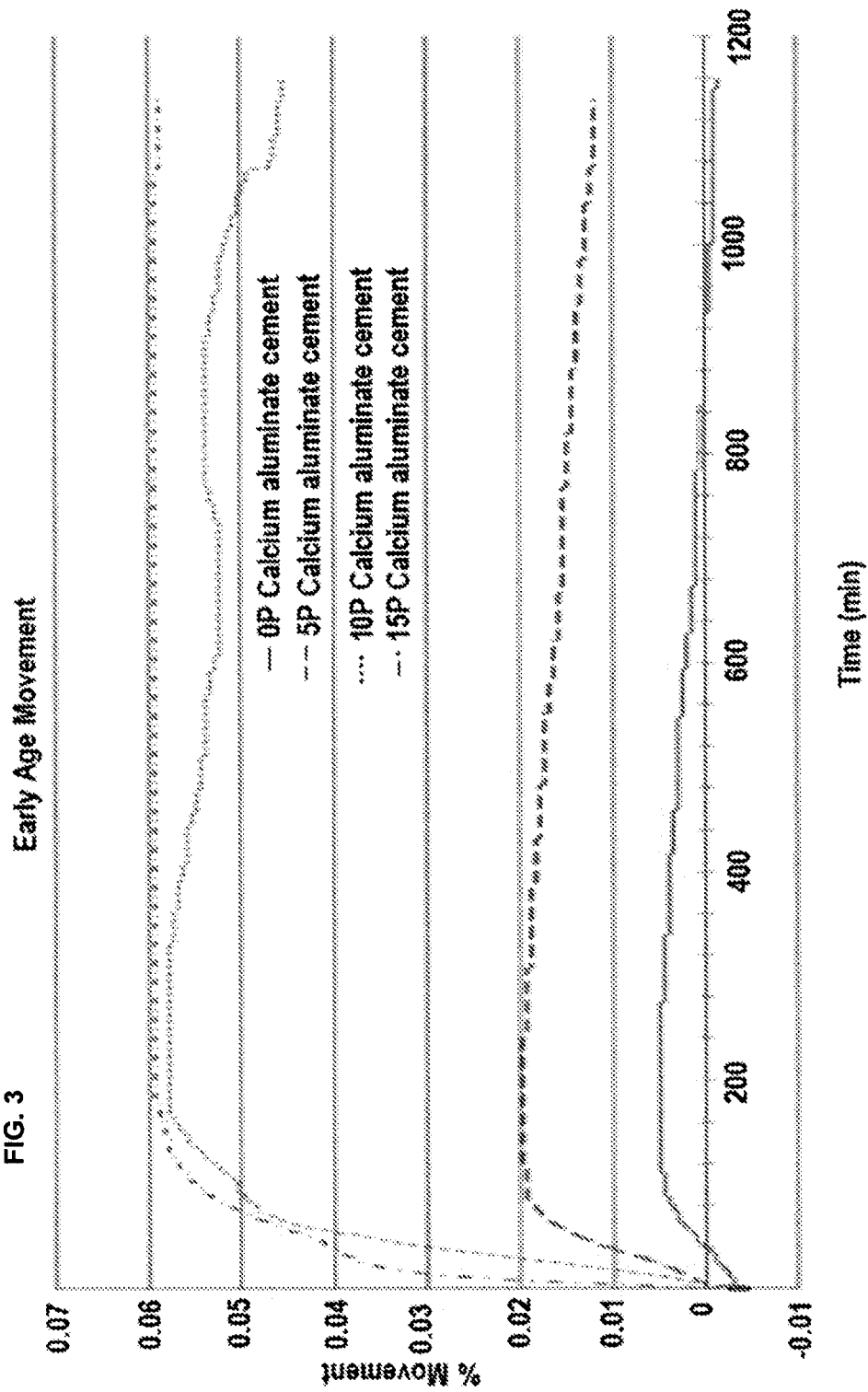
FIG. 3 shows a plot of early age expansion (early age linear movement) of the mixes investigated in Example 8.

Another unique feature of the self-consolidating geopolymer compositions of this invention is that they display net expansion at early after mixing and initial hardening regimen. The feature is helpful in reducing cracking when the material is poured over a rigid, non-deforming substrate. The early age expansion of the mixes investigated in this example are shown in the plot of FIG. 3. From this figure, it is apparent that these formulations exhibited early age expansion. The maximum expansion ranged from about 0.005% to about 0.06% of the original length measured at the initial set of the material.

Example 9—High Levels of Alkaline Earth Metal Oxide without Calcium Sulfoaluminate and Calcium Aluminate Cements This example investigates setting behavior of the geopolymeric formulations comprising fly ash and very high amounts of alkaline earth metal oxide. Calcium sulfoaluminate cement, calcium aluminate cement and calcium sulfate were not used in this example. The TABLE 9.1 shows the raw material composition of the mixture compositions investigated. Two different levels of alkaline earth metal oxide were used in this example. In mix 1, 10 parts by weight (pbw) of alkaline earth metal oxide per 100 pbw of thermally activated aluminosilicate mineral and in mix 2, 20 parts by weight (pbw) of alkaline earth metal oxide per 100 pbw of thermally activated aluminosilicate mineral were used. In this example, Class C Fly Ash II and Sand II were used. Citric acid and sodium gluconate were used as cement set retarders. The mixing was performed in a Hobart N50 mixer at a low mixer speed (130 RPM) for the first one minute and then at an intermediate mixer speed (280 RPM) for another two minutes.

TABLE 9.1

| Compositions investigated in Example 10 | | |
|---|---|---|
| Raw Material | Mix 1 | Mix 2 |
| Class C Fly Ash II (grams) | 4091 | 3750 |
| Alkaline Earth Metal Oxide (grams) | 409 | 750 |
| Total Cementitious Materials (grams) | 4500 | 4500 |
| Sand II (grams) | 6750 | 6750 |
| Potassium Citrate (grams) | 90 | 90 |
| Citric Acid (grams) | 34 | 34 |
| Sodium Gluconate (grams) | 45 | 45 |
| Superplasticizer (grams) | 23 | 23 |
| Defoamer and Wetting Agent (grams) | 9 | 9 |
| Rheology Modifier (grams) | 1.44 | 1.44 |
| Water (grams) | 1350 | 1350 |
| Water/Cementitious Materials Ratio | 0.30 | 0.30 |
| Sand/Cementitious Materials Ratio | 1.50 | 1.50 |

TABLE 9.2 shows final setting time of the cementitious compositions investigated in this example. The final setting time of the compositions investigated were greater than 3 hours.

TABLE 9.2

| Setting Time (Vicat) | |
|---|---|
| Mix # | Setting Time (minutes) |
| 1 | 180 |
| 2 | 189 |

TABLE 9.3 shows the compressive strength behavior of the developed geopolymeric compositions of this invention investigated in this example. Mix 1 with 10 parts by weight (pbw) of alkaline earth metal oxide per 100 pbw of thermally activated aluminosilicate mineral showed reasonable compressive strength (>3500 psi) after 28 days however mix 2 with 20 parts by weight (pbw) of alkaline earth metal oxide per 100 pbw of thermally activated aluminosilicate mineral showed significantly reduced compressive strength (<1500 psi after 28 days). This reinforces the optimal alkaline earth metal oxide requirement in these novel geopolymer compositions.

TABLE 9.3

| Compressive Strength (in PSI) | | |
|---|---|---|
| Mix # | 24 hours | 28 days |
| 1 | 529 | 3513 |
| 2 | 576 | 1461 |

Comparative Example 10

This section illustrates the flowability and setting time of some other geopolymer compositions formulations lacking the self-consolidation behavior of the present invention. TABLE 10.1 shows the raw material compositions of two comparative compositions investigated in this example. The objective of this example is to demonstrate the poor self-consolidation property of comparative formulations that utilize low water to cementitious materials ratio but do not employ cement retarders and alkaline earth metal oxide minerals as separately added ingredients. In this example, Class C Fly Ash IV, Sand II, Gravel I and Gravel II were used. The low shear mixer used in this example was a KUSHLAN 350 DD drum type concrete mixer with 18 drum RPM with 3.5 cu. ft. capacity. The mixing was performed for 6 minutes

TABLE 10.1

Compositions investigated in Example 10

| Raw Material | Mix 1 | Mix 2 |
|---|---|---|
| Class C Fly Ash IV (grams) | 6557 | 6557 |
| Calcium Sulfoaluminate (grams) | 1311 | 1311 |
| Calcium Sulfate Hemihydrate (grams) | 1148 | 1148 |
| Calcium Aluminate Cement (grams) | 984 | 984 |
| Total Cementitious Materials (grams) | 10000 | 10000 |
| Sand II (grams) | 20700 | 20700 |
| Gravel I (grams) | 20700 | — |
| Gravel II (grams) | — | 20700 |
| Potassium Citrate (grams) | 200 | 200 |
| Superplasticizer (grams) | 50 | 50 |
| Lithium Carbonate (grams) | 50 | 50 |
| Defoamer and Wetting Agent (grams) | 2.00 | 2.00 |
| Rheology Modifier (grams) | 0.30 | 0.30 |
| Air Entraining Agent (grams) | 25 | 25 |
| Water (grams) | 3500 | 3000 |
| Water/Cementitious Materials Ratio | 0.35 | 0.30 |
| Sand/Cementitious Materials Ratio | 2.07 | 2.07 |
| Gravel/Cementitious Materials Ratio | 2.07 | 2.07 |

TABLE 10.2 shows setting time and slump of the geopolymer compositions investigated in this example. Material flow, filling ability (deformability) and stability of the geopolymer concrete was determined using the slump flow test per ASTM C 1611. This test is performed similarly to the conventional slump test using the standard ASTM C 143/C 143M slump cone. Instead of measuring the slumping distance vertically, however, the mean spread of the resulting concrete patty is measured horizontally. This number is recorded as the slump flow. TABLE 10.2 shows that the slump for Mix 1 was 9" and Mix 2 was 14" while the final setting time for both mixes was less than 60 minutes.

Figure 4:
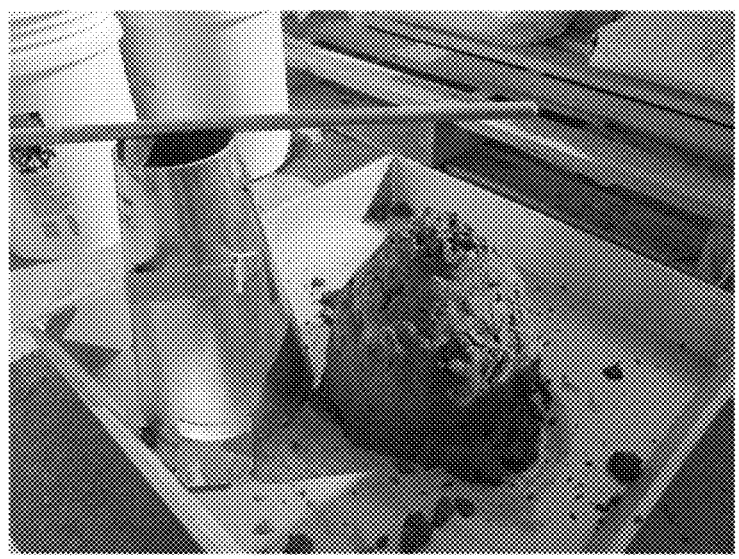
FIG. 4 shows a photograph of a slump patty for a Mix 1 investigated in Example 10 (Slump for Mix 1 of Example 10 which is regarded per ACI 237R-07 as non-self-consolidating geopolymer composition).
Figure 5:
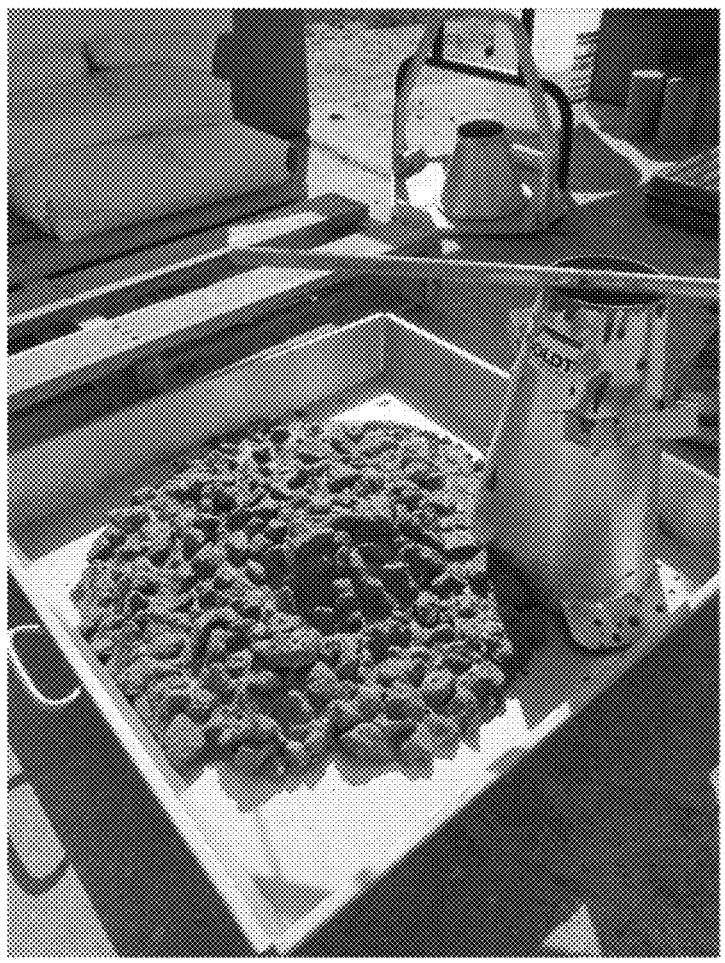
FIG. 5 shows a photograph of a slump patty for a Mix 2 investigated in Example 10 (Slump for Mix 2 of Example 10 which is regarded per ACI 237R-07 as non-self-consolidating geopolymer composition).

FIG. 4 and FIG. 5 show photographs of slump patties for the two mixes investigated in this example.

FIG. 4 shows a photograph of a slump patty for a Mix 1 investigated in Example 10 (Slump for Mix 1 of Example 10 which is regarded per ACI 237R-07 as non-self-consolidating geopolymer composition).

FIG. 5 shows a photograph of a slump patty for a Mix 2 investigated in Example 10 (Slump for Mix 2 of Example 10 which is regarded per ACI 237R-07 as non-self-consolidating geopolymer composition).

The shape and diameter of slump patties clearly demonstrate that both mixes had poor flow characteristics and were not self-consolidating.

TABLE 10.2

Slump (Filling Ability), ASTM C1611 and Setting Time, ASTM C191

| Mix # | Slump (inches) | Setting Time (minutes) | Comments |
|---|---|---|---|
| 1 | 9" | <30 | Requires Vibration |
| 2 | 14" | <30 | Requires Vibration |

TABLE 10.3 shows the compressive strength behavior of the cementitious compositions investigated in this example per ASTM C39.

TABLE 10.3

| | Compressive Strength (in PSI) | |
|---|---|---|
| Mix # | 24 hours | 28 days |
| 1 | 3694 | 6146 |
| 2 | 5495 | 9260 |

CLAUSES OF THE INVENTION

The following clauses describe various aspects of the present invention:

Clause 1. A self-consolidating geopolymer composition comprising a mixture of:
water, and
cementitious reactive powder comprising:
thermally activated aluminosilicate mineral in an amount of 100 parts by weight, wherein preferably the thermally activated aluminosilicate mineral comprises at least 75% Class C fly ash, and
inorganic mineral comprising alkaline earth metal oxide, wherein the inorganic mineral comprising alkaline earth metal oxide is in an amount of 0.0 to 10, preferably 0.2 to 6, more preferably 0.3 to 3 pbw per said 100 parts by weight of thermally activated aluminosilicate mineral,
optionally at least one aluminate cement, and
optionally at least one calcium sulfate; and
cement set retarder in an amount of 0.1 to 4.0, preferably 0.25 to 3.0, more preferably 0.50 to 2.0 weight % based upon the total weight of the cementitious reactive powder;
alkali metal chemical activator in an amount of 1 to 6, preferably 1.25 to 4, more preferably 1.5 to 2.5 weight % based upon the total weight of the cementitious reactive powder, wherein the alkali metal chemical activator is selected from at least one member of the group consisting of an alkali metal salt and an alkali metal base, wherein potassium citrate is the preferred alkali metal salt chemical activator;
freeze-thaw durability component in an amount of 0.05 to 21.5, preferably 0.1 to 10, more preferably 0.1 to 5 weight % based upon the total weight of the cementitious reactive powder, the freeze-thaw durability component comprising:
air-entraining agent in an amount of 0 to 1, preferably 0.01-0.5, more preferably 0.01-0.2, most preferably 0.05-0.2 weight % based upon the total weight of the cementitious reactive powder,
defoaming agent in an amount of 0 to 0.5, preferably 0-0.25, more preferably 0.01-0.1 weight % based upon the total weight of the cementitious reactive powder, and
surface active organic polymer in an amount of 0 to 20, preferably 0-10, more preferably 0-5 weight % based upon the total weight of the cementitious reactive powder;
wherein at least one member of the group consisting of the air-entraining agent and the surface active organic polymer is present,
wherein the composition has an air content of about 0% to 20% by volume, more preferably about 2% to 12% by volume, and most preferably about 3% to 8% by volume,
wherein said thermally activated aluminosilicate mineral, said optional aluminate cement, said optional calcium sulfate, and said inorganic mineral comprising alkaline earth metal oxide is at least 70 wt. %, preferably at least 80 wt. %, more preferably at least 95 wt. %, most preferably 100 wt. % of the cementitious reactive powder;

wherein the weight ratio of the water/cementitious reactive powder is from 0.30 to 0.55, preferably from 0.35 to 0.45;

wherein if the amount of cement set retarder is less than 0.5 wt. % the weight ratio of the water/cementitious reactive powder is from 0.35 to 0.55:1, preferably from 0.35 to 0.45:1 and/or the inorganic mineral comprising alkaline earth metal oxide is in an amount of 0.2 to 10, preferably 0.2 to 6, more preferably 0.3 to 3 parts by weight (pbw) per 100 parts by weight of said thermally activated aluminosilicate mineral, wherein the slurry mixture has an initial slump diameter and/or one hour slump diameter greater than 18 inches, more preferably greater than 20 inches and most preferably greater than 22 inches when measured in accordance to ASTM C1611-14 and has a final setting time of at least 60 minutes measured using ASTM C191-13.

Clause 2. The composition of Clause 1, wherein the cementitious reactive powder further comprises:

the aluminate cement in an amount of 1 to 100, preferably 2.5-80, more preferably 5 to 60, most preferably 25 to 40 parts by weight (pbw) per 100 pbw of thermally activated aluminosilicate mineral, wherein preferably the aluminate cement is selected from at least one member of the group consisting of calcium sulfoaluminate cement and calcium aluminate cement, and the calcium sulfate in an amount of 2 to 100, preferably 5 to 75, more preferably 10 to 50 parts by weight per 100 pbw of aluminate cement, wherein the calcium sulfate is selected from at least one member of the group consisting of calcium sulfate dihydrate, calcium sulfate hemihydrate, and anhydrous calcium sulfate.

Clause 3. The composition of Clause 1 or 2, wherein the inorganic mineral comprising alkaline earth metal oxide comprises calcium oxide, or magnesium oxide or a combination of calcium oxide and magnesium oxide; wherein the thermally activated aluminosilicate mineral comprises at least 75% Class C fly ash.

Clause 4. The composition of Clause 1, 2 or 3, wherein the composition has at least one of the feature selected from the group consisting of:

air-entraining agent in an amount of 0.01 to 1 weight % based upon the total weight of the cementitious reactive powder, and surface active organic polymer in an amount of 1 to 20 weight % based upon the total weight of the cementitious reactive powder, wherein the composition after setting has a relative dynamic modulus greater than 80% for at least 100 freeze-thaw cycles according to ASTM C666/C666M-15, and wherein the composition after setting has a weight loss less than 1% after 25 freeze-thaw cycles according to this ASTM C672/C672M-12 salt scaling test, wherein the composition has a Durability Factor (DF) measured according to ASTM C666/C666M-15 greater than 85% for 100 freeze-thaw cycles.

Clause 5. The composition of Clause 2, wherein the calcium sulfoaluminate cement is provided in the absence of calcium aluminate cement and an absence of Portland cement.

Clause 6. The composition of Clause 2, wherein the calcium aluminate cement is provided in the absence of calcium sulfoaluminate cement and an absence of Portland cement.

Clause 7. The composition of Clause 2, comprising 5 to 60 parts aluminate cement by weight per 100 pbw of thermally activated aluminosilicate mineral, the aluminate cement comprising the calcium sulfoaluminate cement and the calcium aluminate cement, wherein the amount of calcium aluminate cement is about 5 to about 75 parts by weight (pbw) per 100 pbw of total calcium sulfoaluminate cement and calcium aluminate cement, wherein the composition has an absence of Portland cement.

Clause 8. The composition of Clause 1 or 3, wherein the aluminate cement and calcium sulfate are absent;

wherein the cementitious reactive powder has:

100 pbw thermally activated aluminosilicate mineral and 0.0-10 pbw inorganic mineral comprising alkaline earth metal oxide, preferably has 100 pbw thermally activated aluminosilicate mineral and 0.2-6 pbw inorganic mineral comprising alkaline earth metal oxide, and more preferably has 100 pbw thermally activated aluminosilicate mineral and 0.3-3 pbw inorganic mineral comprising alkaline earth metal oxide.

Clause 9. The composition of Clause 1, 2 or 3, comprising, 0 to 5 parts by weight fine aggregate per 1 part total weight of the cementitious reactive powder;

0 to 5.5 parts by weight coarse aggregate per 1 part total weight of the cementitious reactive powder;

25 to 40 parts said aluminate cement by weight per 100 pbw of thermally activated aluminosilicate mineral, the aluminate cement comprising the calcium sulfoaluminate cement and the calcium aluminate cement, wherein the amount of the calcium aluminate cement is about 30-45 parts by weight (pbw) per 100 pbw of total calcium sulfoaluminate cement and calcium aluminate cement, wherein the composition has an absence of Portland cement;

the air entraining agent, the defoamer, the superplasticizer comprising polycarboxylate polyether;

the surface active polymer comprising redispersible film forming polymer;

the alkali metal salt chemical activator comprises potassium citrate;

air content of about 2% to 12% by volume;

wherein the thermally activated aluminosilicate mineral comprises at least 75% Class C fly ash.

Clause 9.1. The composition of Clause 9, comprising greater than 0 to at most 5 parts by weight fine aggregate per 1 part total weight of the cementitious reactive powder.

10. The composition of Clause 1, 2 or 3, wherein the aluminate cement and calcium sulfate are present; and wherein the cementitious reactive powder:

has 100 pbw thermally activated aluminosilicate mineral, 1-100 pbw aluminate cement per 100 pbw thermally activated aluminosilicate mineral, 2-100 pbw calcium sulfate per 100 pbw aluminate cement, and 0-10 pbw inorganic mineral comprising alkaline earth metal oxide per 100 pbw thermally activated aluminosilicate mineral, preferably has 100 pbw thermally activated aluminosilicate mineral, 2.5-80 pbw aluminate cement per 100 pbw thermally activated aluminosilicate mineral, 5-75 pbw calcium sulfate per 100 pbw aluminate cement, and 0.2-6 pbw inorganic mineral comprising alkaline earth metal oxide per 100 pbw thermally activated aluminosilicate mineral, and more preferably has 100 pbw thermally activated aluminosilicate mineral, 5-60 pbw aluminate cement per 100 pbw thermally activated aluminosilicate mineral, 10-50 pbw calcium sulfate per 100 pbw aluminate cement, and 0.3-3 pbw inorganic mineral comprising alkaline earth metal oxide per 100 pbw thermally activated aluminosilicate mineral.

Clause 11. The composition of any of Clauses 1-10, wherein the inorganic mineral comprising alkaline earth metal has alkaline earth metal oxide content greater than 50 wt %, preferably greater than 60 wt %, more preferably greater than 70 wt %, and most preferably greater than 80 wt %, for example greater than 90 wt %.

Clause 12. A method for making self-consolidating geopolymer compositions of any of Clauses 1-11, comprising the steps of:
preparing a slurry by mixing
  water;
  cementitious reactive powder comprising:
    thermally activated aluminosilicate mineral in an amount of 100 parts by weight, wherein preferably the thermally activated aluminosilicate mineral comprises at least 75% Class C fly ash, and
    inorganic mineral comprising alkaline earth metal oxide, wherein the inorganic mineral comprising alkaline earth metal oxide is in an amount of 0.0 to 10, preferably 0.2 to 6, more preferably 0.3 to 3 pbw per 100 parts by weight of thermally activated aluminosilicate mineral,
    optionally at least one aluminate cement, and
    optionally at least one calcium sulfate; and
  cement set retarder in an amount of 0.1 to 4.0, preferably 0.25 to 3.0, more preferably 0.50 to 2.0 weight % based upon the total weight of the cementitious reactive powder;
  alkali metal chemical activator in an amount of 1 to 6, preferably 1.25 to 4, more preferably 1.5 to 2.5 weight % based upon the total weight of the cementitious reactive powder, wherein the alkali metal chemical activator is selected from at least one member of the group consisting of an alkali metal salt and an alkali metal base, wherein potassium citrate is the preferred alkali metal salt chemical activator;
  freeze-thaw durability component in an amount of 0.05 to 21.5, preferably 0.1 to 10, more preferably 0.1 to 5 weight % based upon the total weight of the cementitious reactive powder, the freeze-thaw durability component comprising:
    air-entraining agent in an amount of 0 to 1, preferably 0.01-0.5, more preferably 0.01-0.2, most preferably 0.05-0.2 weight % based upon the total weight of the cementitious reactive powder,
    defoaming agent in an amount of 0 to 0.5, preferably 0-0.25, more preferably 0.01-0.1 weight % based upon the total weight of the cementitious reactive powder, and
    surface active organic polymer in an amount of 0 to 20, preferably 0-10, more preferably 0-5 weight % based upon the total weight of the cementitious reactive powder;
  wherein at least one member of the group consisting of the air-entraining agent and the surface active organic polymer is present,
  wherein the slurry has an air content of about 0% to 20% by volume, more preferably about 2% to 12% by volume, and most preferably about 3% to 8% by volume,
  wherein said thermally activated aluminosilicate mineral, said optional aluminate cement, said optional calcium sulfate, and said inorganic mineral comprising alkaline earth metal oxide is at least 70 wt. %, preferably at least 80 wt. %, more preferably at least 95 wt. %, most preferably 100 wt. % of the cementitious reactive powder;
  wherein the water/cementitious reactive powder weight ratio of the slurry is from 0.30 to 0.55, preferably from 0.35 to 0.45;
  with the proviso that if the amount of cement set retarder is less than 0.5 wt. %
    the weight ratio of the water/cementitious reactive powder is from 0.35 to 0.55:1, preferably from 0.35 to 0.45:1 and/or
    the inorganic mineral comprising alkaline earth metal oxide is in an amount of 0.2 to 10, preferably 0.2 to 6, more preferably 0.3 to 3 parts by weight (pbw) per 100 parts by weight of said thermally activated aluminosilicate mineral,
  wherein the slurry mixture has an initial slump diameter and/or one hour slump diameter greater than 18 inches, more preferably greater than 20 inches and most preferably greater than 22 inches when measured in accordance to ASTM C1611-14 and has a final setting time of at least 60 minutes measured in accordance to ASTM C191-13,
  setting the slurry to form a set composition.

Clause 13. The method of Clause 12, wherein the cementitious reactive powder further comprises:
  the aluminate cement in an amount of 1 to 100, preferably 2.5-80, more preferably 5 to 60, most preferably 25 to 40 parts by weight (pbw) per 100 pbw of thermally activated aluminosilicate mineral, wherein preferably the aluminate cement is selected from at least one member of the group consisting of calcium sulfoaluminate cement and calcium aluminate cement, and
  the calcium sulfate in an amount of 2 to 100, preferably 5 to 75, more preferably 10 to 50 parts by weight per 100 pbw of aluminate cement, wherein the calcium sulfate is selected from at least one member of the group consisting of calcium sulfate dihydrate, calcium sulfate hemihydrate, and anhydrous calcium sulfate.

Clause 14. The method of Clause 12 or 13, wherein the inorganic mineral comprising alkaline earth metal oxide comprises calcium oxide, or magnesium oxide or a combination of calcium oxide and magnesium oxide; wherein the thermally activated aluminosilicate mineral comprises at least 75% Class C fly ash.

Clause 15. The method of Clause 12, 13 or 14, wherein the mixture is mixed at an initial temperature of about 0 to about 122° F. (−18 to 50° C.), wherein the mixture contains at least one member of the group consisting of the air-entraining agent and the surface active organic polymer.

Clause 16. The method of Clause 12, 13 or 14, wherein the slurry is continuously mixed in a rotating drum of ready-mix or transit truck for up to 360 minutes.

Clause 17. The method of Clause 12, 13 or 14, wherein the slurry is aerated by mixing the formed slurry to directly entrain air into the slurry in a low shear mixer at a speed of RPM≤100 for 2 to 12 minutes.

Clause 18. The method of Clause 12, 13 or 14, wherein the set composition has a freeze-thaw durability performance according to ASTM C666/C 666M-15 of a relative dynamic modulus of greater than 80 percent for at least 300 freeze-thaw cycles, preferably at least 600 freeze-thaw cycles, more preferably at least 900 freeze-thaw cycles, most preferably at least 1200 freeze-thaw cycles.

Clause 19. The method of any of Clauses 12-18, wherein the inorganic mineral comprising alkaline earth metal has alkaline earth metal oxide content greater than 50 wt %, preferably greater than 60 wt %, more preferably greater than 70 wt %, and most preferably greater than 80 wt %, for example greater than 90 wt %.

Clause 20. A blend for making a self-consolidating geopolymer composition comprising a mixture of:
cementitious reactive powder comprising:
  thermally activated aluminosilicate mineral in an amount of 100 parts by weight, wherein preferably the thermally activated aluminosilicate mineral comprises at least 75% Class C fly ash, and
  inorganic mineral comprising alkaline earth metal oxide, wherein the inorganic mineral comprising alkaline earth metal oxide is in an amount of 0.0 to 10, preferably 0.2 to 6, more preferably 0.3 to 3 pbw per said 100 parts by weight of thermally activated aluminosilicate mineral,
  optionally at least one aluminate cement, and
  optionally at least one calcium sulfate; and
cement set retarder in an amount of 0.1 to 4.0, preferably 0.25 to 3.0, more preferably 0.50 to 2.0 weight % based upon the total weight of the cementitious reactive powder;
alkali metal chemical activator in an amount of 1 to 6, preferably 1.25 to 4, more preferably 1.5 to 2.5 weight % based upon the total weight of the cementitious reactive powder, wherein the alkali metal chemical activator is selected from at least one member of the group consisting of an alkali metal salt and an alkali metal base, wherein potassium citrate is the preferred alkali metal salt chemical activator;
freeze-thaw durability component in an amount of 0.05 to 21.5, preferably 0.1 to 10, more preferably 0.1 to 5 weight % based upon the total weight of the cementitious reactive powder, the freeze-thaw durability component comprising:
  air-entraining agent in an amount of 0 to 1, preferably 0.01-0.5, more preferably 0.01-0.2, most preferably 0.05-0.2 weight % based upon the total weight of the cementitious reactive powder,
  defoaming agent in an amount of 0 to 0.5, preferably 0-0.25, more preferably 0.01-0.1 weight % based upon the total weight of the cementitious reactive powder, and
  surface active organic polymer in an amount of 0 to 20, preferably 0-10, more preferably 0-5 weight % based upon the total weight of the cementitious reactive powder;
wherein at least one member of the group consisting of the air-entraining agent and the surface active organic polymer is present,
wherein the composition has an air content of about 0% to 20% by volume, more preferably about 2% to 12% by volume, and most preferably about 3% to 8% by volume,
wherein said thermally activated aluminosilicate mineral, said optional aluminate cement, said optional calcium sulfate, and said inorganic mineral comprising alkaline earth metal oxide is at least 70 wt. %, preferably at least 80 wt. %, more preferably at least 95 wt. %, most preferably 100 wt. % of the cementitious reactive powder;
wherein the blend when mixed with water, at a weight ratio of the water/cementitious reactive powder from 0.30 to 0.55:1, preferably from 0.35 to 0.45:1, forms a slurry mixture having an initial slump diameter and/or a one hour slump diameter greater than 18 inches, more preferably greater than 20 inches, and most preferably greater than 22 inches when measured in accordance to ASTM C1611-14 and has a final setting time of at least 60 minutes when measured using ASTM C191-13, with the proviso that if the amount of cement set retarder is less than 0.5 wt. %:

the weight ratio of the water/cementitious reactive powder is from 0.35 to 0.55:1, preferably from 0.35 to 0.45:1 and/or the inorganic mineral comprising alkaline earth metal oxide is in an amount of 0.2 to 10, preferably 0.2 to 6, more preferably 0.3 to 3 parts by weight (pbw) per 100 parts by weight of said thermally activated aluminosilicate mineral to form the slurry mixture.

It will be understood by those skilled in the art to which this disclosure is directed that modifications and additions may be made to the invention without departing from its scope.

The invention claimed is:

1. A self-consolidating geopolymer composition comprising a slurry mixture of:
water, and
cementitious reactive powder comprising:
  thermally activated aluminosilicate mineral in an amount of 100 parts by weight (pbw), and
  inorganic mineral comprising alkaline earth metal oxide, wherein the inorganic mineral comprising alkaline earth metal oxide is in an amount of 0.0 to 6 pbw per said 100 parts by weight of the thermally activated aluminosilicate mineral,
wherein the inorganic mineral comprising alkaline earth metal oxide comprises calcium oxide, or magnesium oxide or a combination of calcium oxide and magnesium oxide, wherein greater than 50 wt. % of the inorganic mineral comprising alkaline earth metal oxide is the calcium oxide or the magnesium oxide or a combination of the calcium oxide and the magnesium oxide,
wherein the inorganic mineral comprising the alkaline earth metal oxide has a median particle size less than 100 microns,
  optionally at least one aluminate cement, and
  optionally at least one calcium sulfate; and
fine aggregate filler and/or coarse aggregate filler, wherein there are 1 to 8 pbw total fine aggregate and coarse aggregate per 1 pbw cementitious reactive powder,
cement set retarder in an amount of 0.5 to 4.0 weight % based upon the total weight of the cementitious reactive powder;
alkali metal chemical activator in an amount of 1 to 6 weight % based upon the total weight of the cementitious reactive powder, wherein the alkali metal chemical activator is selected from at least one member of the group consisting of an alkali metal salt and an alkali metal base;
freeze-thaw durability component in an amount of 0.05 to 21.5 weight % based upon the total weight of the cementitious reactive powder, the freeze-thaw durability component comprising:
  air-entraining agent in an amount of 0 to 1 weight % based upon the total weight of the cementitious reactive powder,
  defoaming agent in an amount of 0 to 0.5 weight % based upon the total weight of the cementitious reactive powder, and
  surface active organic polymer in an amount of 0 to 20 weight % based upon the total weight of the cementitious reactive powder;
wherein at least one member of the group consisting of the air-entraining agent and the surface active organic polymer is present,
wherein the composition has an air content of about 0% to 20% by volume, wherein said thermally activated aluminosilicate mineral, said optional at least one aluminate cement, said optional at least one calcium sulfate, and said inorganic mineral comprising alkaline earth metal oxide is at least 70 wt. % of the cementitious reactive powder;
wherein the weight ratio of the water/cementitious reactive powder is from 0.30 to 0.55;
wherein the slurry mixture has an initial slump diameter and/or one hour slump diameter greater than 18 inches when measured in accordance to ASTM C1611-14 and has a final setting time of at least 60 minutes measured using ASTM C191-13.

2. The composition of claim 1,
wherein the composition has 0.2 to 6 pbw said inorganic mineral comprising alkaline earth metal oxide per said one hundred parts by weight of the thermally activated aluminosilicate mineral,
wherein the cementitious reactive powder further comprises:
the at least one aluminate cement in an amount of 1 to 100 parts by weight (pbw) per 100 pbw of the thermally activated aluminosilicate mineral, and
the at least one calcium sulfate in an amount of 2 to 100 parts by weight per 100 pbw of at least one aluminate cement, wherein the at least one calcium sulfate is selected from at least one member of the group consisting of calcium sulfate dihydrate, calcium sulfate hemihydrate, and anhydrous calcium sulfate.

3. The composition of claim 2, wherein the thermally activated aluminosilicate mineral comprises at least 75% by weight Class C fly ash.

4. The composition of claim 3,
wherein the inorganic mineral comprising the alkaline earth metal oxide is selected from calcined limestone, calcined dolomite, and/or calcined magnesite;
wherein greater than 80 wt. % of the inorganic mineral comprising alkaline earth metal oxide is the calcium oxide or the magnesium oxide or a combination of the calcium oxide and the magnesium oxide;
wherein the inorganic mineral comprising the alkaline earth metal oxide has a median particle size less than 50 microns;
wherein the weight ratio of the water/cementitious reactive powder is from 0.35-0.45.

5. The composition of claim 2, wherein the at least one aluminate cement comprises calcium sulfoaluminate cement provided in an absence of calcium aluminate cement and an absence of Portland cement.

6. The composition of claim 2, wherein the at least one aluminate cement comprises calcium aluminate cement provided in an absence of calcium sulfoaluminate cement and an absence of Portland cement.

7. The composition of claim 2, comprising 5 to 60 parts the at least one aluminate cement by weight per 100 pbw of the thermally activated aluminosilicate mineral, the at least one aluminate cement comprising calcium sulfoaluminate cement and calcium aluminate cement, wherein the amount of calcium aluminate cement is about 5 to about 75 parts by weight (pbw) per 100 pbw of total calcium sulfoaluminate cement and calcium aluminate cement, wherein the composition has an absence of Portland cement.

8. The composition of claim 1, wherein the composition has at least one of the feature selected from the group consisting of:
air-entraining agent in an amount of 0.01 to 1 weight % based upon the total weight of the cementitious reactive powder, and
surface active organic polymer in an amount of 1 to 20 weight % based upon the total weight of the cementitious reactive powder,
wherein the composition after setting has a relative dynamic modulus greater than 80% for at least 100 freeze-thaw cycles according to ASTM C666/C666M-15, and
wherein the composition after setting has a weight loss less than 1% after 25 freeze-thaw cycles according to this ASTM C672/C672M-12 salt scaling test,
wherein the composition has a Durability Factor (DF) measured according to ASTM C666/C666M —15 greater than 85% for 100 freeze-thaw cycles.

9. The composition of claim 1, comprising,
at most 5 parts by weight said fine aggregate per 1 part total weight of the cementitious reactive powder;
at most 5.5 parts by weight said coarse aggregate per 1 part total weight of the cementitious reactive powder;
25 to 40 parts said at least one aluminate cement by weight per 100 pbw of the thermally activated aluminosilicate mineral, the at least one aluminate cement comprising calcium sulfoaluminate cement and calcium aluminate cement, wherein the amount of the at least one calcium aluminate cement is about 30-45 parts by weight (pbw) per 100 pbw of total calcium sulfoaluminate cement and calcium aluminate cement, wherein the composition has an absence of Portland cement;
the air entraining agent,
the defoaming agent,
superplasticizer comprising polycarboxylate polyether;
the surface active organic polymer comprising redispersible film forming polymer;
the alkali metal salt chemical activator comprises potassium citrate;
air content of about 2% to 12% by volume;
wherein the thermally activated aluminosilicate mineral comprises at least 75% by weight Class C fly ash.

10. The composition of claim 1, wherein the aluminate cement and calcium sulfate are present; and wherein the cementitious reactive powder: —has 100 pbw of the thermally activated aluminosilicate mineral, 1-100 pbw of the at least one aluminate cement per 100 pbw of the thermally activated aluminosilicate mineral, 2-100 pbw of the at least one calcium sulfate per 100 pbw of the at least one aluminate cement, and 0-10 pbw inorganic mineral comprising alkaline earth metal oxide per 100 pbw of the thermally activated aluminosilicate mineral.

11. The composition of claim 1, wherein the inorganic mineral comprising alkaline earth metal has alkaline earth metal oxide content greater than 90 wt %.

12. A method for making self-consolidating geopolymer compositions of claim 1, comprising the steps of:
preparing a slurry mixture by mixing
water;
cementitious reactive powder comprising:
thermally activated aluminosilicate mineral in an amount of 100 parts by weight, and
inorganic mineral comprising alkaline earth metal oxide, wherein the inorganic mineral comprising alkaline earth metal oxide is in an amount of 0.0 to 6 pbw per said 100 parts by weight of the thermally activated aluminosilicate mineral,
wherein the inorganic mineral comprising alkaline earth metal oxide comprises calcium oxide, or magnesium oxide or a combination of calcium oxide and magnesium oxide, wherein greater than 50 wt. % of the inorganic mineral comprising alkaline earth metal oxide is the calcium oxide or the magnesium oxide or a combination of the calcium oxide and the magnesium oxide,
wherein the inorganic mineral comprising the alkaline earth metal oxide has a median particle size less than 100 microns,
optionally at least one aluminate cement, and
optionally at least one calcium sulfate; and
fine aggregate filler and/or coarse aggregate filler, wherein there are 1 to 8 pbw total fine aggregate and coarse aggregate per 1 pbw cementitious reactive powder,
cement set retarder in an amount of 0.5 to 4.0 weight % based upon the total weight of the cementious reactive powder;
alkali metal chemical activator in an amount of 1 to 6 weight % based upon the total weight of the cementitious reactive powder, wherein the alkali metal chemical activator is selected from at least one member of the group consisting of an alkali metal salt and an alkali metal base;
freeze-thaw durability component in an amount of 0.05 to 21.5 weight % based upon the total weight of the cementitious reactive powder, the freeze-thaw durability component comprising:
air-entraining agent in an amount of 0 to 1 weight % based upon the total weight of the cementitious reactive powder,
defoaming agent in an amount of 0 to 0.5 weight % based upon the total weight of the cementitious reactive powder, and
surface active organic polymer in an amount of 0 to 20 weight % based upon the total weight of the cementitious reactive powder;
wherein at least one member of the group consisting of the air-entraining agent and the surface active organic polymer is present,
wherein the slurry has an air content of about 0% to 20% by volume,
wherein said thermally activated aluminosilicate mineral, said optional at least one aluminate cement, and said optional at least one inorganic mineral comprising alkaline earth metal oxide is at least 70 wt. % of the cementitious reactive powder;
wherein the weight ratio of the water/cementitious reactive powder is from 0.30 to 0.55;
wherein the slurry mixture has an initial slump diameter and/or one hour slump diameter greater than 18 inches when measured in accordance to ASTM C1611-14 and has a final setting time of at least 60 minutes measured in accordance to ASTM C191-13,
setting the slurry mixture to form a set composition.

13. The method of claim 12, wherein the cementitious reactive powder further comprises:
0.2 to 6 pbw inorganic mineral per said one hundred parts by weight of the thermally activated aluminosilicate mineral,
the at least one aluminate cement in an amount of 1 to 100 parts by weight (pbw) per 100 pbw of thermally activated aluminosilicate mineral, and
the at least one calcium sulfate in an amount of 2 to 100 parts by weight per 100 pbw of the at least one aluminate cement, wherein the at least one calcium sulfate is selected from at least one member of the group consisting of calcium sulfate dihydrate, calcium sulfate hemihydrate, and anhydrous calcium sulfate.

14. The method of claim 12, wherein the thermally activated aluminosilicate mineral comprises at least 75% by weight Class C fly ash.

15. The method of claim 12, wherein the slurry mixture is mixed at an initial temperature of about 0 to about 122° F. (−18 to 50° C.), wherein the mixture contains at least one member of the group consisting of the air-entraining agent and the surface active organic polymer.

16. The method of claim 12, wherein the slurry mixture is continuously mixed in a rotating drum of ready-mix or transit truck for up to 360 minutes.

17. The method of claim 12, wherein the slurry is aerated by mixing the formed slurry mixture to directly entrain air into the slurry in a low shear mixer at a speed of RPM ≤100 for 2 to 12 minutes.

18. The method of claim 12, wherein the set composition has a freeze-thaw durability performance according to ASTM C666/C 666M-15 of a relative dynamic modulus of greater than 80 percent for at least 300 freeze-thaw cycles.

19. The method of claim 12, wherein the inorganic mineral comprising alkaline earth metal has alkaline earth metal oxide content greater than 50 wt %.

20. A blend for making a self-consolidating geopolymer composition comprising a mixture of:
cementitious reactive powder comprising:
thermally activated aluminosilicate mineral in an amount of 100 parts by weight, and
inorganic mineral comprising alkaline earth metal oxide, wherein the inorganic mineral comprising alkaline earth metal oxide is in an amount of 0.0 to 6 pbw per said 100 parts by weight of the thermally activated aluminosilicate mineral,
wherein the inorganic mineral comprising alkaline earth metal oxide comprises calcium oxide, or magnesium oxide or a combination of calcium oxide and magnesium oxide, wherein greater than 50 wt. % of the inorganic mineral comprising alkaline earth metal oxide is the calcium oxide or the magnesium oxide or a combination of the calcium oxide and the magnesium oxide,
wherein the inorganic mineral comprising the alkaline earth metal oxide has a median particle size less than 100 microns,
optionally at least one aluminate cement, and
optionally at least one calcium sulfate; and
fine aggregate filler and/or coarse aggregate filler, wherein there are 1 to 8 pbw total fine aggregate and coarse aggregate per 1 pbw cementitious reactive powder,
cement set retarder in an amount of 0.5 to 4.0 weight % based upon the total weight of the cementitious reactive powder;
alkali metal chemical activator in an amount of 1 to 6 weight % based upon the total weight of the cementitious reactive powder, wherein the alkali metal chemical activator is selected from at least one member of the group consisting of an alkali metal salt and an alkali metal base;
freeze-thaw durability component in an amount of 0.05 to 21.5 weight % based upon the total weight of the cementitious reactive powder, the freeze-thaw durability component comprising:
air-entraining agent in an amount of 0 to 1 weight % based upon the total weight of the cementitious reactive powder, defoaming agent in an amount of 0 to 0.5 weight % based upon the total weight of the cementitious reactive powder, and surface active organic polymer in an amount of 0 to 20 weight % based upon the total weight of the cementitious reactive powder;

wherein at least one member of the group consisting of the air-entraining agent and the surface active organic polymer is present, wherein the composition has an air content of about 0% to 20% by volume, wherein said thermally activated aluminosilicate mineral, said optional at least one aluminate cement, said optional at least one calcium sulfate, and said inorganic mineral comprising alkaline earth metal oxide is at least 70 wt. % of the cementitious reactive powder;

wherein the blend when mixed with water, at a weight ratio of the water/cementitious reactive powder from 0.30 to 0.55:1, forms a slurry mixture having an initial slump diameter and/or a one hour slump diameter greater than 18 inches when measured in accordance to ASTM C1611-14 and has a final setting time of at least 60 minutes when measured using ASTM C191 13.

* * * * *